United States Patent
Filler et al.

(10) Patent No.: US 12,496,618 B2
(45) Date of Patent: Dec. 16, 2025

(54) METHODS AND ARRANGEMENTS TO AID RECYCLING

(71) Applicant: Digimarc Corporation, Beaverton, OR (US)

(72) Inventors: Tomas Filler, Beaverton, OR (US); Ravi K. Sharma, Portland, OR (US); Tony F. Rodriguez, Portland, OR (US); Osama M. Alattar, Tigard, OR (US); Adnan M. Alattar, Tigard, OR (US); Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 17/721,694

(22) Filed: Apr. 15, 2022

(65) Prior Publication Data

US 2022/0331841 A1    Oct. 20, 2022

Related U.S. Application Data

(60) Provisional application No. 63/257,306, filed on Oct. 19, 2021, provisional application No. 63/261,837, (Continued)

(51) Int. Cl.
  *B07C 5/342*    (2006.01)
  *B65G 47/26*    (2006.01)
  *G06F 18/214*    (2023.01)

(52) U.S. Cl.
  CPC .............. *B07C 5/342* (2013.01); *B65G 47/26* (2013.01); *G06F 18/214* (2023.01);
  (Continued)

(58) Field of Classification Search
  CPC . B07B 5/342; B07B 2501/0054; B65G 47/26; B65G 2203/0208; B65G 2203/041;
  (Continued)

(56) References Cited

U.S. PATENT DOCUMENTS 5,314,072 A * 5/1994 Frankel .................. B07C 5/365
                                                              209/580
6,401,936 B1 * 6/2002 Isaacs .................... B65G 43/08
                                                              198/367.1
(Continued)

FOREIGN PATENT DOCUMENTS

EP        3816857         5/2021
EP        3838427         6/2021
(Continued)

OTHER PUBLICATIONS

Neural network, Wikipedia article archived Apr. 6, 2021.
(Continued)

*Primary Examiner* — Michael McCullough
*Assistant Examiner* — Kalyanavenkateshware Kumar
(74) *Attorney, Agent, or Firm* — Klarquist Sparkman, LLP

(57) ABSTRACT

A waste stream is analyzed and sorted to segregate different items for recycling. Certain features of the technology improve the accuracy with which waste stream items are diverted to collection repositories. Other features concern adaptation of neural networks in accordance with context information sensed from the waste. Still other features serve to automate and simplify maintenance of machine vision systems used in waste sorting. Yet other aspects of the technology concern marking 2D machine readable code data on items having complex surfaces (e.g., food containers with integral ribbing for structural strength or juice pooling), to mitigate issues that such surfaces can introduce in code reading. Still other aspects of the technology concern prioritizing certain blocks of conveyor belt imagery for analysis. Yet other aspects of the technology concern joint use of near infrared spectroscopy, artificial intelligence, digital watermarking, and/or other techniques, for waste sorting. A
(Continued)

variety of further features and arrangements are also detailed.

21 Claims, 13 Drawing Sheets

Related U.S. Application Data filed on Sep. 29, 2021, provisional application No. 63/248,479, filed on Sep. 25, 2021, provisional application No. 63/260,264, filed on Aug. 13, 2021, provisional application No. 63/185,990, filed on May 7, 2021, provisional application No. 63/175,950, filed on Apr. 16, 2021.

(52) U.S. Cl.
CPC ............ *B07C 2501/0054* (2013.01); *B65G 2203/0208* (2013.01); *B65G 2203/041* (2013.01)

(58) Field of Classification Search
CPC .. G06K 9/6256; G06K 7/1417; G06K 7/1482; G06K 19/06037; G06K 19/06046
See application file for complete search history.

(56) References Cited

U.S. PATENT DOCUMENTS

| | | | |
|---|---|---|---|
| 9,639,535 | B1 | 5/2017 | Ripley |
| 10,664,722 | B1 | 5/2020 | Sharma |
| 10,934,101 | B1* | 3/2021 | Sines ............... B07C 1/04 |
| 2018/0036774 | A1 | 2/2018 | Lukka |
| 2018/0345323 | A1 | 12/2018 | Kerver |
| 2019/0030571 | A1* | 1/2019 | Horowitz .......... B07C 1/04 |
| 2019/0130560 | A1 | 5/2019 | Horowitz |
| 2019/0217342 | A1 | 7/2019 | Parr |
| 2020/0034785 | A1 | 1/2020 | Romano |
| 2020/0050922 | A1 | 2/2020 | Wu |
| 2020/0087118 | A1 | 3/2020 | Sato |
| 2021/0047132 | A1 | 2/2021 | Sines |
| 2021/0233258 | A1 | 7/2021 | Sieb |
| 2021/0295039 | A1 | 9/2021 | Jenkins |
| 2021/0299706 | A1 | 9/2021 | Filler |
| 2022/0004832 | A1 | 1/2022 | Doheny, II |
| 2022/0339673 | A1 | 10/2022 | Jochen |

FOREIGN PATENT DOCUMENTS

| | | |
|---|---|---|
| EP | 3865222 | 8/2021 |
| WO | 19043231 | 3/2019 |
| WO | 2020186234 | 9/2020 |
| WO | 2021078842 | 4/2021 |
| WO | 2021089602 | 5/2021 |
| WO | 2021245118 | 12/2021 |
| WO | 2022185340 | 9/2022 |
| WO | 2022221680 | 10/2022 |

OTHER PUBLICATIONS

Tomra 2020 catalog, Our Expertise for Tomorrow's Solutions, 27 pp., May 2020.
Tomra brochure, Autosort, Precision That Pays Off, 9 pp., Sep. 2021.
Tomra brochure, Gain Intelligence, 4 pp., Oct. 30, 2019.
Hertling et al, Decomposition and Re-Composition of Digital Watermarks, Research Disclosure, Kenneth Mason Publications, Hampshire, UK, vol. 648, No. 50, Apr. 1, 2018, p. 520.
Written Opinion of the International Searching Authority, PCT/US2022/025053 (published as WO2022221680), Sep. 2022.

* cited by examiner

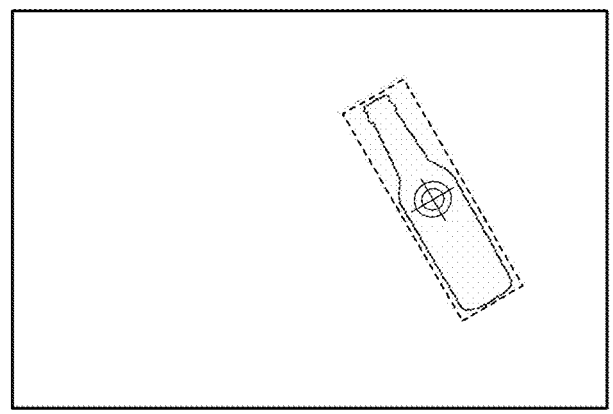
FIG. 21
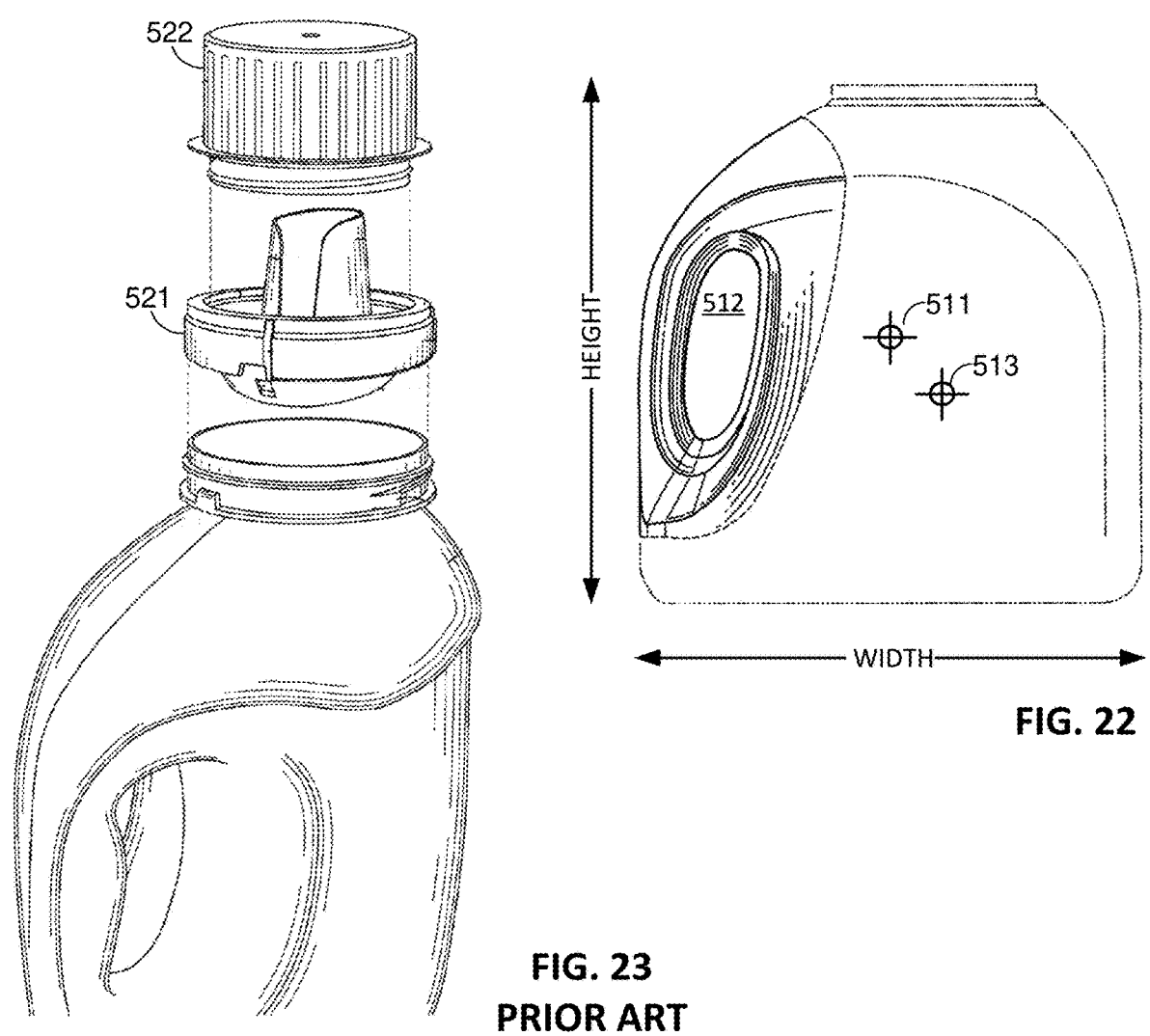
FIG. 22
FIG. 23
PRIOR ART

METHODS AND ARRANGEMENTS TO AID RECYCLING

RELATED APPLICATION DATA

This application claims priority to the following provisional U.S. patent applications 63/257,306, filed Oct. 19, 2021, 63/261,837, filed Sep. 29, 2021, 63/248,479, filed Sep. 25, 2021, 63/260,264, filed Aug. 13, 2021, 63/185,990, filed May 7, 2021, and 63/175,950, filed Apr. 16, 2021.

This application expands on previous work detailed in U.S. patent application Ser. No. 17/214,455, filed Mar. 26, 2021 (now published as US20210299706), Ser. No. 17/470,674, filed Sep. 9, 2021 (now published as US20220055071), and Ser. No. 16/435,292, filed Jun. 7, 2019 (now published as US20190306385). The subject matter of this application is also related to that of published patent applications US20210387399, and US20210390358 and U.S. patent application Ser. No. 16/944,136, filed Jul. 30, 2020, Ser. No. 17/521,697, filed Nov. 8, 2021, Ser. No. 17/681,262, filed Feb. 25, 2022, 63/240,821, filed Sep. 3, 2021, 63/267,268, filed Jan. 28, 2022, and 63/287,289, filed Dec. 8, 2021.

The foregoing applications are incorporated herein by reference.

BACKGROUND AND INTRODUCTION

Applicant's published patent applications US20190306385, US20210299706 and US20220055071 detail methods and systems to help recover, for recycling or re-use, some of the millions of tons of consumer plastic that are presently lost each year to landfills or incinerators. The reader is presumed to be familiar with the contents of these previous applications, as the present application takes such teachings as a starting point.

Certain aspects of the present technology concern enhancements to waste sorting systems to improve the accuracy with which different items are diverted to collection repositories.

Other aspects of the technology automate and simplify maintenance of machine vision systems used in waste sorting.

Still other aspects of the technology concern adapting operation of neural networks in accordance with context information sensed from waste on a conveyor belt.

Yet other aspects of the technology concern marking 2D machine readable code data on items having complex surfaces (e.g., food containers that incorporate ribbing for structural strength or juice pooling), to mitigate issues that such surfaces can introduce to code reading camera systems.

Other aspects of the technology concern identifying which blocks of imagery, depicting waste on a conveyor belt, should be given priority for analysis.

Still other aspects of the technology concern joint use of near infrared spectroscopy, artificial intelligence, digital watermarking, and/or other techniques, for waste sorting.

The foregoing and other features and aspects of the present technology will be more readily apparent from the following detailed description, which proceeds with reference to the accompanying drawings.

BRIEF DESCRIPTION OF THE DRAWINGS

FIGS. 21-23 depict situations in which ejection location determined by analysis of 2D data can give sub-optimal results.

DETAILED DESCRIPTION

There is a critical need for high-reliability identification of plastic items, e.g., for sorting waste streams. Digital watermarks are suited to this task.

Digital watermarks provide 2D optical code signals that enable machine vision in waste sorting systems to determine the type(s) of material (e.g., variety of plastic) in each object. Encoded identification signals imparted into and onto containers (e.g., via printed labels, textured molds, laser engraving of plastic, etc.) can be sensed and used to control sorting based on container material and other factors. Since digital watermark signals can be spread over a container and/or its labels in ways that provide identification even when the object is damaged, soiled or partially occluded, the technology is particularly advantageous for waste sorting purposes.

Figure 1:
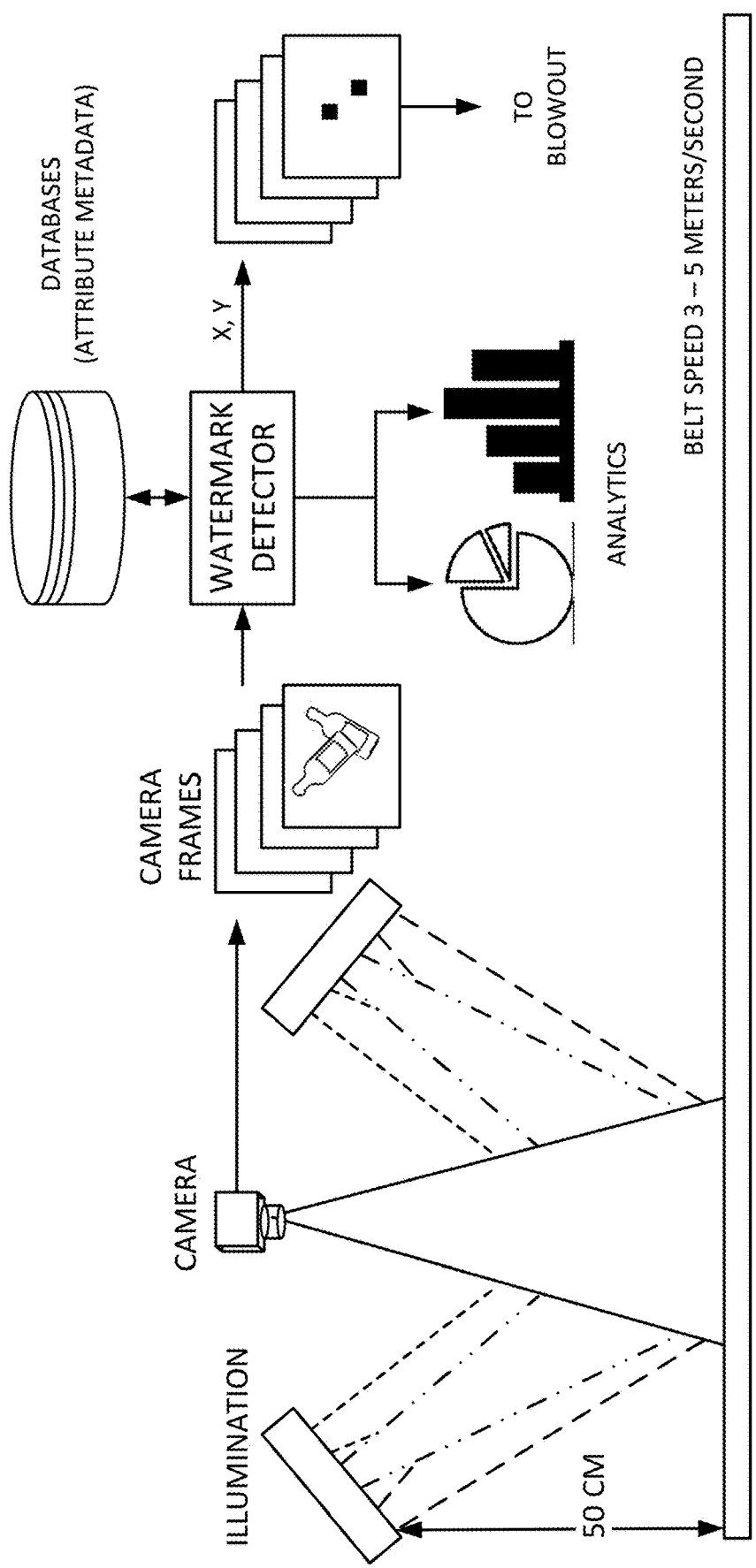
FIG. 1 illustrates a system that can employ certain aspects of the present technology.

An illustrative recycling apparatus that can employ aspects of the present technology is shown in FIG. 1 and employs one or more cameras, and typically light sources, to capture imagery depicting watermarked plastic items traveling in a waste stream on a conveyor belt. Depending on implementation, the conveyor area imaged by a camera system (i.e., its field of view) may be as small as about 2 by 3 inches, or as large as about 20 by 30 inches, or larger—primarily dependent on camera sensor resolution and lens focal length. In some implementations, multiple imaging systems are employed to capture imagery that collectively span the width of the conveyor. A conveyor may be up to two meters in width in a mass-feed system. (Singulated-feed systems, in which items are metered onto the conveyor one at a time, are narrower, e.g., 50 cm in width.) Conveyor speeds of 1-5 meters/second are common.

Image frames depicting an item are provided to a detector that decodes watermark payload data for the item from small blocks of imagery. The watermark payload data comprises a short identifier (e.g., 5-100 bits), which is associated with a collection of related metadata in a database (sometimes termed a "resolver database"). This metadata may detail a lengthy set of attributes about the plastic used in the item, such as its chemistry and properties, e.g., its melt index, melt flow ratio, resin specific gravity, bulk density, melt temperature, fillers and additives, color pigments, etc. The metadata may further provide non-plastic information, such as dimensions and weight of the item, whether the item was used as a food container or not, whether the package is a multi-layer composite or includes a sleeve, the corporate brand responsible for the item, etc.

The locations of decoded watermark signal blocks within captured image frames are mapped to corresponding physical areas on the conveyor belt. The belt speed is known, so the system can predict when watermark-identified items will be in position to be diverted from the belt into an appropriate receptacle, or onto a selected further conveyor. Diversion means such as compressed air "blowout" or robotic manipulators can be employed Plastic items can be encoded with multiple watermarks. One watermark can be printed—typically by ink—on a label or sleeve applied to the item (or printed on the item itself), and another can be formed by 3D texturing of the plastic surface. The payload of a printed watermark commonly conveys a retail payload (e.g., a GTIN, a Global Trade Item Number), which is designed primarily for reading by a point-of-sale terminal scanner, as it contains or points to (links to) a product name, price, weight, expiration date, package date, etc., to identify and price an item at a retail checkout. ("Points to" and "links to" refer to use of the payload information to identify a corresponding database record or other data structure, from which further information about the item is obtained.) The texture watermark may comprise the same payload, or one specific to recycling, e.g., containing or pointing to data relating to the plastic.

Watermarking Technology

We next provide an introductory discussion of illustrative watermark encoding and decoding arrangements. (The following details are phrased in the context of print, but the application of such methods to surface texturing is straightforward, e.g., given teachings elsewhere in this disclosure and in the cited documents.)

In an exemplary encoding method, a plural-symbol message payload (e.g., 47 binary bits, which may represent a product's Global Trade Identification Number (GTIN) or a container identification code, together with 24 associated CRC bits), is applied to an error correction coder. This coder transforms the symbols of the message payload into a much longer array of encoded message elements (e.g., binary or M-ary) using an error correction method. (Suitable coding methods include block codes, BCH, Reed Solomon, convolutional codes, turbo codes, etc.) The coder output may comprise hundreds or thousands of binary bits, e.g., 1024, which may be termed raw signature bits. These bits may be scrambled by XORing with a scrambling key of the same length, yielding a scrambled signature.

Each bit of the scrambled signature modulates a pseudo-random noise modulation sequence (spreading carrier) of length 16, e.g., by XORing. Each scrambled signature bit thus yields a modulated carrier sequence of 16 "chips," producing an enlarged scrambled payload sequence of 16,384 elements. This sequence is mapped to elements of a square block having 128×128 embedding locations in accordance with data in a map or scatter table, yielding a 2D payload signature pattern comprised of 128×128 watermark elements ("waxels"). In a particular embodiment, the scatter table assigns 4 chips for each scrambled signature bit to each of four 64×64 quadrants in the 128×128 block.

Each location in the 128×128 block is associated with a waxel (chip) value of either 0 or 1 (or −1 or 1, or black or white)—with about half of the locations having each state. This bimodal signal is frequently mapped to a larger bimodal signal centered at an eight-bit greyscale value of 128, e.g., with values of 95 and 161. Each of these embedding locations may correspond to a single pixel, resulting in a 128×128 pixel watermark message block. Alternatively, each embedding location may correspond to a small region of pixels, such as a 2×2 patch, termed a "bump," resulting in a 256×256 pixel message block.

Figure 2A:
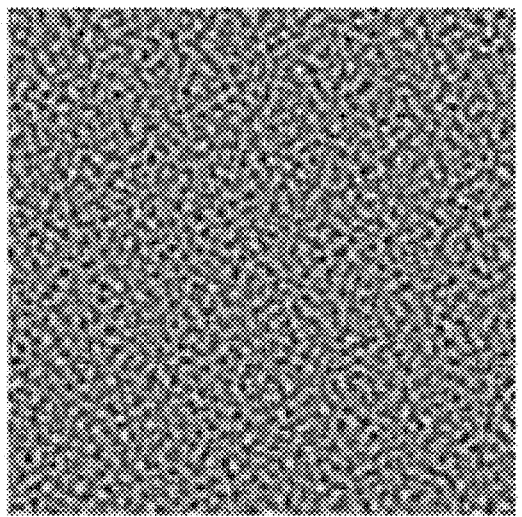
FIG. 2A show an illustrative watermark reference signal in the pixel domain.
Figure 2B:
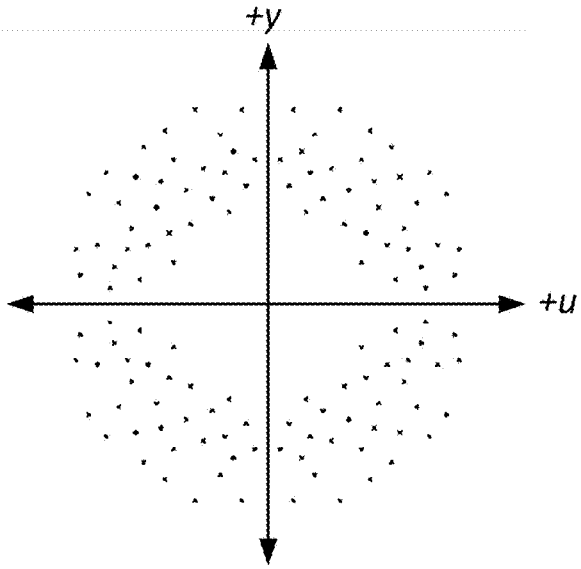
FIG. 2B shows the same signal expressed in the Fourier magnitude domain.

A synchronization component is commonly included in a digital watermark to help discern parameters of any affine transform to which the watermark has been subjected prior to decoding, so that the payload can be correctly decoded. A particular synchronization component takes the form of a reference signal comprised of a dozen or more 2D sinusoids of different frequencies and pseudorandom phases in the pixel (spatial) domain, which corresponds to a pattern or constellation of peaks of pseudorandom phase in the Fourier (spatial frequency) domain Such alternate representations of an illustrative reference signal are shown in FIG. 2A (pixel domain) and FIG. 2B (Fourier domain) As a matter of practice, this signal is commonly defined in the Fourier domain and is transformed into the pixel domain at a size corresponding to that of the watermark message block, e.g., 256×256 pixels. This pixel reference signal, which may comprise floating-point values between −1 and 1, can be magnitude-scaled to a range of −40 to 40. Such reference signal elements are then combined with corresponding elements of the 256×256 pixel payload block to yield a final watermark signal block, e.g., having values ranging from 55 (i.e., 95−40) to 201 (i.e., 161+40). For print applications such signal can then be summed with host imagery, after first scaling-down in magnitude to render the signal inconspicuous.

If such a watermark signal block is rendered at a spatial resolution of 300 dots per inch (DPI), a signal block of about 0.85 inches square results. Since the 0.85 inch side dimension corresponds to 128 waxels, this works out to 150 waxels per inch. (Naturally, other sizes can be employed, e.g., 75, 200, 300 and 750 waxels per inch, etc.) Such blocks can be tiled edge-to-edge for marking a larger surface—in some cases spanning an object completely.

The just-described watermark signal may be termed a "continuous tone" watermark signal. In print it is often characterized by multi-valued data, i.e., not being just on/off (or 1/0, or black/white)—thus the "continuous" moniker. Each pixel of the host content (or region within the host content) is associated with one corresponding element of the watermark signal. A majority of pixels in a host image (or image region) are changed in value by combination with their corresponding watermark elements. The changes are typically both positive and negative, e.g., changing the local luminance of the imagery up in one location, while changing it down in another. And the changes may be different in degree—some pixels are changed a relatively smaller amount, while other pixels are changed a relatively larger amount. Typically, the amplitude of the watermark signal is low enough that its presence within the image escapes notice by casual viewers (i.e., it is steganographic).

(Due to the highly redundant nature of the encoding, some embodiments can disregard pixel changes in one direction or another. For example, one such embodiment only changes pixel values in a positive direction. Pixels that would normally be changed in a negative direction are left unchanged. The same approach can be used with surface texturing, i.e., changes can be made in one direction only.)

In a variant continuous tone print watermark, the signal acts not to change the local luminance of artwork pixels, but rather their color. Such a watermark is termed a "chrominance" watermark (instead of a "luminance" watermark). An example is detailed, e.g., in U.S. Pat. No. 9,245,308.

"Sparse" or "binary" watermarks are different from continuous tone watermarks. They do not change a majority of pixel values in the host image (or image region). Rather, they have a print density (which may sometimes be set by the user) that typically results in marking between about 1% and 45% of pixel locations in the image. Adjustments are usually all made in the same direction, e.g., reducing luminance Sparse elements are commonly bitonal, e.g., being either white or black. Although sparse watermarks may be formed on top of other imagery, they are often presented in regions of artwork that are blank or colored with a uniform tone. In such cases a sparse marking may contrast with its background, rendering the marking visible to casual viewers. Although sparse marks can take the form of a field of seemingly-random dots, they can also take the form of line structures, as detailed elsewhere. As with continuous tone watermarks, sparse watermarks generally take the form of signal blocks that are tiled across an area of imagery.

A sparse watermark can be produced from a continuous-tone watermark in various ways. One is by thresholding. That is, the darkest elements of a continuous-tone watermark block (i.e., the summed reference signal/payload signal block) are copied into an output signal block until a desired density of dots is achieved. Such a watermark may be termed a thresholded binary watermark.

Patent publication US20170024840 details various other forms of sparse watermarks. In one embodiment, a watermark signal generator starts with two 128×128 inputs. One is a payload signal block, with its locations filled with a binary (0/1, black/white) enlarged scrambled payload sequence, as described above. The other is a spatial domain reference signal block, with each location assigned a floating point number between −1 and 1. The darkest (most negative) "x"% of these reference signal locations are identified, and set to black; the others are set to white. Spatially-corresponding elements of the two blocks are ANDed together to find coincidences of black elements between the two blocks. These elements are set to black in an output block; the other elements are left white. By setting "x" higher or lower, the output signal block can be made darker or lighter. Such a code may be termed an ANDed, or a Type 1, binary watermark.

Another embodiment uses a reference signal generated at a relatively higher resolution (e.g., 384×384 pixels), and a payload signature spanning a relatively lower resolution array (e.g., 128×128). The latter signal has just two values (i.e., it is bitonal); the former signal has more values (i.e., it is multi-level, such as binary greyscale or comprised of floating-point values). The payload signal is interpolated to the higher resolution of the reference signal, and in the process is converted from bitonal form to multi-level. The two signals are combined at the higher resolution (e.g., by summing in a weighted ratio), and a thresholding operation is applied to the result to identify locations of extreme (e.g., dark) values. These locations are marked to produce a sparse block (e.g., of 384×384). The threshold level establishes the dot density of the resulting sparse mark. Such a code may be termed an interpolated, or a Type 2, binary watermark.

A different embodiment orders samples in a block of a reference signal by value (darkness), yielding a ranked list of the darkest N locations (e.g., 1600 locations), each with an associated location (e.g., within a 128×128 element array). The darkest of these N locations may be always-marked in an output block (e.g., 400 locations, or P locations), to ensure the reference signal is strongly expressed. The others of the N locations (i.e., N-P, or Q locations) are marked, or not, depending on values of message signal data that are mapped to such locations (e.g., by a scatter table in the encoder). Locations in the sparse block that are not among the N darkest locations (i.e., neither among the P or Q locations) never convey watermark signal, and they are consequently affirmatively ignored by the decoder. By setting the number N larger or smaller, sparse marks with more or fewer dots are produced. This embodiment is termed the "fourth embodiment" in earlier-cited publication US20190332840, and may also be termed a Type 3 binary watermark.

In generating a binary (sparse) mark, a spacing constraint can be applied to candidate mark locations to prevent clumping. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the tile. As dark marks are added to the output block, corresponding data is stored in the data structure identifying locations that—due to the spacing constraint—are no longer available for possible marking.

A further variant of a binary mark is the so-called "connected binary" mark, which is detailed in patent publication US20210387399.

In some embodiments, the reference signal can be tailored to have a non-random appearance (in contrast to that of FIG. 2A), by varying the relative amplitudes of spatial frequency peaks, so that they are not all of equal amplitude. Such variation of the reference signal has consequent effects on the sparse signal appearance.

A sparse pattern can be rendered in various forms. Most straight-forward is as a seemingly-random pattern of dots. But more artistic renderings are possible, including Voronoi and Delaunay line patterns, and stipple patterns, as detailed in our patent publication US20190378235.

Other overt, artistic patterns conveying watermark data are detailed in patent publication US20190139176. In one approach, a designer creates a candidate artwork design or selects one from a library of designs. Vector art in the form of lines or small, discrete print structures of desired shape work well in this approach. A payload is input to a signal generator, which generates a raw data signal in the form of two-dimensional tile of data signal elements. The method then edits the artwork at spatial locations according to the data signal elements at those locations. When artwork with desired aesthetic quality and robustness is produced, it is applied to an object.

Other techniques for generating visible artwork bearing a robust data signal are detailed in assignee's patent publications US20190213705 and US20200311505. In some embodiments, a neural network is applied to imagery including a machine-readable code, to transform its appearance while maintaining its machine readability. One particular method trains a neural network with a style image having various features. (Van Gogh's The Starry Night painting is often used as an exemplary style image.) The trained network is then applied to an input pattern that encodes a plural-symbol payload. The network adapts features from the style image (e.g., distinctive colors and shapes) to express details of the input pattern, to thereby produce an output image in which features from the style image contribute to encoding of the plural-symbol payload. This output image can then be used as a graphical component in product packaging, such as a background, border, or pattern fill. In some embodiments, the input pattern is a watermark pattern, while in others it is a host image that has been previously watermarked.

Still other such techniques do not require a neural network. Instead, a continuous tone watermark signal block is divided into sub-blocks. A style image is then analyzed to find sub-blocks having the highest correlation to each of the watermark signal sub-blocks. Sub-blocks from the style image are then pieced together to produce an output image that is visually evocative of the style image, but has signal characteristics mimicking the watermark signal block. Yet another technique starts with a continuous tone watermark, divides it into sub-blocks, and combines each sub-block with itself in various states of rotation, mirroring and/or flipping. This yields a watermark block comprised of stylized sub-blocks that appear somewhat like geometrically-patterned symmetrical floor tiles.

Watermark reading has two parts: finding a watermark, and decoding the watermark.

In one implementation, finding the watermark (sometimes termed watermark detection) involves analyzing a received frame of captured imagery to locate the known reference signal, and more particularly to determine its scale, rotation, and translation.

The received imagery is desirably high-pass filtered so that the fine detail of the watermark code is maintained, while the low frequency detail of the item on which it is marked is relatively attenuated. Oct-axis filtering can be used.

In one oct-axis filtering arrangement, each image pixel is assigned a new value based on some function of the original pixel's value relative to its neighbors. An exemplary embodiment considers the values of eight neighbors—the pixels to the north, northeast, east, southeast, south, southwest, west and northwest. A summing function is then applied, summing a −1 for each neighboring pixel with a lower value, and a +1 for each neighboring pixel with a higher value, and assigns the resulting sum value to the central pixel. Each pixel is thus re-assigned a value between −8 and +8. (These values may all be incremented by 8 to yield non-negative values, with the results divided by two, to yield output pixel values in the range of 0-8.) Alternatively, in some embodiments only the signs of these values are considered—yielding a value of −1, 0 or 1 for every pixel location. This form can be further modified to yield a two-state output by assigning the "0" state, either randomly or alternately, to either "4" or "1." Such technology is detailed in Digimarc's U.S. Pat. Nos. 6,580,809, 6,724,914, 6,631,198, 6,483,927, 7,688,996, 8,687,839, 9,544,516 and 10,515,429. (A variant filtering function, the "freckle" transform, is detailed in U.S. Pat. No. 9,858,681. A further variant, "oct-vector," is detailed in pending patent application Ser. No. 16/994,251, filed Aug. 14, 2020.)

A few to a few hundred candidate blocks of filtered pixel imagery (commonly overlapping) are selected from the filtered image frame in an attempt to identify one or more watermarked items depicted in the image frame. (An illustrative embodiment selects 300 overlapping blocks.) Each selected block can have dimensions of the originally-encoded watermark block, e.g., 64×64, 128×128, 256×256, etc., or it may be larger or smaller We focus on the processing applied to a single candidate block, which is assumed to be 128×128 pixels in size.

To locate the reference signal, the selected pixel block is first transformed into the Fourier domain, e.g., by a Fast Fourier Transform (FFT) operation. If a watermark is present in the selected block, the reference signal will be manifested as a constellation of peaks in the resulting Fourier magnitude domain signal. The scale of the watermark is indicated by the difference in scale between the original reference signal constellation of peaks (FIG. 2B), and the constellation of peaks revealed by the FFT operation on the received, filtered imagery. Similarly, the rotation of the watermark is indicated by the angular rotation difference between the original reference signal constellation of peaks (FIG. 2B), and the constellation of peaks reveals on the FFT operation on the received, filtered imagery.

A direct least squares, or DLS technique is commonly used to determine these scale and rotation parameters, with each of a thousand or more candidate, or "seed," affine transformations of the known reference signal being compared to the magnitude data from the FFT transform of the input imagery. The parameters of the one or more seed affine transforms yielding FFT magnitude data that most nearly matches that of the block of filtered input imagery are iteratively adjusted to improve the match, until a final scale/rotation estimate is reached that describes the pose of the reference signal within the analyzed block of imagery.

Once the scale and rotation of the watermark within the received image block are known, the watermark's (x,y) origin (or translation) is determined. Methods for doing so are detailed in our U.S. Pat. Nos. 6,590,996, 9,959,587 and 10,242,434 and can involve, e.g., a Fourier Mellin transform, or phase deviation methods. (The just-noted patents also provide additional detail regarding the DLS operations to determine scale and rotation; they detail decoding methods as well.)

Once known, the scale, rotation and translation information (collectively, "pose" information) establishes a spatial relationship between waxel locations in the original 128×128 watermark signal block, and corresponding locations within the filtered image signal block. That is, one of the two signal blocks could be scaled, rotated and shifted so that each waxel location in the watermark signal block is spatially-aligned with a corresponding location in the image block.

Next, the captured image data is resampled in accordance with the just-determined pose information to determine image signal values at an array of 128×128 locations corresponding to the locations of the 128×128 waxels. Since each waxel location typically falls between four pixel locations sampled by the camera sensor, it is usually necessary to apply interpolation (e.g., bilinear interpolation) to obtain an estimate of the image signal at the desired location, based on the values of the nearest four image pixels. The known reference signal has served its purposes at this point, and now just acts as noise, so it can be subtracted if desired. Oct-axis filtering is again applied to the resampled image data. This yields a 128×128 waxel-registered array of filtered image data. The watermark payload is then decoded.

In particular, the watermark decoder examines the mapped locations for each of the 16 chips corresponding to a particular bit of the scrambled signature, and inverts each filtered image value—or not—in accordance with a corresponding element of the earlier-applied XOR spreading carrier. The resulting 16 values are then summed—optionally after each is weighted by a linear pattern strength metric (or grid strength metric) indicating strength of the reference signal in the watermark sub-block from which the value was sampled. (Suitable strength metrics are detailed in U.S. Pat. Nos. 10,217,182 and 10,506,128.) The sign of this sum is an estimate of the scrambled signature bit value—a negative value indicates −1, a positive value indicates +1. The magnitude of the sum indicates reliability of the estimated bit value. This process is repeated for each of the 1024 elements of the scrambled signature, yielding a 1024 element string. This string is descrambled, using the earlier-applied scrambling key, yielding a 1024 element signature string. This string, and the per-bit reliability data, are provided to a Viterbi soft decoder, which returns the originally-encoded payload data and CRC bits. The decoder then computes a CRC on the returned payload and compares it with the returned CRC. If no error is detected, the read operation terminates by outputting the decoded payload data, together with coordinates—in the image frame of reference (e.g., its center, or its upper right corner "origin")—at which the decoded block is located. The payload data can then be passed to the database to acquire corresponding item attribute metadata. The coordinate data and metadata needed for sorting are passed to a sorting logic (diverter) controller. Metadata not needed for sorting but logged for statistical purposes are passed to a log file.

In some embodiments, pose parameters are separately refined for overlapping sub-blocks within the 128×128 waxel block. Each waxel may fall into, e.g., four overlapping sub-blocks, in which case there may be four interpolated, filtered values for each waxel, each corresponding to a different set of pose parameters. In such case these four values can be combined (again, each weighted in accordance with a respective grid strength metric), prior to inversion—or not—in accordance with the corresponding element of the earlier-applied XOR spreading carrier.

Relatedly, once pose parameters for the image block are known, surrounding pixel data can be examined to see if the reference signal is present there too, with the same or similar pose parameters. If so, additional chip information can be gathered. (Since the watermark block is typically tiled, chip values should repeat at offsets of 128 waxels in vertical and horizontal directions.) Chip values from such neighboring locations can be weighted in accordance with the grid strength of the sub-block(s) in which they are located, and summed with other estimates of the chip value, to gain still further confidence.

The just-described accumulation of chip data from beyond a single watermark block may be termed intraframe signature combination. Additionally, or alternatively, accumulation of chip or waxel data from the same or corresponding locations across patches depicted in different image frames can also be used, which may be termed interframe signature combination.

In some embodiments, plural frames that are captured by the camera system, e.g., under different illumination conditions and/or from different viewpoints, are registered and combined before submission to the detector system.

In print, the different values of watermark elements are signaled by ink that causes the luminance (or chrominance) of the substrate to vary. In texture, the different values of watermark elements are signaled by variations in surface configuration that cause the reflectance of the substrate to vary. The change in surface shape can be, e.g., a bump, a depression, or a roughening of the surface.

Such changes in surface configuration can be achieved in various ways. For mass-produced items, molding (e.g., thermoforming, injection molding, blow molding) can be used. The mold surface can be shaped by, e.g., CNC or laser milling (etching), or chemical etching. Non-mold approaches can also be used, such as forming patterns on the surface of a container by direct laser marking.

Laser marking of containers and container molds is particularly promising due to the fine level of detail that can be achieved. Additionally, laser marking is well-suited for item serialization—in which each instance of an item is encoded differently.

One application of serialization is to identify reusable bottles that are submitted for refilling, e.g., by a drink producer. After a bottle has been refilled, e.g., 20 times, it can be retired from service. See, e.g., patent publication US20180345326.

More generally, watermark serialization data can be used to help track individual bottles and other items of packaging through their respective lifecycles, from fabrication to recycling/re-use, and to provide data that makes possible an incentive system—including refunds of fees and rebates of taxes—to help encourage involvement by the many different participants needed to achieve the vision of a circular economy (e.g., bottle producers, brands, distributors, retailers, consumers, waste collection companies, material recovery facilities, recyclers, extended producer responsibility organizations, etc.).

In addition to the references cited elsewhere, details concerning watermark encoding and reading that can be included in implementations of the present technology are disclosed in applicant's previous patent filings, including U.S. patent documents U.S. Pat. Nos. 6,985,600, 7,403,633, 8,224,018, 10,958,807, and in pending patent application Ser. No. 16/823,135, filed Mar. 18, 2020.

Further information about thermoforming (molding) of plastic items is detailed in U.S. patent application Ser. No. 17/347,358, filed Jun. 14, 2021. Further information about injection molding is detailed in U.S. patent application 63/154,394, filed Feb. 26, 2021. Further information about laser marking of containers (which technology is also applicable to laser marking of molds) is detailed in U.S. patent application Ser. No. 17/339,711, filed Jun. 4, 2021.

Robustness Improvements

Since objects on the conveyor belt can be soiled, crumpled, and/or overlay each other, it may be difficult to extract watermark data. In particular, such phenomena tend both to attenuate the strength of desired reference and payload signals, and to increase noise signals that can interfere with detection and reading of these desired signals. Various techniques can be used to increase the probability of reading the watermark data in such circumstances.

One technique is to disregard certain frames of imagery (or certain excerpts of certain frames of imagery) and to apply the computational resources that might otherwise be applied to such imagery, instead, to more intensively analyze other, more promising frames (or excerpts) of imagery. This technique can be used, e.g., when some or all of the belt depicted in a captured image is empty, i.e., it does not depict a waste item.

Time and computational resources that are saved by disregarding certain imagery can be applied to more intensively attempt to detect a watermark signal in remaining imagery, e.g., through detection of the reference signal. For example, candidate 128×128 blocks of pixels (or waxels) may be more densely selected within the remaining imagery and analyzed for reference signal. Additionally or alternatively, a different (e.g., enlarged) set of DLS seed affine transforms can be employed, trying to find a reference signal at poses not specified by a usual selection of seeds.

Still further, resources that are saved by disregarding certain imagery can be applied towards payload decoding efforts, rather than towards the reference signal detection operations.

For example, if a reference signal is detected in several nearby (e.g., overlapping) 128×128 blocks, watermark decoding may normally be attempted on only one of the blocks. In a particular embodiment, the image frame is divided into eight sub-parts, and only one decode is attempted in each sub-part—based on the image block with the strongest grid strength metric. However, if extra processing time is available because not all of the frame merits analysis (due to parts of the imaged belt being empty), the watermark decoding can be applied to two or more such blocks, to increase the chances of successful watermark extraction.

In some embodiments, additional processing time is employed to attempt combining waxel data sampled from two or more different regions of a frame (or from different frames) to decode a single watermark payload. Such operation may not normally be undertaken, due to the short interval within which all frame processing must be completed. But with additional time (e.g., gained because not all of the image merits processing), such intraframe or interframe processing can be attempted.

Such processing assumes that the watermark reference signal has been detected in each such region, revealing the poses with which the waxel payload data is presented in the respective excerpts. Before combining waxel data from such excerpts, a check should be made that the two regions depict surfaces of the same item. (As noted, watermark data is typically encoded in redundant, tiled fashion across the surface of an object, so waxel data from different tiles can be combined. But only if the tiles are known to be from the same item.)

The foregoing and other more intensive efforts can be made at watermark signal recovery (as further detailed, e.g., in US patent publication 20210299706) if computational resources are available due to part of the belt being empty and not warranting watermark analysis.

A belt that is vacant across its width can be detected by simple photo-emitter/photo-detector pairs that send light beams across the belt (a "breakbeam" arrangement). If the beam is received on the far side of the belt with its full strength, it is highly unlikely that there is an intervening object on the belt. A related arrangement projects a pattern of laser lines on the belt, e.g., using a rotating mirror arrangement. A camera-captured image of the laser-illuminated belt reveals occupied portions of the belt by variation of the lines from their originally-projected configuration. These and other methods for determining belt occupancy (vacancy) are further detailed in our patent publications, including US 20210299706.

Instead of using a rotating mirror to project one or more laser lines on a belt, an alternative arrangement employs a passive optical diffuser, excited with a stationary laser beam. Various kinds are known, including light shaping diffusers (which typically employ non-periodic, random structures, and are thus not wavelength-dependent), and diffractive diffusers (which employ periodic structures and are typically wavelength dependent). Depending on configuration, such elements can produce a single line, or multiple lines, or any other engineered pattern (e.g., a matrix of dots). Light shaping diffusers are available, e.g., from Luminit LLC, of Torrance, CA, and Bright View Technologies Corporation, of Durham, NC Diffractive gratings and lenses are widely available.

Commercial off-the-shelf systems that project desired laser light patterns can also be used. An example is the Laser Grid GS1 by Ghost Stop LLC (St Cloud, FL), which produces a grid of perpendicular lines. Another is the GLL30 Laser Leveler by Robert Bosch Tool Corporation, which projects two laser lines that are perpendicular to each other. Yet another approach is to excite a cylinder lens with a laser beam, producing a projected line. Suitable cylinder lenses are available, e.g., from Laser Tools Co., Inc., and Edmunds Scientific. By exciting a cylinder lens with a light curtain of spaced-apart laser beams (such as the Keyence GL-R series of safety light curtains), an array of lines can be projected across a conveyor belt.

In a particular arrangement, one or more red laser lines are projected parallel to an edge of the watermark-reading camera field of view—the edge through which new items are introduced into the image frame by the conveyor. This edge region with the laser line(s) may be a centimeter or two in narrow dimension, and as wide as the camera field of view. By analyzing depiction of the projected line(s) in a captured image frame, the system can determine whether an item is newly-introduced into the image frame, and its location along the belt width dimension. For example, if the line is displaced along part of its length, this indicates an item is intercepting the laser light before it hits the dark belt in this part. Even if the line is not displaced, if the intensity of the line as viewed by the camera changes beyond a threshold value, this indicates that a flat object (e.g., a lid) is lying on the belt and changing the reflectance. If the laser line appears unchanged in position and intensity (within an empirically-determined threshold tolerance) in the current frame, as compared with a previous frame, this indicates this region of belt is empty, and such region of the belt can be omitted from watermark reading efforts. (And such region can likewise be omitted from watermark reading efforts in successive frames, as that region of belt advances across the field of view for multiple following frames.)

Naturally, the laser illumination in such arrangements should be strong enough to be detectable in the camera imagery despite the strong illumination applied during frame captures by other light sources. If LED illumination of different colors is cyclically-applied for watermark reading, then the thresholds noted in the preceding paragraph can vary in accordance with the color of illumination being applied in the current frame capture.

In a related embodiment, a laser triangulator is positioned to monitor the belt along the entrance edge of the watermark reading camera field of view, indicating the presence—and shape—of items entering the field of view. Laser triangulators are available, e.g., from Acuity Laser (Schmitt Industries) and from MTI Instruments, Inc.

In still other embodiments, a depth sensing camera is used to image the belt and produce a depth map image from which occupied and empty regions of the belt can readily be distinguished. Such arrangements are further detailed, e.g., in publication US20210299706.

The just-cited publication also details fingerprint-based techniques to identify which parts of a conveyor belt are empty and which are occupied. In fingerprint (or "belt-tracking") methods, newly-captured imagery is compared (e.g., by correlation) against imagery collected from that part of the belt during in one or more previous belt cycles. If the strip (or block) of belt currently being imaged by the camera looks like that strip (block) on a previous cycle, then that strip of belt is apparently empty.

Figure 3:
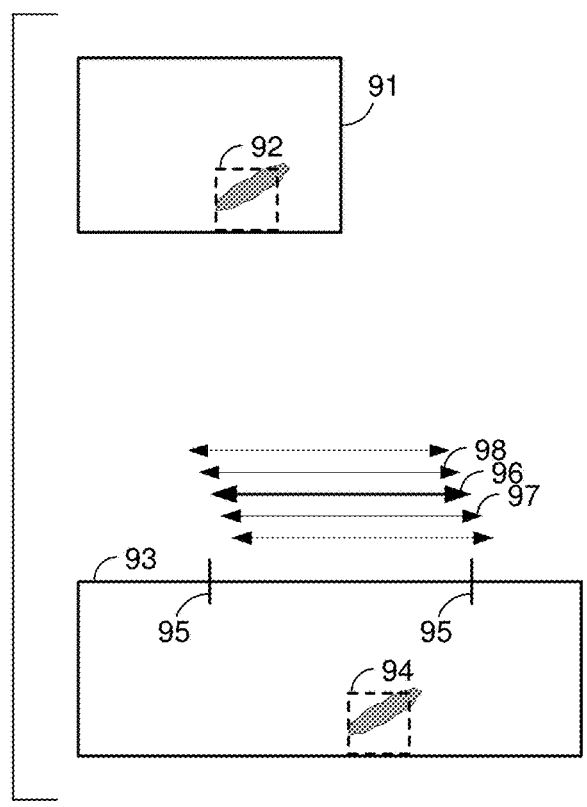
FIG. 3 illustrates how newly-captured belt imagery can be correlated against previously-captured belt imagery to identify an empty region of belt.

An illustrative arrangement is shown illustrated in FIG. 3. A newly-captured captured image frame 91 depicts a dark region, in an area 92. A dozen or so proximate images of the belt were collected during one or more previous cycles of the belt, and their image data was collected into a map dataset (here shown as a panorama image 93 for convenience) depicting nearby areas of the belt. Included in the map dataset 93 is an area 94 depicting a region of the same shape and appearance—apparently a marking on the belt that re-appears cyclically. (A conspicuous marking is shown for illustrative convenience. More typically, belt markings are less conspicuous, but are still sufficiently distinctive to uniquely identify a particular excerpt of belt.)

The imagery from the captured block 92 is correlated against imagery in the map dataset 93 at a variety of spatial alignments (e.g., spaced apart by one pixel), as represented by the double-ended arrows. One alignment (indicated on a frame-basis by the vertical hash marks 95) yields a peak correlation value. If this value is above a threshold value, the newly-captured image data is not regarded as depicting new waste items, but rather is classified as depicting something seen before—the belt. Such area of the newly-captured image frame 91 is consequently flagged as empty.

The correlation value may be regarded as a match metric—indicating likelihood that the area of belt being analyzed is empty. The metric may be refined by considering how "peaky" the peak correlation is. That is, whether the peak correlation is substantially above neighboring correlation values, or whether it is only modestly above. In one scenario, the peak correlation value may be 0.9 (shown at the spatial alignment indicated by arrow 96 in FIG. 3), and the correlation value at an adjoining correlation (e.g., offset by one pixel, indicated by arrow 97) may be 0.6. In a second scenario the peak correlation value may again be 0.9, but the adjoining correlation may be 0.2. The latter correlation is more "peaky" than the former because the difference in adjoining correlation values is larger. This latter scenario is more strongly indicative of an empty area of belt.

In a particular embodiment, the peak correlation value is combined with the difference between the peak correlation value and the adjoining correlation value. One suitable combination is a weighted sum, with the peak correlation value given a weighting of 1.0, and the difference being given a weighting of 0.5. In such case the former scenario results in a match metric of 0.9+0.5(0.3)=1.15. The latter scenario results in a match metric of 0.9+0.5(0.7)=1.35. If the threshold is 1.25, then the image area in the latter scenario is flagged as empty, whereas the image area in the former scenario is not (and thus is eligible for analysis to identify watermark data).

In a further refinement, the peak correlation is compared against two adjoining correlation values (i.e., correlations indicated at both spatial alignments 97 and 98 in FIG. 3), and the larger difference is used in the weighted combination. If correlations are performed at offsets across the belt, not just along its length, then there may be four adjoining correlation values. Again, the larger of the resulting differences can be used in the weighted combination.

In some embodiments, successive image frames of the belt are captured under different spectral illumination (e.g., blue, red, or infrared). Belt features that are visible with one illumination may be invisible with another. Groups of several (e.g., two or three) successive frames taken under different illumination spectra can be spatially-registered and combined to yield a composite greyscale image frame. A new composite frame may be produced as each new frame is captured—with the new frame replacing the oldest component frame in the earlier map dataset. In such a dataset no belt feature is likely to remain invisible. (The differently-illuminated frames may be given equal weightings to form the composite frame, or differently-illuminated frames may be assigned different weights. Spatial registration can be performed on the basis of feature matching.

In still another embodiment, the belt can be dyed, pigmented or painted to effect narrowband absorption at a particular wavelength, e.g., of blue light. Any region of belt that exhibits such absorption in captured imagery (e.g., appearing black under blue illumination) is a vacant region of belt.

While time is one computational resource that can be reallocated if empty belt imagery is detected, there are others, such as memory and processor cores (more generally, hardware resources). By being able to allocate hardware resources away from where they are not needed to where they are, faster and better results may be obtained.

In addition to belt emptiness, another circumstance in which computational resources can be conserved is when the item occupying a region of belt is known to not need (further) watermark processing. This can happen because, at the high frame rates typically involved, there may be a dozen or so images depicting each item as it passes across the camera field of view—each depiction being advanced about 1 cm from the previous depiction. If a watermark is read from an item in one frame, and the item will be depicted in the next ten frames too, that the region occupied by that item can be ignored while the location of such region steps linearly across the following frames. (Additionally or alternatively, blocks adjoining that region can be analyzed in subsequent frames to discover the extent of the watermarking, and thus learn more information about the extent of the item. Such analysis can be shortcut since pose data from the earlier watermark read is a starting point for estimating pose data for watermark reads in subsequent frames—again conserving processing resources, enabling other regions to be more intensively analyzed.)

Yet other techniques to identify vacant and occupied regions of a belt are detailed in our patent 10,958,807.

More on Belt Tracking and Analysis Block Placement

Incoming belt imagery from the camera(s) can be compared against a map store of historical belt imagery for two purposes. One is to determine sync, i.e., to identify what part of the belt is presently being imaged. The other is to determine occupancy, i.e., to identify areas of the belt that are occluded by the presence of items on the belt, and thus merit image analysis.

In a particular embodiment, such comparison takes the form of cross correlation between pairs of square image blocks—one block from map data compiled during one or more earlier cycles of the belt, and one block from the just-captured image frame. The blocks from the map data can each have a height that corresponds to the nominal distance traveled by the belt between successive frames, e.g., 72 pixels. This imagery is down-sampled, e.g., by two, prior to correlation, yielding 36×36 pixel blocks. In contrast, the blocks from the new image frame are taken from the edge of the camera frame depicting newly-entering belt, and are 120 pixels in height before downsampling by two, yielding 60×60 pixel blocks. The difference in block sizes provides a vertical cross-correlation output space that is 25 pixels high (a central row of pixels, with offsets of 12 pixel rows on either side). The 2D alignment of blocks that yields the highest correlation indicates sync. (A test can first be applied to check that the highest correlation is above a threshold value.) The correlation value of each pair of blocks at this sync'd alignment can be used to indicate whether the matching 72×72 block of the stored map data is occupied by an item or not, i.e., non-belt or belt. (Again, a threshold test can be applied to discriminate the two classifications.)

In an illustrative embodiment, determination of sync involves assessing correlation results based on multiple blocks arrayed along the belt-entering edge of the camera frame. For some blocks, the correlation is low because such blocks depict objects, not belt that matches the belt map. Accordingly, blocks lacking a distinctive "peaky" correlation, as noted above, are disregarded as outliers when determining sync.

When a new row of 72×72 pixel blocks is captured from the conveyor, each block is assessed as being belt or non-belt. Any block in the new row that is identified as non-belt is checked to determine if it is edge- or corner-adjoining to a non-belt block in the preceding row. If so, the new block is tagged with a label associating it with the earlier non-belt block(s). That label can be an object identifier assigned to the adjoining non-belt block in the previous row. If a non-belt block in the new row is not found to adjoin any non-belt block in the previous row, it is assigned a new label (object identifier). If there are two or more such adjoining non-belt blocks in the new row, then they are assigned the same new label. By such arrangement, a region-growing process (algorithm) serves to identify clumps of adjoining non-belt blocks, and labels them all with the same identifier. These labeled entities are then regarded as individual items on the belt, e.g., for identification and ejection purposes. (An exception is if the clump is assessed to comprise two or more overlapping items, as discussed further below.)

In some recycling systems there are plural cameras spaced across the belt, to image the belt's full width. Image data from these cameras can be stitched together to yield a single composite image spanning the full belt. Such images are generated at the cameras' frame rate, e.g., of 300 frames per second. The stitching can make use of known techniques, such as keypoint matching. However, since the placement and relative geometries of the cameras are fixed, the pixel locations at which fields of view of adjacent cameras overlap can be determined during initial setup, and can thereafter be used to stitch together composite imagery without any image analysis. Such composite images can be used both in determining sync, and in determining occupancy.

In a variant arrangement, image data from the cameras is not combined. Rather, imagery from each camera is handled separately, both in determining sync and in determining occupancy. In a correlation-based belt tracking arrangement, a belt map dataset is compiled for each of the plural cameras—mapping the strip of belt viewed by that camera.

In embodiments that illuminate the belt with different spectra of illumination in different frames, a separate map can be compiled for each of the spectra. Thus, in an arrangement with five cameras spanning the belt, which captures imagery in successive frames illuminated by blue, red and infrared LEDs, respectively, fifteen different maps of belt data can be compiled, and used in the arrangements detailed herein.

In some embodiments (e.g., correlation-based belt tracking arrangements), a filter can be applied to the image data before compiling map data and performing the correlations. Several advantages may then accrue. For example, if a Laplacian filter is used, it serves to accentuate high frequencies. Cross-correlation of the filtered image data then yields sharper peaks, yielding better results. Relatedly, images of the belt often have much edge information that can be exploited for correlation, whether from vertical streaks that are present, or from spots on the belt. The Laplacian filter is very efficient at extracting edge information. Still further, the high frequency response of the Laplacian filter aids immunity to spatial lighting variations, which are of low frequency. This can allow use of simple cross-correlation, instead of normalized cross-correlation, which is otherwise used to cope with such variations. A suitable 3×3 Laplacian filter kernel is shown in the process flow diagram of FIG. 4. Other such filters can naturally be used.

As noted, correlation between new image data and map image data can serve as the basis for a match metric. Such a metric can also take into consideration other factors, including those discussed herein and in cited publications US20190306385, US20210299706 and US20220055071. These include the luminance mean, standard deviation, and/or variance of one or more regions of image data. These regions can be tiled areas in the belt map that are used in classifying belt/not-belt.

In evaluating candidate matches between the camera data and a region of map data, two measures of match can then be considered. One is the (peaky) correlation between the paired blocks of camera data and map data, as described above. The second is the match between the image statistic(s) derived from the current frame and the image statistic(s) for the region of map data being evaluated, e.g., expressed as the smaller as a percentage of the larger. (If multiple tiled blocks are used, the average of their respective statistics can be employed in determining the match.) The two values can then be combined to yield a final match metric.

One such combination is a weighted sum of the two components, with the correlation value being weighted 1.0, and the statistic match being weighted 0.6. In an exemplary case, the correlation value for one candidate map match location may be 0.9, and the associated statistic match value may be 0.6, yielding a match metric of 0.9+0.6*0.6, or 1.26. The correlation value for another candidate match map location may be 0.85, and the associated statistic match value may be 0.8, yielding a match metric of 0.9+0.6*0.8, or 1.38. In such case, the latter match metric is larger, indicating the second map match location is the more reliable. (The given weightings are exemplary, not limiting. Suitable weightings can be determined empirically; usually the correlation value is given greater weight.)

In determining the position of belt presently being viewed by a camera, within the pixel frame of reference of the stored map data, the match metric derived from the just-acquired frame of image data can be used by itself. Alternatively, a weighted average of such sync determinations from several recent frames can be used, with the most recent determination being given the greatest weight. In a further embodiment, the sync determination from the most recent frame is used to update a Kalman filter that provides an estimated location that takes into account recent dynamic system behavior.

Once sync has been determined, classification of map blocks as belt/non-belt is performed. In a particular embodiment, for each individual block, we determine 5×5 array of different cross-correlation values around the determined sync alignment, and find the maximum and minimum cross-correlation values among these 25 different alignments. Around the maximum cross-correlation we perform a 2D parabolic interpolation to find an interpolated maximum cross-correlation value (which is typically at a sub-pixel alignment). We do likewise around the minimum cross-correlation to find an interpolated minimum cross-correlation value. If the difference between the interpolated maximum and the interpolated minimum correlations is greater than a threshold, such as 0.25, this is regarded as a peaky correlation and the block is classified as empty (belt). (One characteristic of doing correlation on Laplacian filtered images is that there is almost always an extreme minimum peak near the maximum peak. This characteristic is exploited in the just-described classification test.)

Belt startup can be handled in various ways. One is to start with an empty belt, and accumulate map data while checking incoming data against the map data accumulated so-far, looking for a match metric above a threshold value, which signals that the belt has completed a full cycle and the map data is complete. Tracking of the belt then begins. Another is to start with previously-acquired map data, and to determine the best match between the current frame and this previously-acquired map data, to thereby identify the current position of the belt; tracking then begins immediately. Another is similar, but only checks incoming camera data against the start of the previous map data. Once a match with the start of the map is found, tracking begins. In all such cases the speed of the belt can be sensed, e.g., by determining the advance of the image data, in pixel rows over a series of frames captured at a known rate (e.g., 300 fps). Keypoint detection can be employed, to identify corresponding points in belt images separated by one or more frame intervals.

Sometimes appearance of the belt can change substantially, quickly. This can occur, for example, if a liquid is applied to some or all of the belt, deliberately (e.g., by the operator, to rinse the belt), or due to liquid spillage from a container on the belt, darkening its appearance. In this case the system may identify the wet portion(s) of the belt as non-empty, triggering analysis of the captured imagery. (This is a better failure mode than the opposite, in which a wet belt causes image analysis to be skipped.)

Such a sudden change in belt appearance can be detected by a deviation in one or more system parameters. One such parameter is the average fraction of belt area identified as occupied by items. If the belt is normally 20% occupied, and 80% occupancy of a one-meter length of belt is detected less than once for every 10,000 meters of belt, then this 80% occupancy value can be a suitable threshold by which to sense a changed belt. When such a change is sensed, the system can store the camera data gathered from the changed area (a thousand or more frames may be routinely cached to enable such functionality), and perform cross-correlation between it and imagery gathered during the next cycle of the belt. If correlation above a threshold is found, indicating a recurrence of the same appearance of belt, the map data can be updated with the camera imagery that is found to recur.

Another such system parameter (image statistic) whose change can indicate a change in belt appearance is the frequency with which a particular area on the belt (e.g., a 72×72 pixel region) is concluded to be occupied. If a given area is found, e.g., in five out of six successive cycles of the belt, to be occupied, and thus exhibits a low correlation with stored map data for that region, then this can trigger a map updating operation. In such operation, imagery of that area from one cycle of the belt is correlated with imagery of that area from a prior cycle of the belt and, where a threshold correlation value is exceeded, the current imagery of the area replaces the previous imagery for that area in the map.

In a particular embodiment, the system maintains a statistic counter for each 72×72 pixel area of the belt, indicating the number of times that such area was determined to be occupied in the last N cycles of the belt (where N is typically in the range of 5-10, but may be larger or smaller). If the count for any area exceeds a threshold value (e.g., 5 out of 6 in the example just-given), then a map updating operation for that area is triggered. (Such embodiment can cache the most recent cycle of belt imagery to facilitate correlation of current camera imagery with previous camera imagery. As before, when correlation (or related metric) between current imagery and previous cycle imagery yields a value above a threshold, this indicates the current camera imagery likely depicts empty belt, and such imagery—or the cached imagery from the prior cycle—can be written into the map store.)

In still another embodiment, the system can cache imagery from multiple complete cycles of the belt (e.g., five)—distinct from the stored map data. If an excerpt of new camera data is judged, by correlation against the stored map data, to indicate occluded belt, then such imagery can be further checked against cached imagery of that region of belt during multiple previous belt cycles. If correlation above a threshold value is found with any of the cached versions, this indicates that the new camera data does not depict occluded belt, but rather that the belt has changed. In such case, the new camera data is used to overwrite corresponding image data in the stored map data for that region.

If the belt is relatively featureless, some cameras may be unsure in their determination of sync. (Here and elsewhere, we speak of cameras performing an operation when, in actual practice, such action is performed by one or more processors operating on image data from the cameras. Such form of reference is understood by artisans.) A change in sync, such as by a momentary slipping of the belt on the drive mechanism, may not quickly be detected by an individual camera, if there is no distinct feature in the field of view by which position can be confidently assessed. To guard against this circumstance, the cameras may share information—reporting to each of the others where they think they are along the length of the belt, and optionally including an assessment of their confidence in such determination (e.g., the cross-correlation value on which the determination of current position is based). The two edges of the belt frequently have more visible features (e.g., image gradients) than central regions of the belt, due to manufacturing artifacts, and wear against both the drive system and edge guards. Thus, a camera imaging the edge of the belt may make a more confident determination of belt position (sync) than other cameras (i.e., by a more peaky correlation). This more confident sync value may be used by other cameras in preference to the sync data they derive themselves. (Such sync information enables identification of a subset of the map data against which correlation is performed, rather than requiring a brute force correlation against the entirety of the stored map data.)

Figure 4:
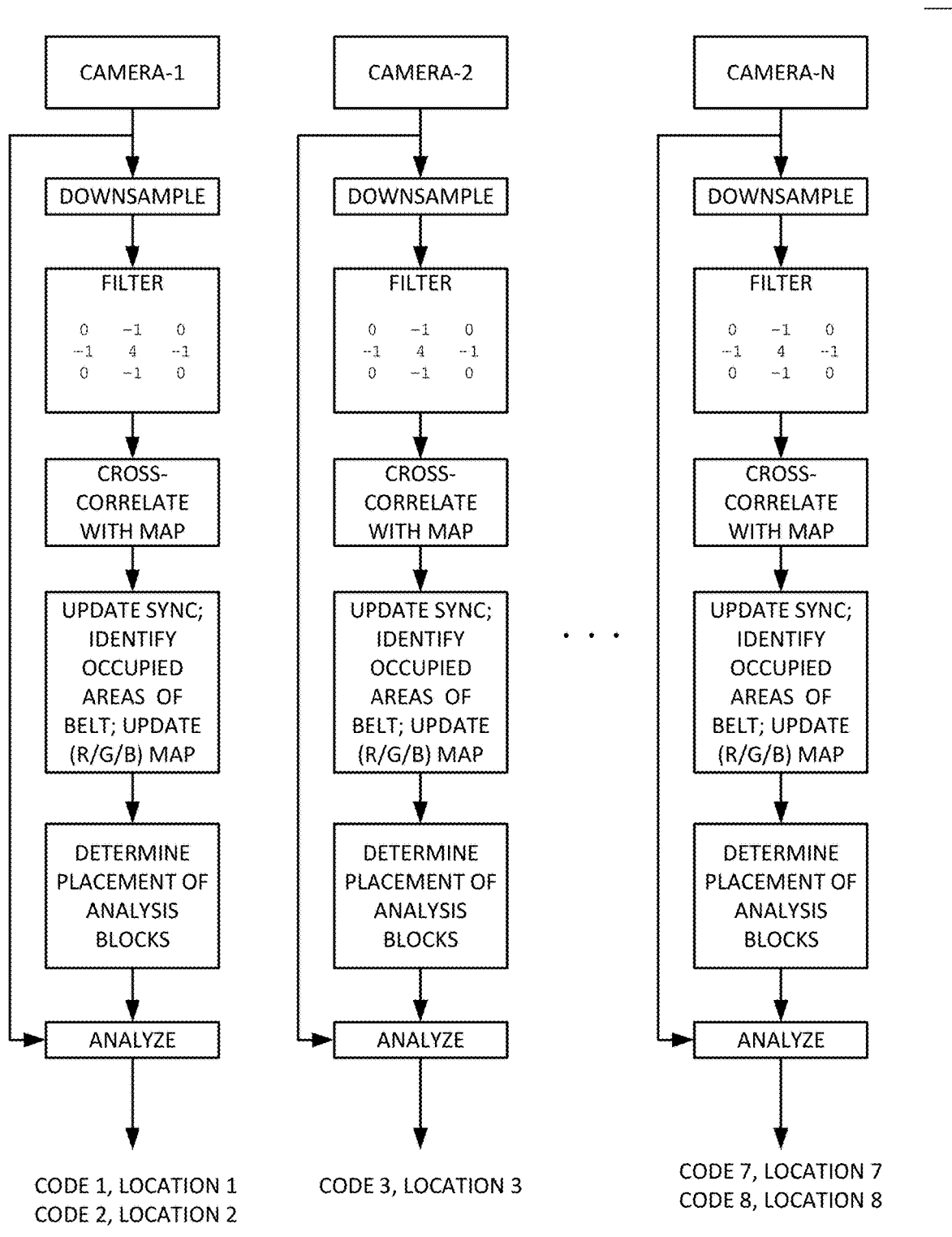
FIG. 4 is a diagram illustrating certain features of an embodiment incorporating aspects of the technology.

Aspects of the foregoing are shown in FIG. 4. Each of plural cameras captures sequential images of the belt, under different illumination colors. Cross correlation is applied to down-sampled, filtered imagery to determine sync and to determine occupancy. The belt map (for each of red, green and blue illumination) is updated as needed. Analysis blocks are identified and analyzed. Any decoded payload information is then output, together with data indicating the location(s) (in the {x,y} coordinate system of the belt) from which watermark payload data was extracted.

As noted previously, the watermark reading system has a finite capacity to analyze belt imagery, and this capacity is applied where it is expected to be most successful. In a particular embodiment, there may be a budget of 16 blocks of imagery (each 128×128 pixels) that the system can analyze within the interval of a given camera frame. (More typically this value is a hundred or more, but a smaller number facilitates explanation.)

Figure 5:
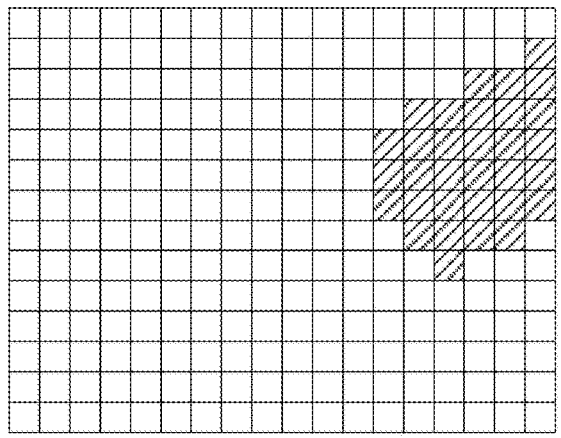
FIG. 5 shows pixel blocks identified as non-belt.

FIG. 5 explains how this can be done. The figure depicts a frame of imagery that has been virtually segmented into square areas of 72×72 pixels, and each has been classified as depicting belt, or not-belt. 32 areas have been classified as depicting not-belt, and are cross-hatched in FIG. 5. We take this number, multiply by the number of pixels in each block (4900), and divide by our budget of blocks that can be analyzed (16). Taking the square root of the result yields a value (99 pixels) that indicates the step size by which analysis blocks are placed across the image frame.

Figure 6:
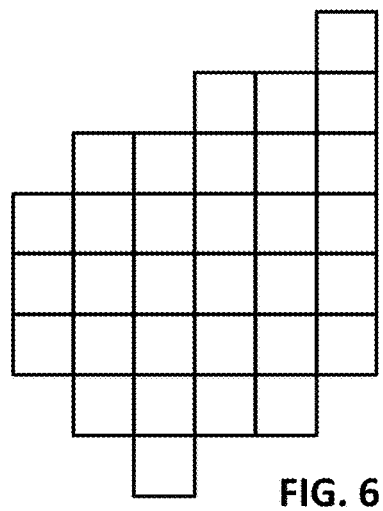
FIG. 6 is an excerpt from FIG. 5.

FIG. 6 is an enlargement of FIG. 5, showing only the 72×72 pixel areas that have been classified as non-belt.

Figure 7:
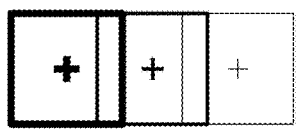
FIGS. 7 and 8 show analysis blocks arrayed in overlapping fashion.
Figure 8:
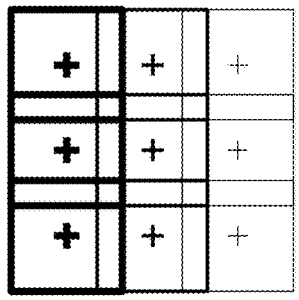

FIG. 7 shows an array of image analysis blocks, each of size 128×128 pixels, arrayed horizontally with a step size of 99 pixels. (Successive blocks are shown with lighter lines to aid image understanding.) The center of each analysis block is marked with a "+". FIG. 8 is similar, but the analysis blocks are shown arrayed in two dimensions with horizontal and vertical step sizes of 99 pixels.

Figure 9:
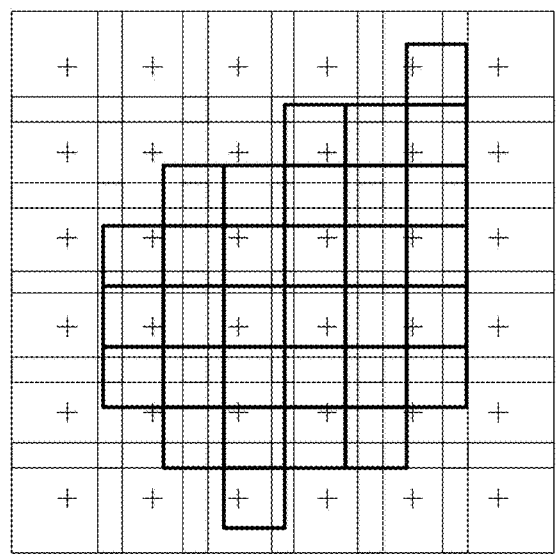
FIG. 9 shows pixel blocks of FIG. 6 overlaid by an array of overlapping analysis blocks.
Figure 10:
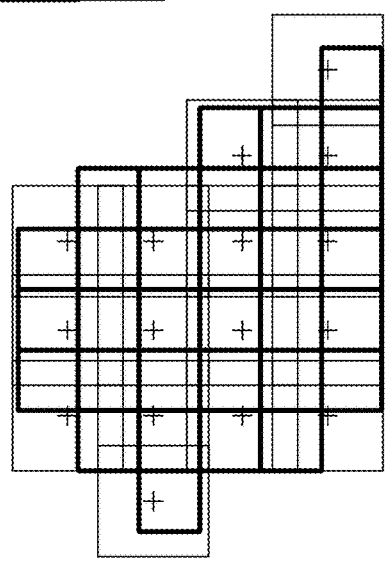
FIG. 10 is an excerpt from FIG. 9.

The arrayed analysis blocks of FIG. 8 are placed over the captured imagery, including the non-belt areas, as shown in FIG. 9. (The starting point is not critical.) Those image analysis blocks whose centers fall within 72×72 pixel areas classified as not-belt are processed for watermark reading. FIG. 10 shows these image analysis blocks excerpted. Inspection shows there are 16 of them—the full processing budget, each having a center within a non-belt area of the imagery.

To aid in control of the diverters (e.g., blowout airjets or robotic manipulators), the data of FIG. 5, indicating non-belt regions, can be combined with similar data from the other cameras to indicate non-belt regions (i.e., item regions) across the width of the belt. A connected component analysis is performed to identify adjoining blocks that form clusters, or islands, that serve as regions of interest (ROIs) corresponding to items on the belt. For each island, a centroid is computed (e.g., by averaging the x-coordinates of all of the non-belt areas in an island, and by similarly averaging the y-coordinates of all the non-belt areas in an island). When each ROI centroid reaches the row of airjets, the jet nearest the centroid is activated to divert that item from the waste flow.

(Information about centroid location is helpful in selecting which airjet to activate. But further ejection improvement can be realized by knowledge and use of item weight and size data. A large item may be comparatively lightweight, such as a film sheet or a plastic mailer Conversely, a small item may be comparatively heavy, e.g., a container having a substantial wall thickness. In accordance with a further aspect of the technology, the payload identifier decoded from the indicia on the item indexes a data store (e.g., database) with related item metadata. One item of such metadata can be the weight of the item; another can be the 2D surface area of the item, or one or more of its dimensions. The air pressure applied by an airjet to divert an item can then be set in accordance with these parameters. More pressure is applied to an item weighing 50 grams than an item weighing 5 grams, etc.

In similar fashion the item metadata can include data about the item's ballistic attributes, such as a metric indicating the degree the item is streamlined—like a rounded drink bottle, or liable to capture air—like a lid to a mayonnaise jar. Again, the applied air pressure can be adjusted accordingly. Still further, the length of the air pulse—in addition to its air pressure—can be adjusted based on such metadata.)

In yet another embodiment, the item metadata specifies a spatial vector describing a distance and direction between a physical center of a watermarked region on the item, and the item's center of mass. When the watermark on the item is detected, this vector is obtained via database lookup, and the recovered affine transform is used to "correct" the recovered vector to find the actual center of mass of the item on the belt.

(Such ejection improvements are further elaborated in a following section.)

The selection of image areas 72 pixels on a side, by which belt/non-belt classification is made, is somewhat arbitrary; 72 pixels is not essential. However, applicant has found this value advantageous as it approximately corresponds to the distance that the belt advances through the camera field of view between frame captures. Thus, the belt/non-belt classification is performed only on the newly-visible row of imagery at the belt-entering side of the frame. This classification data is aggregated with classification data determined from previous 72 pixel swaths of previous frames to generate a full frame of belt/no-belt classification data shown in FIG. 5.

The foregoing discussion assumes that the belt map is essentially a large single image depicting the entirety of the belt. This is one form of implementation. In another, the belt map is a series of overlapping panes (slices) of image data, with duplicated image data at the overlaps.

Assume the image frame is 1280×1084 pixels in size. The horizontal dimension corresponds to the 1280 and to the width dimension of the belt. The down-sampled image frame is 640×512.

The belt advances about 72 pixels per frame (36 after downsampling), so there 14+ exposures of each point on the belt; 4 or 5 of each color if three colors of illumination are successively used. The belt advances 216 rows of imagery between blue frames (108 after downsampling), and similarly for the other illumination colors.

The height of each slice is chosen to assure that a 36 pixel (down-sampled) block lies entirely in one slice or the next. So these 108 rows of imagery must be expanded by 36 rows on each side, yielding slices that are 180 (down-sampled) image rows in height.

Each slice is characterized by the belt location depicted at its center. To determine sync, two position data are combined. The first is the position of the slice on the belt (i.e., the location of the center of the slice). The second is the offset of the best-matching 36 pixel block within the slice (relative to its center).

Computational complexity of the correlation operation can be reduced by means other than down-sampling (reducing the resolution) of the newly-captured imagery and the historical belt map data. For example, computational complexity can be reduced by correlating just a small patch of the new imagery against the historical belt map data to determine spatial alignment, with both image data at full resolution. For instance, a patch of 32×32, 64×64 or 128×

128 pixels excerpted from the newly-captured imagery can be correlated against the historical belt map data to determine spatial synchronization. If sync cannot be established based on this patch (e.g., because this patch depicts an occupied excerpt of the belt) another patch can be tried, and so on. Once sync has been determined based on a patch of the newly-captured image frame, classification of blocks of the newly-captured image frame as belt or non-belt can be conducted on imagery beyond the patch from which sync was determined.

A further computational economy can be realized by not maintaining historical belt map data for each color of illumination. Instead, the historical belt map data can comprise swaths of historical image data captured under different illumination colors. A blue-illuminated swath can be followed by a red-illuminated swath, which is followed by an infrared-illuminated swath, which is followed by a blue-illuminated swath, and so on. Likewise, the color of illumination with which the newly-captured image frame was captured can be disregarded in performing the correlation. Newly-captured image data captured under blue light can be correlated against historical belt map data captured under red, or infrared, light, and similarly with other combinations. The new imagery captured under blue light may have different local luminances than corresponding red- or infrared-illuminated historical belt map data. But nonetheless, there is one (x,y) position at which the correlation will peak. And that position indicates the spatial synchronization. The absolute value of the correlation isn't as large as it would be if the two data sets were illuminated with the same color, because the belt looks different under different illumination, but still there is a sharp peak in correlation, and this peak indicates the spatial sync.

Figure 11:
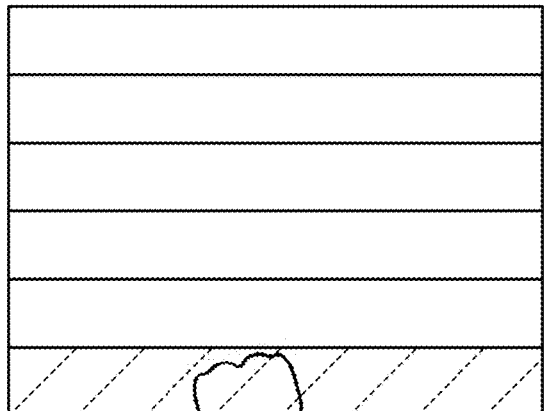
FIG. 11 shows a bottle advanced by a conveyor to four different locations within a camera field of view.
Figure 11:
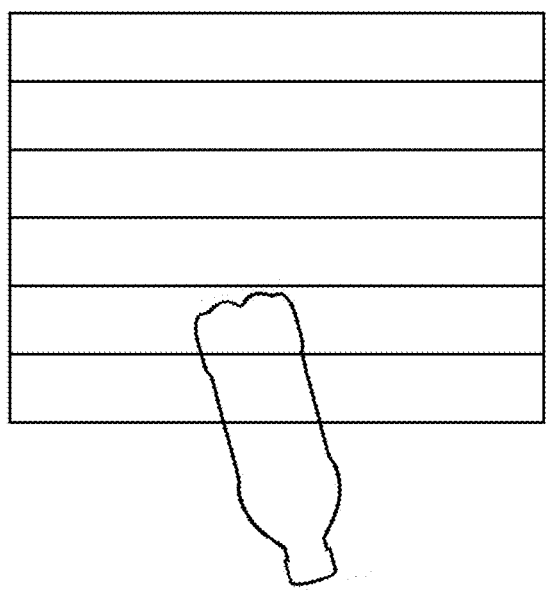
Figure 11:
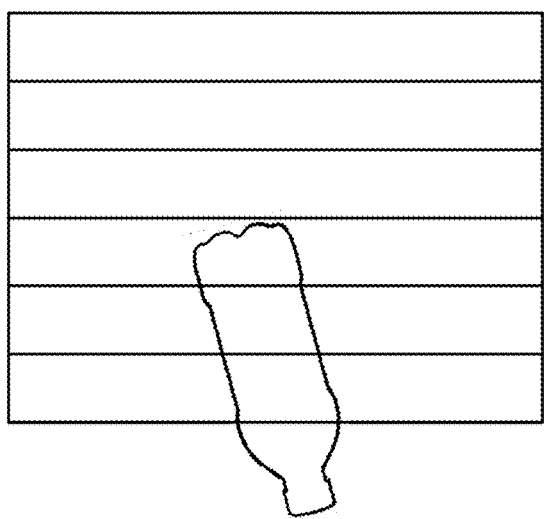
Figure 11:
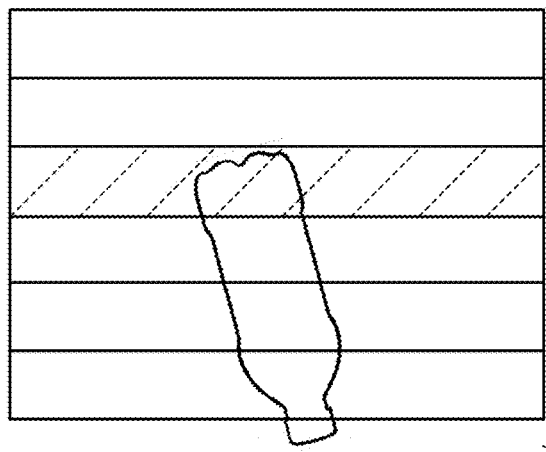

Watermark detection robustness can further be improved by combining depictions of an item imaged under the same illumination at different stages of advancement along the belt; so-called interframe processing as noted earlier. FIG. 11 illustrates.

A bottle is shows at successive positions in its transit through a camera's field of view. The horizontal lines indicate the distance that the belt advances between frames. In an illustrative embodiment, the first frame, in the upper left, is captured with blue light. The next, in the upper right, is captured with red light. The next is captured with infrared light. The next, in the lower right, is again captured with blue light.

The swath of imagery shown by cross-hatch in the first blue frame can be summed with the swath of imagery shown by cross-hatch in the following blue frame, after a spatial shift corresponding to three swath widths to bring the two into alignment. (Keypoint-based refinement of alignment can also be employed.) Data depicting the bottle sums constructively. The noise signals present in the two image swaths are random. At some pixels such noise sums constructively, and at other pixels the noise sums destructively. Net, the desired signal (depicting the bottle) is accentuated relative to the undesired signal (the ever-changing noise). This increases the signal-to-noise ratio of the watermark signal, aiding decoding.

Similarly, swaths of imagery depicting the bottle captured under red illumination can be combined with each other. Likewise with swaths of imagery captured under infrared illumination.

It will be recognized that more than just a single swath can be combined in this fashion. Typically, every part of an item is illuminated multiple times by each color of light during its transit across the camera field of view. The resulting multiple depictions of each part, illuminated with each color, can then be combined. (The depiction of the frame as being comprised by six swaths is a simplification for clarity of illustration. More typically, a dozen or so such swaths are present.) Still further, the combined blue frame can be combined with the combined red frame and/or the combined infrared frame to yield still further improvements.

Thus, in this aspect of the technology an object that moves on a conveyor across a fixed camera's field of view is imaged at plural positions along its movement path. Image data captured from one object position with a particular applied illumination spectrum is spatially-shifted and combined with image data captured from a different object position under the same (or different) illumination spectrum, yielding a composite image from which a machine readable code on the object is then read.

In a further embodiment, the items are propelled by one conveyor belt over a gap and onto a second conveyor belt. Illumination can be applied, and imagery can be captured, from above the gap. Unlike the belt, whose appearance can vary with streaks and stains, the gap has a substantially fixed appearance as viewed by the camera. Whenever a change appears in the portion of the image frame depicting the gap, this indicates an item is present in the gap, and analysis of some or all of the image frame can thereby be triggered. (Some embodiments can analyze imagery depicting the gap for high frequency image content, and trigger analysis when such content is found. If no item is present, there is nothing at the camera's focal plane over the gap, and the captured imagery is an out-of-focus depiction of whatever is below the gap. Such out-of-focus imagery lacks high frequency detail.) In some embodiments an illumination source is provided below the gap, either in view of the camera above or off to the side, illuminating the gap obliquely. This under-lighting can cause features to be revealed in camera-captured imagery—particularly in transparent items—that may not be revealed otherwise.

Combinations of Item Identification Technologies

The technologies detailed herein can be used in conjunction with other identification technologies to advantageous effect. One such alternative technology involves spectroscopy, such as near infrared (NIR) spectroscopy.

Spectroscopy systems commonly determine a spectral signature of a plastic resin by identifying the resin's optical absorption (reflectance, transmittance) at a variety of different wavelengths. Some systems correlate such a spectroscopy signature with reference signatures of known plastics to determine which known plastic provides the best match. Other systems use machine classification techniques, such as neural networks or support vector machines, to similar effect, determining which known plastic has spectral absorption attributes that most closely match those of a container being analyzed. Related techniques rely on fluorescence of plastic items under infrared, ultraviolet or hyperspectral illumination, e.g., due to fluorescing additives (such as anti-Stokes compounds) mixed-in with in the plastic resin, or with ink used to print on the item. Again, resulting spectral emission data is compared against reference fluorescence data to identify the plastic (or the additive, and thereby the plastic). All such techniques are here referenced under the term spectroscopy.

Some such methods are further detailed in U.S. patent publications including U.S. Pat. Nos. 5,703,229, 6,433,338, 6,497,324, 6,624,417, 10,717,113 20040149911, 20070296956, 20190047024, 20190128801 and 20190329297.

NIR spectroscopy systems identify plastic type. Watermark systems identify plastic type and can also provide other item attribute data stored in the resolver database (information that is typically stored there at the time of the item's creation, or before). Some sorting, however, desirably involves criteria not known at the time of the item's creation, but rather describes the item's state on the conveyor. Is it dirty? Does it have a cap? Is it crumpled? Etc. Such factors may be termed state attributes. Machine learning techniques (sometimes termed "AI," "ML," or deep learning, often implemented with convolutional neural networks trained using gradient descent methods) can be employed on the processing line to gather such state information. The present technology includes joint use of AI techniques with watermark and/or spectroscopy techniques to increase the accuracy and granularity with which items are identified for sorting. (AI techniques that are suitable for such applications are detailed, e.g., in patent publications US20180016096, US20180036774, US20190130560, US20190030571 and WO2021/089602 to AMP Robotics, Inc., CleanRobotics, Inc., ZenRobotics Oy and Tomra Sorting GmbH.)

Figure 12:
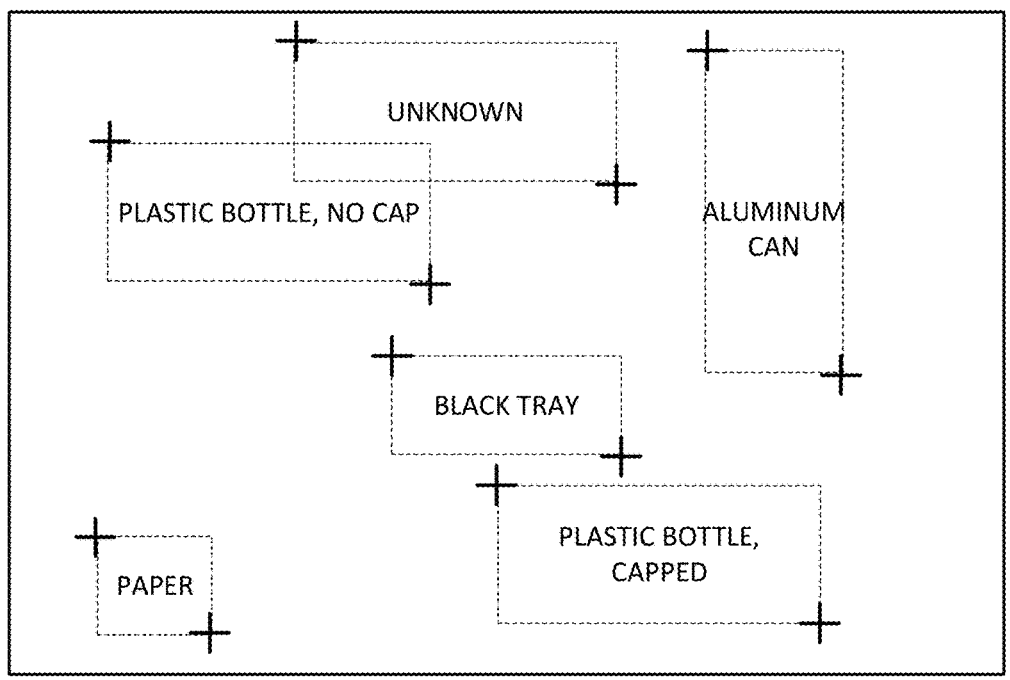
FIG. 12 shows an annotated map of an image frame produced by a trained classifier.

More generally, an AI system can be trained to classify a dozen or more categories of items likely to be encountered on the belt, and label corresponding areas on a map of the belt. FIG. 12 shows such an arrangement, in which different areas (each identified by a pair of corner coordinates) are respectively identified as having an aluminum can, a capped plastic bottle, an uncapped plastic bottle, a black tray, and a wad of paper. One technology for such spatial labeling of multiple items within an image frame employs so-called "R-CNN" techniques (region-based convolutional neural networks), such as that by Girshick detailed in "Fast R-CNN," 2015 IEEE Conference on Computer Vision and Pattern Recognition, pages 1440-1448, and elaborated in Girshick's paper with Ren, et al, "Faster R-CNN: Towards Real-Time Object Detection with Region Proposal Networks," arXiv preprint arXiv:1506.01497, Jun. 4, 2015, and in patent document US20170206431. Another technology for such spatial labeling of multiple items within an image frame employs so-called "YOLO" (You Only Look Once") techniques, e.g., as detailed by Redmon et al in their papers "You only look once: Unified, real-time object detection," in Proc. of the IEEE Conference on Computer Vision and Pattern Recognition 2016, pp. 779-788, and "YOLO9000: Better, Faster, Stronger," in Proc. of the IEEE Conference on Computer Vision and Pattern Recognition 2017, pp. 7263-7271.

Our earlier publications, e.g., US20210299706, provide information on combined use of identification technologies, such as watermarking plus spectroscopy, and watermarking plus AI. Included is information on how conflicting object identifications by two (or more) identification technologies can be resolved, e.g., by rules that give precedence to different systems' outputs in different circumstances.

Figure 13:
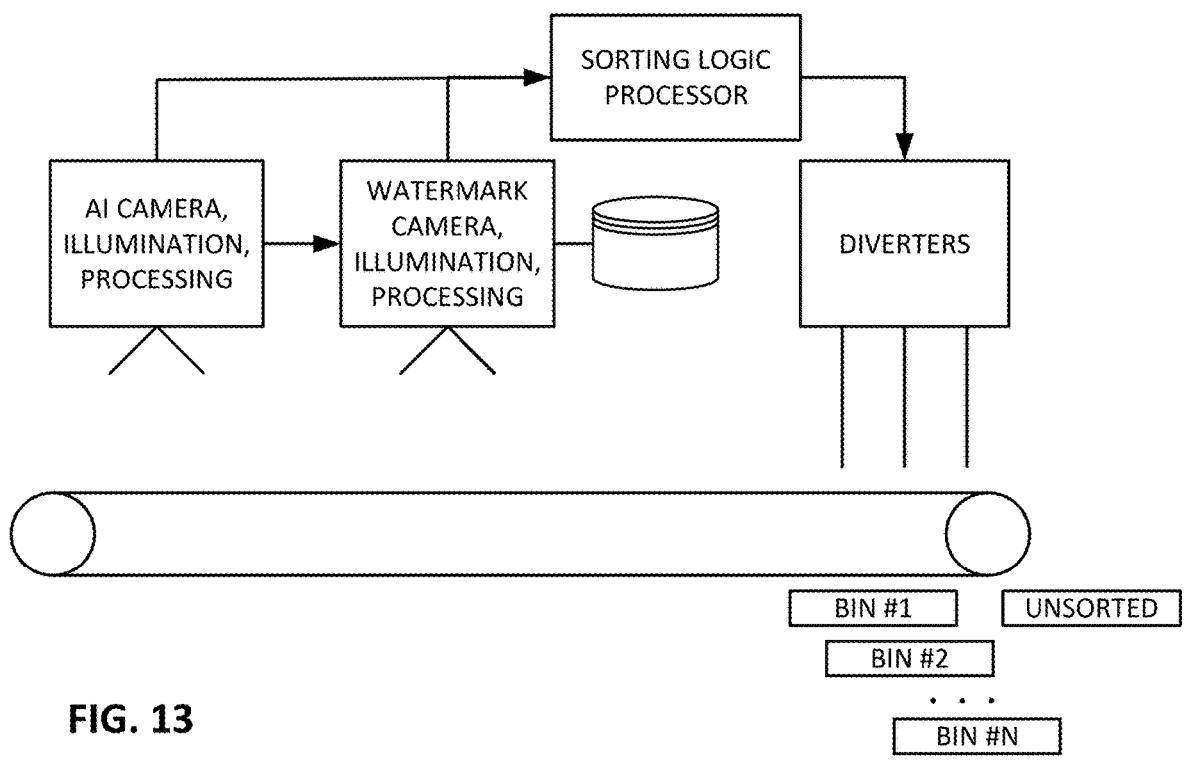
FIG. 13 illustrates a system employing employ certain aspects of the present technology.

In an illustrative plastic recycling system, there is no need to attempt watermark decoding of an aluminum can, or a capped bottle, or a wad of paper. The AI system provides map data reporting these objects and their locations to the watermark reading system, which then can disregard these areas and focus its analysis on other areas. The watermark reading system can additionally, or alternatively, limit its analysis efforts to those regions of the belt indicated, by the AI system, as occupied by the uncapped bottle and the black tray. Such an arrangement is shown in FIG. 13.

Still further, such an AI system may be trained, through use of labeled training images and gradient descent methods, to identify locations of fold contours in depictions of crushed plastic objects, and/or the less-disturbed surfaces between fold contours. Again, such map data can be passed to a watermark reading system, which can analyze the less-disturbed surfaces between the fold contours and can apply less or no analysis efforts on regions encompassing the fold contours (where watermark reading may be less successful).

(In other embodiments such fold contours and less-disturbed surfaces are identified by 3D scanning or other depth sensing arrangements, again enabling analysis efforts to be focused where they are likely to be more fruitful.)

The map data generated by the AI system and communicated to the watermark system can be specified in terms of pixel locations within the AI system camera field of view. Alternatively, such pixel locations can be mapped to corresponding physical coordinates on the conveyor belt (such as at a position 46.5 feet from a start-of-belt marker, and 3 inches left of belt center line.) Given a known belt speed and a known distance between the AI and watermark system cameras, the mapping to corresponding pixel locations within the watermark system camera field of view is straightforward.

In some embodiments the AI system processes imagery collected by the camera(s) used for watermark decoding. Such imagery may be illuminated with one spectrum of light in one frame (e.g., blue), and with another spectrum of light in a next frame (e.g., red), and with still another spectrum of light in a further frame (e.g., infrared). The AI system can be trained to perform its (recognition) tasks using labeled imagery gathered with such different spectra of illumination, and the coefficients of some or all of the convolutional layers, and some or all of the weights of the classification layer(s), can be switched each frame in accordance with the illumination color applied during capture of the imagery being processed.

In another embodiment, instead of time-sequential multispectral illumination, an AI camera can capture simultaneous multi-spectral image data, e.g., with white light illumination and an RGB sensor (i.e., a monochrome image sensor outfitted with a color filter array in a Bayer pattern), thereby producing simultaneous frames of red, green and blue image data. In other arrangements the AI camera system can use a half-silvered mirror or other optical splitter to expose two or more different monochrome image sensors, each equipped with a different spectral filter making it responsive to a different spectrum of radiation. Thus, for example, imagery may be collected at plural different near infrared wavelengths, and/or at plural different human-visible and -invisible wavelengths, simultaneously. In still other arrangements, a monochrome image sensor is equipped with a multispectral filter array other than a Bayer pattern array, to provide four (or nine) frames of image data at different wavelengths. (One such color filter array has filters for red, green, blue and infrared.)

In some such embodiments, the different color channel pixel images are transformed into a different color representation prior to submission to the AI system. One such color representation is the YUV color space, in which the Y channel represents luma (brightness) and the U and V channels are two dimensions of chrominance. For example, three pixel frames of red, green and blue image data may be transformed into three pixel frames of luma, U and V pixel data. Depending on the different spectra involved, different transformed color spaces can be employed.

In an exemplary multi-spectral AI implementation, four 512×512 pixel color channels of imagery are provided to the first convolutional layer: blue, red, infrared1 (around 1000 nanometer wavelength) and infrared2 (around 1200 nanometer wavelength). The camera system may produce imagery of this resolution on a native basis. Alternatively, higher-resolution imagery may be down-sampled to 512×512 resolution. Or a larger frame of imagery may be divided into plural 512×512 blocks, e.g., with overlap between the blocks—in which case multiple 512×512 blocks are analyzed by the neural network for each frame capture.

The illustrative system first applies 96 different 512×512×4 convolution kernels to the four-channel input data. If a stride (step) of four is used, then each of the resulting 96 convolution outputs has a size of 128×128. Pooling (e.g., max-pooling or average-pooling) is then applied, with a stride of two pixels, reducing these outputs to size 64×64. ReLU processing is then applied (changing negative values to zero), yielding 96 channels of 64×64 imagery as the output of the first layer of the neural network.

The second layer of the network applies 192 different 64×64×96 convolution kernels to the data output from the first layer. If a stride of two is employed, the result is 192 convolution outputs of size 32×32. If pooling and ReLU processing is applied, as before, the output of the second layer of the neural network is 192 channels of 16×16 data.

The network can continue in this fashion, applying further convolution kernels to the output of the previous layer, and applying pooling and ReLU processing. (In some instances, the stride may be one; in some instances, pooling and/or ReLU processing may be omitted between convolution layers.) Finally, the output of the last layer is input to one or more fully-connected classification (e.g., Softmax) layers, which perform weighted sums of the data computed by the earlier stages to yield the network output data, e.g., indicating bounding box locations and classification information for the item(s) depicted in the input image data.

In another embodiment, the AI network processes four channels of information, as above. However, one of the channels is depth information, such as may be provided by an Intel RealSense D435 system. The RealSense system also includes an RGB camera, which can provide the other three channels of image data. The RGB sensor is of nominal dimensions 1920×1080 pixels, but a quarter of these pixels are red-filtered, a quarter are blue-filtered, and a half are green-filtered, by a color filter array in a Bayer pattern. The blue image frame resolution is thus 960×540. The red frame resolution is also 960×540. If the two green-filtered image pixels in each 2×2 Bayer cell are averaged, the green image frame resolution is also 960×540. The depth sensor, in contrast, has a resolution of 1280×720, and it has a different field of view. (The resolution drops to 840×100 in the 300 FPS mode of operation.)

It is desirable to first normalize the image and depth information to a common frame of reference. In one such embodiment the depth data is resampled (e.g., using bilinear or bicubic resampling) to yield data at interpolated locations coincident with the image pixels. (In another embodiment it is the image data that is resampled to yield data at interpolated locations coincident with the depth data.)

In embodiments in which the image sensor and the depth sensor have different fields of view, only data corresponding to the region of overlap on the belt may be processed by the neural network. In some embodiments, the set of data covering the smaller region may be composited with such data from one or more previous capture frames, which are spatially-advanced due to movement of the belt, to yield a larger set of data, and thus a larger region of overlap. Such compositing can be based on keypoint matching, or knowledge of the belt speed in conjunction with the time interval between frame captures. For example, a 100 pixel wide swath of depth data in one frame of depth data may be composited with 100 pixel wide swaths of depth data from one or more previous frames to yield a swath that is larger than 100 pixels in width.

Figure 14:
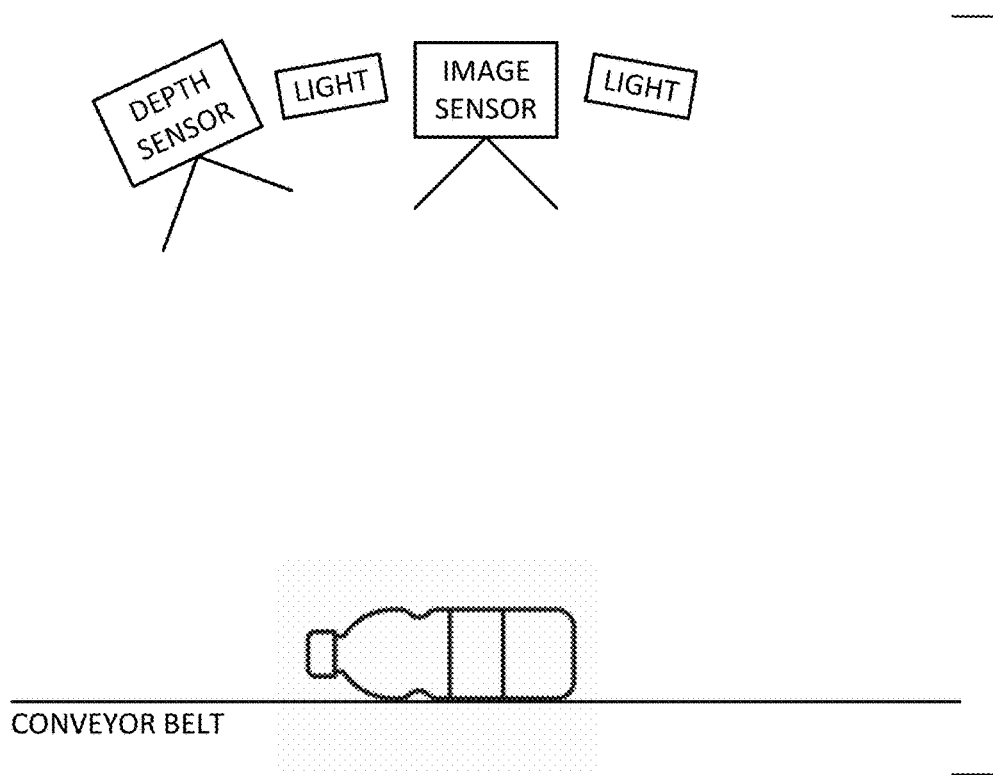
FIG. 14 illustrates an embodiment incorporating both depth sensing and image sensing.

In some instances, depth data is collected by a sensor unit dedicated to depth (e.g., a time-of-flight sensor or a 3D laser triangulation system), rather than being collected by a system that gathers both depth and image data. In such systems, the two sensors will typically have different views of the belt, and one sensor (e.g., the depth sensor) may have a viewing axis that is not perpendicular to the belt, as shown in FIG. 14. In such case, pixels of depth data that would normally correspond to square patches of the belt—if viewed straight-down—may correspond to rectangular patches instead. And the dimensions of these patches may be different at different locations in the depth sensor's field of view. Desirably, such projective distortion is taken into account in normalizing the depth data to the image data.

Figure 15:
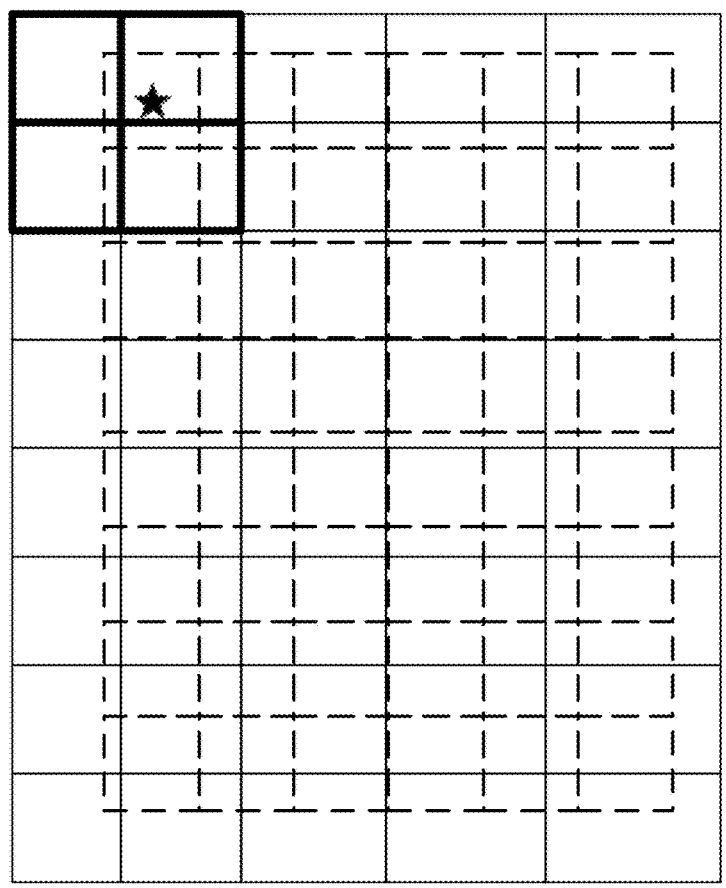
FIG. 15 illustrates how depth and image data can be normalized to each other, by interpolation.

For example, FIG. 15 shows pixels of image data and depth data as they are projected onto a belt and sensed by a sensor. The image pixels are of smaller scale (shown in dashed lines) and each has the same area. The depth pixels are larger, and grow progressively larger in each column to the right (e.g., because the depth sensor may be viewing the belt from a position to the left of the image sensor, and thus is a greater distance from the right-most part of the imaged belt, as is the case in FIG. 14). Resampling can be applied to generate, for each image pixel, an interpolated value of depth data corresponding to the center of the image pixel. For example, to compute the depth value corresponding to the upper left-most image pixel (i.e., the location shown by the star), bilinear interpolation can be applied to the values of the four depth pixels shown in bold.

In other embodiments, more or fewer channels of image data can be employed. In some instances the neural network is provided a single plane of image data and a single plane of depth data. In still other embodiments, depth sensing is used to identify occupied regions of the belt.

Blocks of imagery centered on these regions, e.g., of size 512×512 pixels, are then excerpted from the camera imagery and are submitted to a convolutional neural network. This network is trained just for object classification; it does not need to perform localization, as the depth sensing has already performed this role. (The depth sensing can be performed at a location earlier along the belt travel, and occupied areas can be flagged for analysis when these regions of belt progress to the location where they are viewed by a camera. Alternatively, the depth sensing system can gather data from a region of belt that is also being imaged by the camera, e.g., as in FIG. 14, and belt regions determined to be occupied can be immediately segmented from the captured imagery and applied to the neural network.)

In the foregoing arrangements, the coefficients of the convolution kernels, and the weights of the classification layers, are determined in a training process based on labeled data, as earlier-noted.

The foregoing are simplified reviews of exemplary implementations, but they serve to illustrate certain relevant principles. For more detailed descriptions of the neural networks, and their training and use, the reader is referred to the related documents referenced herein.

In some embodiments, one or more channels of input data to a neural network are transformed into a different domain (e.g., transformed into the spatial frequency domain, by an FFT), and such transformed channel is provided to the neural network in addition to, or in place of, the channel of imagery from which it was derived.

In embodiments employing depth sensing, the data produced by such sensors can be used to identify the center of items for ejection—either alone or in combination (e.g., as by averaging) with information determined from camera imagery.

More on Combinations of Item Identification Technologies

Although watermarks, spectroscopy and AI can serve some functions in common, they are more complementary than competitive. For example, watermarks and AI can both be used to identify a 500 ml Coke bottle. However, an AI can report on whether the bottle is capped and whether any liquid residue remains, while a watermark can identify the bottle from a postage stamp-sized excerpt visible between other trash on a crowded conveyor, and may report the bottle's country of origin as well.

Watermarks and AI have more similarities than might first appear. For example, the oct-axis operation used to highlight features of interest in watermark reading, is a form of convolution—the operation around which convolutional neural networks are built, where it is again used to discern features of interest. Both watermark reading and CNNs commonly use image segmentation techniques ("object proposals" in CNNs), to focus processing efforts on promising regions of interest. While watermark reading is commonly regarded as deterministic (as opposed to probabilistic), this is because the maximum likelihood output typically produced is orders of magnitude more likely than any other output. However, in the presence of dominating noise, the Viterbi decoder of a watermark reading system can provide multiple outputs—each with an associated probability estimate, just as is commonly done by the classifier stage in a convolutional neural network.

In some embodiments, processing modules used for one form of identification (e.g., watermark) are also used for a second form of identification (e.g., AI). For example, the hardware to perform convolutions for a CNN can be employed to generate oct-axis data. Similarly, a module that identifies image regions of interest for possible block selection/processing in watermark processing may also be used to identify object proposals for CNN processing.

In addition to such existing algorithmic similarities, CNNs can benefit from inclusion of other approaches used in watermark reading—essentially hybridizing the two arrangements. One example may be termed "feature-fusion," i.e., using watermark technology to aid in invariance and equivariance of CNNs. A particular example is use of watermark reference signal concepts to improve rotation invariance for CNN classification. (CNNs are starting to explore polar coordinates for similar purpose, echoing the log polar/Fourier Mellin domain of watermark detection.) Another example is to leverage so-called "bottom-up" fusion, such as passing hints about object pose to a subsequent layer targeted at performing watermark-related convolutional operations. Feature concatenation strategies known from watermark reading can also be adapted to CNNs, e.g., by making semantic information from one region available to understand information about another region, earlier in the network. Similarly, the approach of optimizing object detection (as opposed to later object identification) for high resolution imagery, and thereby allowing subsequent stages to operate on smaller chunks of image data depicting objects of interest, can be used.

In like fashion, watermark techniques can reduce the effort required to train and maintain CNNs, e.g., again aiding invariance and equivariance of CNNs. The task of collecting, preparing and labeling the thousands (sometimes millions) of images commonly needed for AI training, for example, can be shortcut when the items to be AI-classified bear watermarks. In such instances each label is already effectively "self-labeled," greatly simplifying the training effort, and enabling "semi-supervised training" to occur. Similarly, watermark-labeled images can be used for training both sides of Generative Adversarial Networks (c.f. Goodfellow, et al, Generative Adversarial Nets, Advances in Neural Information Processing Systems, 2014, pp. 2672-2680).

Once a network has been trained using such watermark-labeled images, the resulting model can be adapted for other recognition tasks—including recognizing items that are not watermark-labeled, using transfer learning.

Many advantages accrue from hybrid uses of identification technologies in the recycling sorting system context. (Such a system may be a material recovery facility that processes collected garbage, or it can be a further processor that receives bales of plastic from a material recovery facility and performs more granular sorting.) A hybrid approach is particularly desirable where one approach complements the other, addressing its shortcomings. For example, NIR plastic identifications systems have difficulty identifying black and dark plastics, and cannot distinguish food/non-food packaging, and are of limited use with multi-layer packaging, and cannot provide producer/SKU-specific identification of items—such as distinguishing Coke and Pepsi bottles made of the same plastic. These are shortcomings that watermark technology can redress.

We next dive deeper into the problem of item blowout, in this context of hybrid use of identification technologies. As noted, blowout of items from a conveyor belt is most commonly performed by air-jets, e.g., pneumatic nozzles at the end of the conveyor belt, perpendicular to the direction of travel. When an object to be ejected passes over the array of nozzles, the nozzles under the object are pulsed to eject the object. Two important metrics are the likelihood of successfully ejecting the object and the amount of compressed air used. When and how long to pulse the nozzles (and which nozzles to pulse) are free variables that can be used to jointly optimize the metrics. Nozzles should be pulsed so that the resulting pressure acts as close as possible to the center of mass of the object, since this will result in less energy being diverted to rotating, rather than moving the object.

We particularly consider a hybrid system employing NIR spectroscopy and watermarking, although principles from this discussion can similarly be applied to AI+watermarking, and AI+NIR systems.

Two types of NIR sensors are commonly found in recycling sorting systems. One uses a linear array of single sensors, each of which can monitor a small portion along the width of the recycling belt. The other type uses a linear sensor array to image a line across the recycling belt. In both cases, a sequence of k scans is made, each of which provides information corresponding to k different spectral bands. Each sequence of scans provides complete spectral information for a single linear swath across the recycling belt. Successive sequences of scans can be built up to provide a two-dimensional image of passing objects. If the NIR sensing station is placed close to the ejection nozzles, the decision to pulse the nozzles may need to be made before it is known how large the object is. In some cases, it can be helpful to have additional information about object size and shape, such as might be provided by a laser scanner or a depth sensing camera.

As noted, an exemplary watermark reading system uses a camera with global shutter to image objects passing on the recycling belt. To prevent excessive motion blur, exposures are typically less than 100 microseconds. A strobed LED light is used to meet the exposure and depth of field (related to expected range of object heights) requirements. Three different wavelengths of light are used: 450 nm, 660 nm, and 730 nm. These lights are alternated over different exposures to produce a sequence of images which is fed to the detector. One possible sequence uses only 450 nm and 730 nm lights with a total of 300 images per second.

The detector may process an image in two phases. The first phase takes place at the image level and involves estimating the likelihood of the presence of an object in different local regions of the image. The image is divided into square blocks and the estimated probability of an object in each block is used to prioritize image blocks for evaluation in the second phase. This estimated probability can be based on the information discussed earlier, assessing which regions of the belt are likely empty and which are likely occupied.

A particular estimate of probability is based on the mean and variance of pixel values within a 128×128 candidate block, and proceeds as follows: Identify a large number of image blocks that contain only the belt in them, and calculate the mean and variance features, so that we have a sampling of the distribution of these features. Now use this sampling data to calculate a cumulative distribution function (CDF) for each of these features. For each candidate block, calculate the mean and variance features, and determine the respective CDF probability values.

A CDF value around 0.5 would be pretty typical of a block depicting empty belt. On the other hand, CDF values of 0.05 or 0.95 are not as typical. These values do not tell us how likely a block is to depict an object, because we don't have a good statistical sampling of what objects look like, or an accurate estimate of the proportion of blocks that contain objects. But we do have lots of examples of blocks from the belt, so we can construct a measure that tells us how "belt-like" a block is. If a block is judged very not belt-like, we say it is more likely to contain an object. One way to construct a distinguishing measure from the two CDF values is to calculate meanFeature=0.5−abs(0.5−meanCDF) and varianceFeature=0.5−abs(0.5−varianceCDF). We can calculate a single metric=meanFeature*varianceFeature (multiplication being motivated by assuming independence between the two features). For an image, we can sort the block metrics to get a list of blocks of increasing metric value. If we have enough time to process 300 blocks, we pick the first 300 blocks per this sorted list, since they are in some way the 300 least belt-like blocks.

The second phase repeatedly runs a watermark detection algorithm centered on different ones of the prioritized image blocks. The watermark detection algorithm has a fixed complexity, resulting in a fixed number of blocks that can be examined in any one image. The detection algorithm produces both final detection results for a block (read/no read, together with GTIN or container ID), and intermediate detection results. Intermediate detection results can indicate the likelihood of the presence of a watermark and information about the orientation of the watermark. In the second phase, the next block to be examined by the detector is determined by the prioritized list of blocks, and may further be informed by the intermediate detection results for previously examined blocks.

After a watermark is decoded in a block, the detection information is passed to the ejection system. Part of this information indicates where the desired destination for the object is, e.g., which ejection mechanism (if any) should be used to direct the object. The information also indicates which specific nozzles should be pulsed, and when they should be pulsed. The part of this task that takes place in the watermark system is termed object processing and will be described in more detail later.

In most systems, the components will be ordered on the conveyor belt so that objects first pass the watermark reading system, then the NIR spectroscopy (or AI) system, and finally the ejection mechanism. To maximize the rate of successful ejection, it is desirable to minimize the distance between all of the components. This is because the ejection of an item with a detected watermark is timed based on where the object was when the watermark was detected, and its estimated velocity. Accurate operation requires understanding the system timing and latencies.

Important values include:

Time from exposure start to image entirely transferred from camera. The camera is typically being run at or near its maximum rate. A safe worst-case number is the time period $p$ between camera exposures.

Delay from camera to computer with watermark reading software. This depends on the characteristics of the network used to move data from the camera to the computer where the detector is run, and the software used to accomplish this, as well as the number of cameras on the recycling belt. It should also include any latency before the reading software starts running. The network portion of this delay must be less than $p$.

Time from watermark reading start to reading result. The reader must run in real time, processing 300 images per second in the implementation considered here. In general, this is $kp$, where $k$ in the number of pipelined stages implemented in the reader. If the reader is not pipelined, the value for this time is $p$.

Time reading detection result to object processing complete and message sent to control processor. This can be very short if, when any watermark is read, the goal is for the ejectors to pulse the object at the point on the object where the watermark was read. If watermarks were read in more than one block in the image, the centroid of these blocks can be used for a blowout point. This may not be a good strategy, however, if a watermark is read on a large object at the top (i.e., incoming edge) of the frame on the first image available of that object, and more of the object is not yet within the camera's view. In that case, the ejection mechanism may be pulsed relatively far from the object's center of mass. A better strategy can be to allow additional frames depicting the object to be processed, so that the extent of the object can be better estimated, and a better estimate of the center of mass can be used for the point of action for the nozzles. (However, as a failsafe against objects that overlie each other being mistaken as a single, large, object, an object's physical extent may be declared to be ended after it is detected through more than a threshold length of the belt, e.g., 12 inches, and the beginning of a new object is then declared for any further extent of this item.

Time needed for the message to be received and acted on by the ejection mechanism. The network portion of this delay can be less than 100 microseconds. The bulk of this time will be the ejector (solenoid) response time, which may be multiple milliseconds.

Time at which the nozzles are to be pulsed. This must not be before the sum of the above delays.

Assuming that center-of-mass ejection is desired, a conservative estimate of the minimum distance between the watermark reading system and the ejection nozzles can be calculated. This assumes that everything that can be learned about the extent of an object will be learned by processing all images of the object that have been captured by the camera by the time the trailing edge of the object leaves the camera field of view. The time to process the last of these images through the detector is 3p. This includes time for the image to be transferred out of the camera, moved to the computer where the detector is run, and the running of the detection software. An additional interval of p should be added to account for object processing time.

The earliest possible time that the nozzles could need to be pulsed is when the leading edge of the object has reached the nozzles. The minimum distance along the belt between the camera optical axis and the ejection nozzles is:

$$D_{min} = 0.5k + V_{max} * \left[\frac{4}{f} + S_{resp}\right] + L_{max}$$

The quantities in the equation and some illustrative values are:
height of the camera field of view, in cm (14).
maximum belt speed, in cm/s (500).
f camera frame rate, in frames/second; this is 1/p above (300).
solenoid response time, in seconds (0.03).
largest object size, in cm (25).
Using the above values gives a minimum distance of about 47 cm.

In immediate ejection, the results from the first frame in which a watermark is read on an object, along with results from previous frames, is used to calculate where and when the nozzles should be pulsed. For immediate ejection, the watermark reading system can be placed closer to the nozzles than for center of mass ejection. The minimum distance for immediate ejection is:

$$D_{min} = 0.5k + V_{max} * \left[\frac{4}{f} + S_{resp}\right]$$

Using the same values as above, the minimum distance is about 22 cm.

Object processing helps to improve the performance of ejection when a watermarked object has been detected, by estimating the extent of the object and calculating an estimated center of mass target for the ejection nozzles to target. There are different ways in which this can be done.

When the block detection algorithm is run, it generates intermediate results that can be used to infer whether or not a watermarked object was present on the belt at that location. This information includes watermark strength metrics, for both complete blocks and 32×32 subblocks. Information for 32×32 subblocks can be generated by expanding the search from an original 128×128 block. The information also includes the object pose information that was derived from the watermark reference signal. This pose information is useful if, for example, two different watermarks have been read in the same image. If a third block, for which the reference signal was detected but no watermark payload was read, has intermediate results showing a high reference signal strength metric, the associated pose information can help indicate which of the two objects the third block belongs to. This is because pose information is expected to be somewhat correlated within the same watermarked object.

Another way in which the extent of objects can be estimated is by prioritizing image blocks (or sub-blocks) based on an estimated likelihood they contain an object. Prioritization can be based, e.g., on the reference signal strength metric (linear pattern strength metric) for each block, or sub-block. The result is an estimate of a binary map that indicates the presence or absence of an object in each image block (sub-block). From this map we can estimate a perimeter for each object, which allows an estimated center of mass to be calculated. If a large data set with known image contours can be constructed, a neural network (e.g., a CNN) is well-suited for this task.

Figure 16:
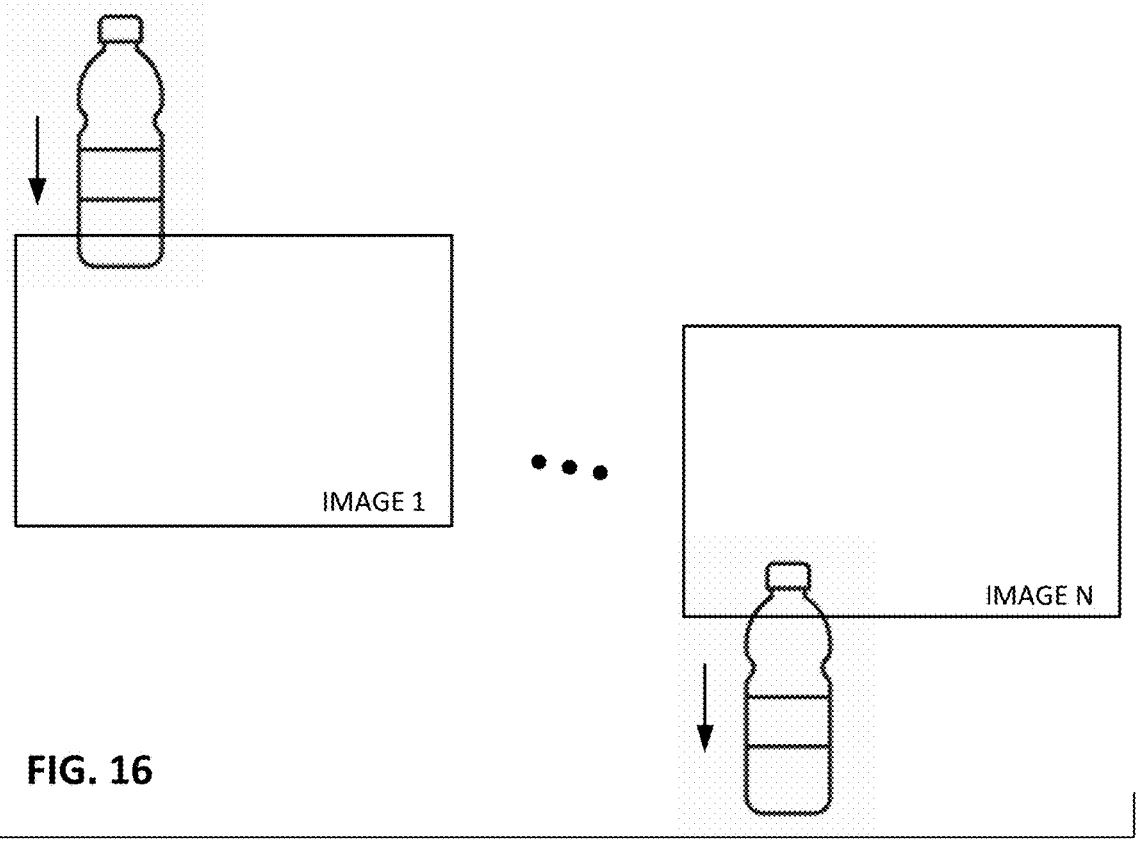
FIG. 16 shows how movement of items on a conveyor causes items to appear at different positions in different captured image frames.

FIG. 16 shows a plastic bottle. The bottle is assumed to be moving vertically downwardly (i.e., bottom first) on the belt. Also shown are the fields of view of two images of the bottle, Image 1 and Image N. Image 1 is captured first and represents the first image in which a watermark on the bottle can be detected. Image N represents the final image in which a watermark on the bottle can be detected. Assuming a belt speed of 3 m/s and 300 camera frames per second, the belt increment is 1 cm/frame. If the height of the camera field of view is 14 cm, then the approximate maximum number of images in which a watermark can be read from a single package is:

$$N_{max} = \frac{L_{max}}{1_{cm/frame}} + \left(\frac{14}{1_{cm/frame}} - 1\right)$$

Figure 17:
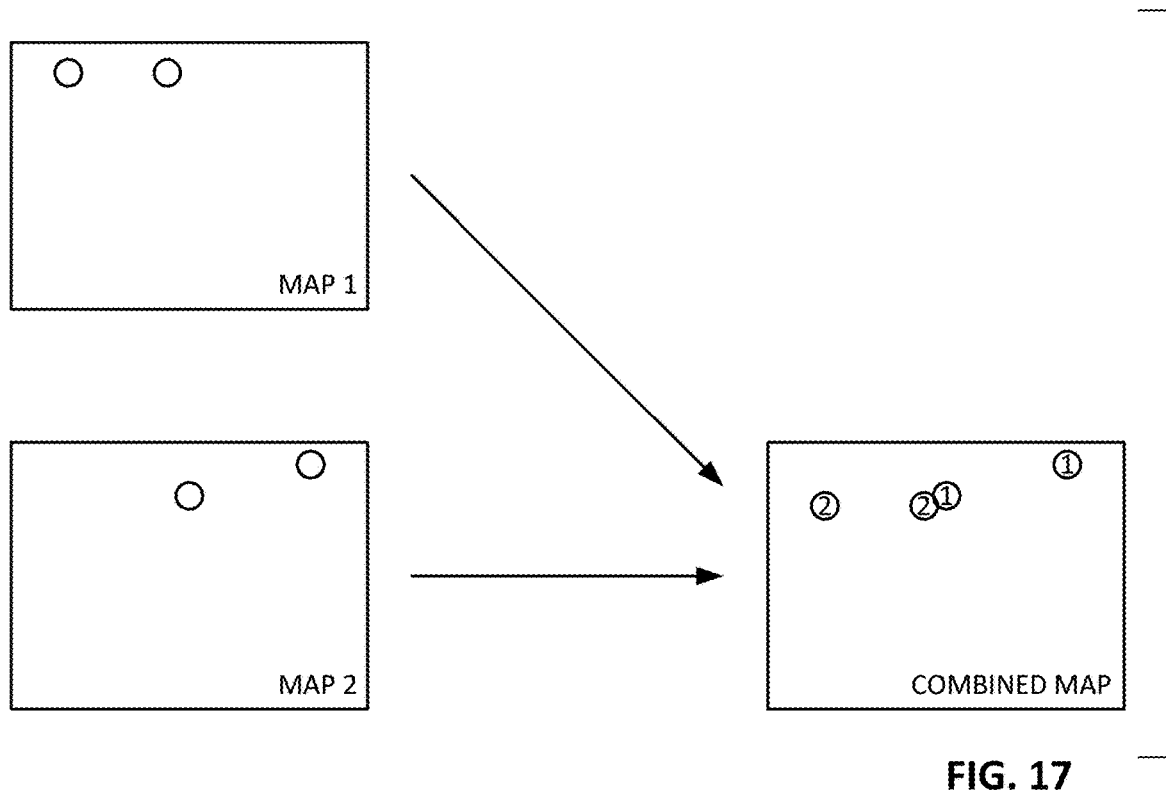
FIG. 17 illustrates how mapped item detection locations in one captured image frame can be spatially-advanced to be combined with mapped item detection locations in one or more subsequently-captured image frame(s).

FIG. 17 shows maps of watermark detection results. Map1 shows two block locations where a reference signal was detected in a first image frame. Map2 is derived from the next camera frame, and shows that a reference signal was detected in two other blocks. The combined map combines these results by moving the detection locations from Map 1 vertically down by the belt increment between frames, and adding the detection locations from Map 2.

Such maps can also track intermediate detection results, e.g., detection of the reference signal, without decoding of the watermark payload. Again, such information is translated vertically on the combined map depending on the distance the belt has moved.

In general, more strongly marked areas of the object will be read in more of the images, and will result in a cluster of detection results in the combined map for a particular object. Note that when building such a map, the final map (i.e., the last combined map showing block detections for a particular object) may be larger than a single camera field of view.

A preferred combined map shows combined values for multiple (e.g., N_max) consecutive frames by labeling each data point in the map with a number representing the age of the data point in frames. Such numbers are shown inside the combined map circles in FIG. 17. When a new frame is processed the map can be updated by removing all data points with an age of N_max, updating all other points on the map by moving them down vertically by a distance equal to the belt increment, and incrementing their age. Finally, the data points for the newest frame are plotted, and labeled with an age of 1.

Such labeling of points on the map with respective age information is typically implemented in the form of metadata associated with different locations on the map.

In building these maps, it is possible to record both intermediate detection results indicating partial detection (e.g., reference signal detection without successful payload decoding) as well as complete watermark reads (i.e., payload decodes). In the former case the associated metadata can include the reference signal strength metric for the intermediate detection results, to give a confidence metric for such information. It is also possible to add the information gleaned from the first phase of operation, discussed above, to the maps, e.g., the locations and scores of different blocks identified as not "belt-like."

Note that the belt increment between frames is not necessarily related to the size of a watermark block. In fact, the belt increment is desirably not an integer multiple of the block dimension, to assure that two successive frames won't detect a watermark from the exact same object area. It is better that successive frames have blocks with different boundaries—when mapped into the belt—to explore the contours and extents of the objects.

(It will be understood that the "maps" referenced herein are not necessarily frames of imagery with localized indications of objects and associated information, but can comprise tables or other data structures collecting the noted information for use in the noted manners.)

Since objects can appear in several consecutive images, but a watermark may be decoded in only one of them, the object processing task spans collection and processing of multiple images. When a watermark is decoded on an object (i.e., permitting identification of its plastic type and other metadata), previous watermark detection results (e.g., reference signal detection without payload decoding) and the first phase information can be examined to better estimate the centroid of the now-identified object. And future such results allow further refinement of the object centroid. If immediate ejection is used, results for future frames are unneeded. Examining previous results can be enabled by keeping the types of maps described above, including the block likelihood estimates generated in the first phase, as well as intermediate block detection results. Future detection results (in the case of center-of-mass ejection) can be incorporated by instantiating an object processing virtual object that has a lifetime over multiple images. The object processing virtual object contains state and other information for the object processing task for a single object on the belt. Each time a new image is processed, all of the currently existing object processing virtual objects' update methods are called to incorporate the results from the new image. The last time an object processing virtual object's update method is called, it returns a structure that contains the final information for the object on the belt. This is passed in a message from the watermark reading system to the sorting logic processor for control of the ejection nozzles. The object processing virtual object can then be discarded.

Even if a watermark is never decoded, object processing is useful. If the object processing task can be generalized to produce information for all objects on the belt, even objects without watermarks, the result would be useful when the NIR or AI module detects an object that needs to be diverted.

The watermark reading system determines an object's plastic type, and other object attribute data (e.g., food grade, sleeved, etc.) by consulting a database or other data structure with plural-symbol payload message data decoded from the watermark on the object. In some embodiments the attribute data includes information about the object dimensions and weight. This weight and/or dimension information can be used by the ejection system to control parameters of air jet operation, such as the air pressure to be applied to the object, and its duration.

In an exemplary system this database is local, and is updated from a global or regional database, e.g., weekly. (The local database typically does not need, e.g., information about objects not available for sale in that country.) In some embodiments, the watermark reading system consults the local database and, if the needed information is not found, then a regional or global database is consulted, and the results obtained are added to the local database—to be ready next time.

Some items, such as beverage bottles with shrink wrapped sleeves, will have two different watermarks: a recycling watermark embedded as a texture in the surface of the bottle, and a GTIN watermark printed on the sleeve. When either of these watermarks is decoded, it is useful to know that the other payload may be on the same object. For this reason, the database desirably returns a flag indicating the existence of the other watermark, and where possible, its payload (or a list of such payloads, e.g., when a single container is used with multiple beverages—each with a different GTIN).

Another example of an object with multiple watermarks is a plastic tray used in deli food service, where the plastic surface may be textured with a recycling watermark, and may also be printed (or bear a label) printed with a different watermark (such as a GTIN watermark), e.g., applied by inkjet printing.

Knowledge that a single object conveys two watermarks aids accurate ejection, since grid detection or payload decoding of either provides additional information from which the centroid of the object in a combined map can be determined.

Although a particular embodiment employs watermark information in determining data for ejection, other techniques can be used—in combination with watermark information or not. This other information includes shape, contour, and/or weight information sensed by means including: (1) laser-based object detection, or depth-sensing imagery; (2) NIR; (3) techniques reviewed earlier for determining areas of empty belt (and, inversely, for determining regions occupied by objects); (4) conventional image processing, such as machine vision; and (5) AI.

It is desirable to log the results of the foregoing processing for system evaluation. If diversion statistics for a given type of object are low, the first question should be whether it is a problem of watermark detection, or of object ejection (or both). Another case in which logged information is useful is when an object is found by only the watermark detection system or only by an AI or NIR system, instead of both.

Various reports can be produced, to serve different stakeholders. For example:
  Serialized payloads can be used for contests/promotions.
  Information aggregated over brand owners can be used to assess costs and evaluate recycling effectiveness.
  Information aggregated over different object types can be used to identify object types that are recycled at low rates.
  Brand owners may want access to "their" data (i.e., data corresponding to their products).

More on Machine Learning Arrangements

Hybrid uses of item identification technologies are further detailed in the following discussion.

A neural network or other machine learning classifier can be trained, by presentation of labeled images depicting objects that have and lack certain attributes (e.g., watermarks, caps, contamination), to discern image features that indicate likely-presence of such attribute(s). Such a neural network, previously-trained with labeled data depicting objects that have and lack watermark reference signals, when presented with an unlabeled block of imagery, can then output a score, e.g., ranging from 0 to 1, indicating a likelihood that the block contains a watermark reference signal. Such functionality can be used in prioritizing candidate blocks for watermark processing.

Consider, for example, a situation in which half of an image frame is excluded from watermark processing, because the belt is visible in such half. The remaining half of the frame where the belt is occluded, of perhaps 1280×512 pixels in size, comprises regions that are candidates for watermark block detection. A total of 465 128×128 candidate blocks may fit in this area, if 75% block overlap is used. If processing constraints allow only 300 of these candidate blocks to be watermark-processed, which should they be? The just-noted classifier can be presented each of the 465 blocks, and can produce a score for each. The 300 blocks with the highest scores can then be passed to the watermark reader for watermark detection and, if a reference signal is found, then processed for watermark decoding.

Alternatively, instead of submitting candidate blocks for evaluation, a 128×128 pixel, or smaller (e.g., 24×24, 48×48, 95×96), analysis window can be swept over imagery depicting the non-vacant regions of the belt (e.g., at increments of 1, 2, 4 or 8 pixels), identifying which locations within the imagery yield the greatest scores. A half-dozen such "hotspot" locations can be identified in the imagery, and then an array of 50 overlapping blocks can be placed over and around each, and submitted for watermark reading. Such sweeping of the analysis region on this granular basis avoids missing a strong signal due to the less-granular identification of candidate blocks used in the arrangement of the preceding paragraph.

Related techniques can be used as a form of image segmentation, to aid in establishing the physical extent of a container or other item, e.g., for more accurate blowout or other diversion from the belt. The scores produced by sweeping the analysis window across captured imagery indicate the watermark-like-ness of the windowed excerpt of imagery. The result is a sort of heat-map indicating the likelihoods of watermarked items being found at different locations. If a watermark reference signal, or payload signal, is thereafter found in the image, the heat-map can be revisited to determine which areas adjoining the found signal also have relatively high scores. "Relatively high" can be scores above a threshold value, such as above 70%, or 50% of the heat-map score at the location from which the watermark signal was detected, thereby defining a region of interest, which can be taken as defining the extent and contour of the item from which the signal was found.

Technology related to the foregoing is detailed in U.S. Pat. No. 9,521,291.

Illustrative embodiments employ oct-axis filtering in watermark reading. Parameters of the oct-axis filter can be fine-tuned, by machine learning, to yield optimum performance for particular types of depicted objects, captured by a particular type of camera system with a particular type of lighting system in a particular waste processing facility. A related arrangement is detailed in U.S. patent publication 20200193553.

Forms of context priming, using machine learning technology, also find application in identifying items in waste flows. Context priming is the principle that information about context can be used to improve processing of certain information, by narrowing the range of possible information types that must be considered. For instance, if context information is available indicating a waste stream originated from a sports stadium that serves a limited selection of food and beverage items, then the task of recognizing containers can focus primarily on recognizing containers associated with those limited number of items. Quicker identification with greater reliability may thereby be achieved.

The likely content of a waste stream, due to its origin, is one type of context. But more generally useful is context information derived from the waste stream itself. For example, if a patch of imagery is dominated by "Coke" red, or has a color histogram close to that of the label on a Dasani brand watermark bottle, then subsequent object recognition operations can be tailored in accordance with an increased probability that the item may be a Coke or Dasani container. Any data gleaned from a waste stream that makes presence of a particular item or class of items more likely (or less likely) can be used to tailor further object processing of the waste stream data (e.g., imagery) accordingly.

In a particular example, a convolutional neural network used in object identification in a waste recovery facility has plural processing layers (e.g., convolution, max- or average-pooling and ReLU layers), followed by one or more classification layers. Each layer is characterized by an array of coefficients (weights), stored in a memory. The coefficients of at least the initial processing layers may be static regardless of context. But as context information is discerned, the network can apply different sets of coefficients for use in one or more subsequent processing or classification layer(s) based on the context information. That is, different coefficients are applied based on different context(s). The context(s) can comprise color information (e.g., histogram), partial or complete decoding of a machine-readable symbology (e.g., barcode or watermark), detection of certain edges or shapes (e.g., suggesting particular objects), detection of SIFT, SURF or other image keypoints with associated descriptors (e.g., suggesting particular objects), etc. Each can trigger use of a corresponding set of coefficients in latter stages of a neural network which processes that imagery.

A particular example involves partial decoding of a UPC barcode on an item. UPC barcodes convey GTINs, each of which begins with a short code indicating the producing company (the "company prefix"). The company prefix for Coca Cola USA is 049000. If the first six symbols of a barcode on a container are found to be 049000, then the container is known to be as item marketed by Coca Cola USA. Layer coefficients in a neural network can then be loaded to tailor the network to distinguish just among items marketed by Coca Cola USA. (Generally, such tailoring of network coefficients applies to stages in the latter half of the network, especially the classification layer(s); coefficients for the earlier convolution stages are commonly not changed.)

Context information can comprise intermediate signals developed by the neural network itself, or another neural network. For example, a layer (e.g., a convolution, max-pooling or ReLU layer) before the classification stage(s) may respond to imagery depicting a cylindrical drink container with one of several patterns of signals that indicates an increased probability of a generally-cylindrical drink container being depicted in the imagery. A detector can look for such patterns of signals and, when one is found, can swap-in different coefficients for subsequent stages—coefficients that are more particularly tailored to cylindrical drink containers. Likewise for other item shapes.

By such arrangement, a consistent configuration of later stages is not used. Instead, in some instances, weights used in later stages are reconfigured in anticipation that the object is of a certain type. A network trained in this manner is more accurate for such types of objects, as it has a smaller class universe of items between which it is optimized to discriminate. (The patterns of signals from an intermediate layer, indicating the object is likely a cylindrical drink bottle, can be discerned by observation. As objects are fed through the system, the intermediate outputs are sampled for each item, and counts are compiled indicating how frequently each pattern of outputs arises with cylindrical bottles, versus with other items. The patterns that are thereby found to be most discriminative for cylindrical drink bottles are the patterns thereafter used to trigger swapping-in of cylindrical bottle-focused coefficients.)

Signals from the neural network, either intermediate layer signals as just discussed, or signals from a concluding classifier stage, can also be used in aid of watermark detection. For example, different network signals can be found to be associated with different orientations of plastic bottles. If an intermediate signal pattern indicates likely presence of a bottle with its top oriented at between 0 and 90 degrees in the captured image frame, then a set of DLS seed parameters focused on this watermark rotation range can be applied. The network may also be trained so that its classification layer outputs an estimate of container orientation, which can again trigger use of DLS seed parameters that are tailored accordingly. Context data indicating some information about likely orientation of a container—and its watermark signal—can thus be used to improve a watermark detection operation, yielding pose information more quickly and/or more accurately.

Figure 18:
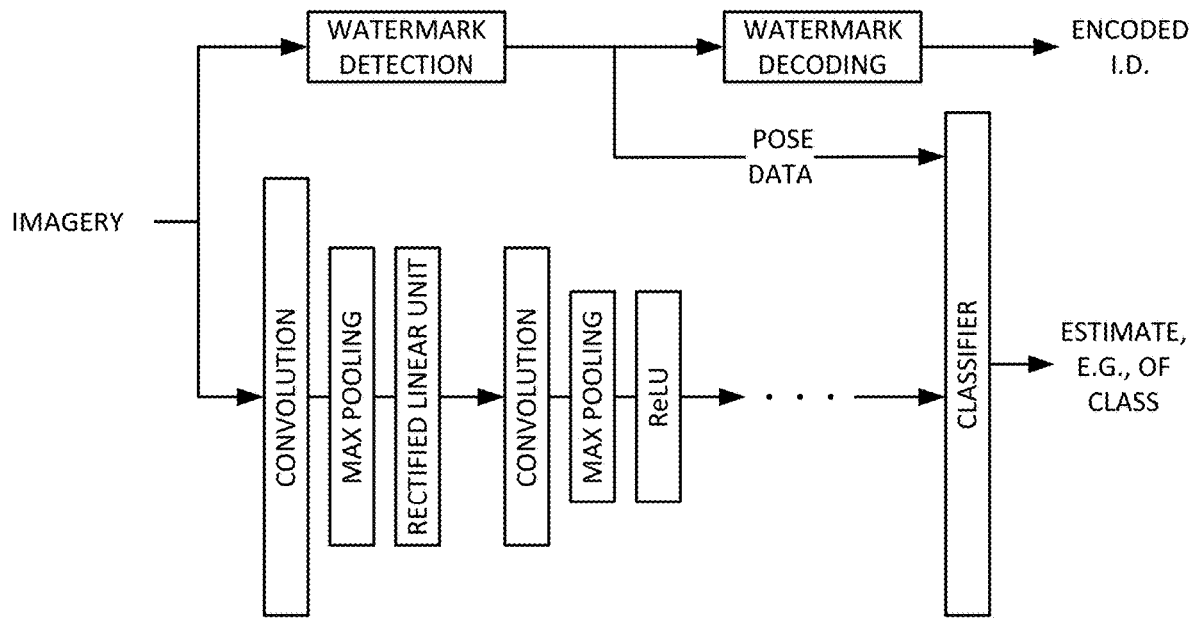
FIG. 18 shows one arrangement in which watermark information can be used in aid of neural network operation.

Similarly, watermark information can be used in aid of neural network-based image processing. For example, if watermark detection indicates an encoded object is present in an image block, with pose parameters of scale factor=1.1, and rotation (orientation)=37.4 degrees, these pose parameters can trigger substitution of different coefficients in one or more layers of the neural network—adapting the network to better respond to imagery in which an object is depicted with such pose. Alternatively, the watermark pose parameters can be input as supplemental data to a neural network processing the image data—either at the input to the neural network, or introduced at a later network stage. The network can be trained to make use of such watermark pose information to achieve more accurate predictions about an item depicted in the imagery. (FIG. 18 shows one such arrangement.)

Thus, in accordance with this aspect of the technology, a method includes sensing context information from a plastic object on a conveyor belt, and providing imagery depicting the plastic object to a neural network for processing, where weight or coefficient data for processing of the imagery by the neural network are selected in accordance with said sensed context information.

More generally, context information need not trigger use of different coefficients, but rather can be submitted to the input layer of a neural network—or to a later layer—as supplemental information. As noted, the network must naturally have been earlier-trained to make use of such supplemental input information in classifying the input image data. This richer input information enables more accurate output data.

The foregoing example referenced just two watermark-discerned attributes: scale and rotation. A watermark detector typically outputs more attributes—any or all of which can be used.

Instead of using final pose attribute data output by a watermark detector, a neural network can instead employ data about a set of pose alternatives, generated earlier in the watermark detection operation. As detailed in U.S. Pat. Nos. 9,959,587 and 10,242,434, and U.S. patent application Ser. No. 16/849,288, filed Apr. 15, 2020, one process for producing final pose data involves iterative evaluation of successively-refined sets of candidate pose parameters, which are termed "refined seed transforms," or "refined linear transform estimates" in the cited documents. Each set of candidate parameters has an associated correlation metric indicating the degree to which such parameters are consistent with the patch of imagery being analyzed. Such candidate pose attributes, and optionally the associated correlation metrics, can be input to a trained convolutional neural network as supplemental information, along with the corresponding patch of imagery to which they correspond. Again, training of the neural network allows it to use this supplemental input information to yield more accurate output information.

Convolutional neural networks normally operate on pixel data, i.e., rows and columns of intensity values sampled in the spatial domain. If, instead, the input data is expressed in a polar domain, certain advantages accrue—particularly if the data is transformed into the spatial frequency domain Patches of imagery expressed in polar form in the spatial frequency domain (sometimes termed the Fourier Mellin domain) can be analyzed by a trained convolutional neural network to detect frequency features by which object segmentation can be performed—without regard to the features' scales.

Each of the arrangements detailed herein can be practiced using imagery expressed in the polar, or polar/spatial frequency domain.

Context information need not be found in the particular patch of imagery being analyzed by a neural network. It can simply be in the same frame, or in one of the preceding N frames. If a particular container is identified in one frame, there may be an increased likelihood of encountering a corresponding screw-top lid for that particular container in one of the following N frames. If a beer can is identified in one frame, there may be increased likelihood of finding another beer can in one of the following N frames. Etc. Such context information from spatially- or temporally proximate imagery can be used to swap-in layer coefficients tailored to such context.

Thus, in a further aspect, the sensed context information comprises information determined from one or more previous frames of imagery depicting the conveyor belt, and the imagery depicting the plastic object that is provided to the neural network is none of said one or more previous frames of imagery.

Due to the small scale of watermark elements, imagery used in watermark detection typically has a fine resolution, e.g., with a pixel of imagery commonly corresponding to on the order of 150 microns of field of view. Such images typically comprise a million or more pixels. In contrast, neural networks commonly operate on input imagery that is smaller in size, such as by a factor of 2, 4 or 10. Some embodiments of the present technology employ neural networks with large initial layers, e.g., of size 1K×1K, or 2K×2K, pixels. These early layers are trained to discern watermark-related information, such as the presence of a watermark, and possibly estimates for one or more parameters describing pose of the watermark in the analyzed imagery. But later layers are more conventional in size, e.g., dropping to 512×512 or smaller (such as by max- or average-pooling operations). It is in the smaller layers that the network derives non-watermark features, on which image classification or other estimate is based.

Complex Surfaces

When a watermark signal is applied as a texture pattern to the cylindrical wall of a drink bottle, the entire curved surface is desirably watermarked. With more complex shapes, however, this may not be the case.

Figure 19:
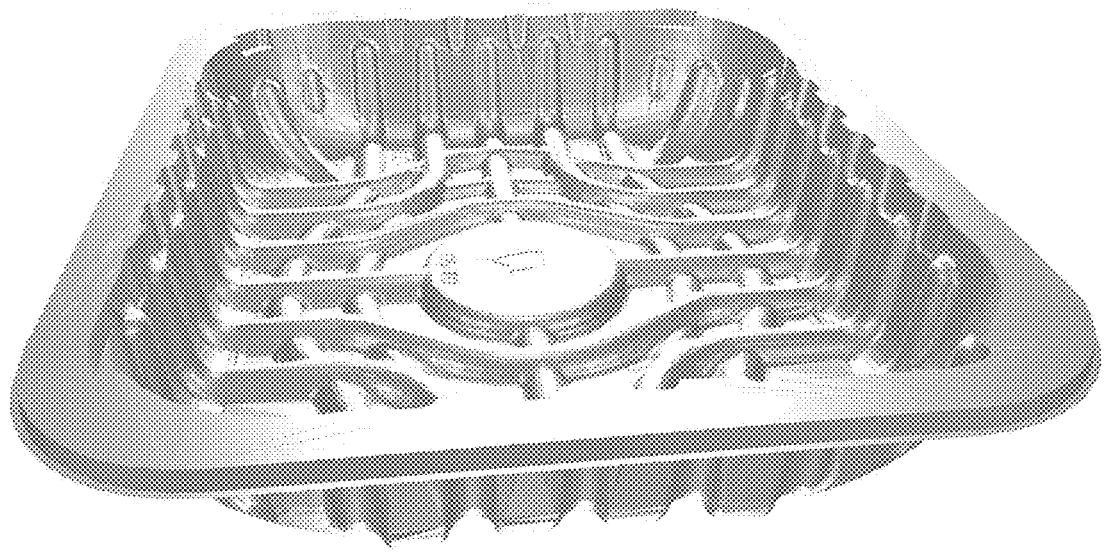
FIG. 19 shows a ribbed plastic tray.
Figure 20B:
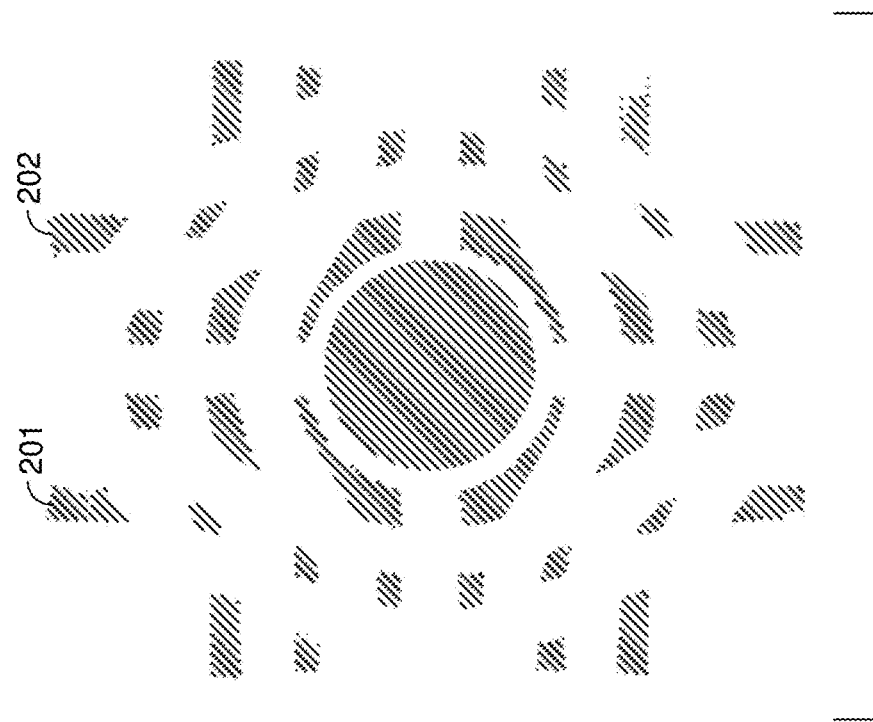
FIG. 20B identifies co-planar regions from FIG. 20A.
Figure 20A:
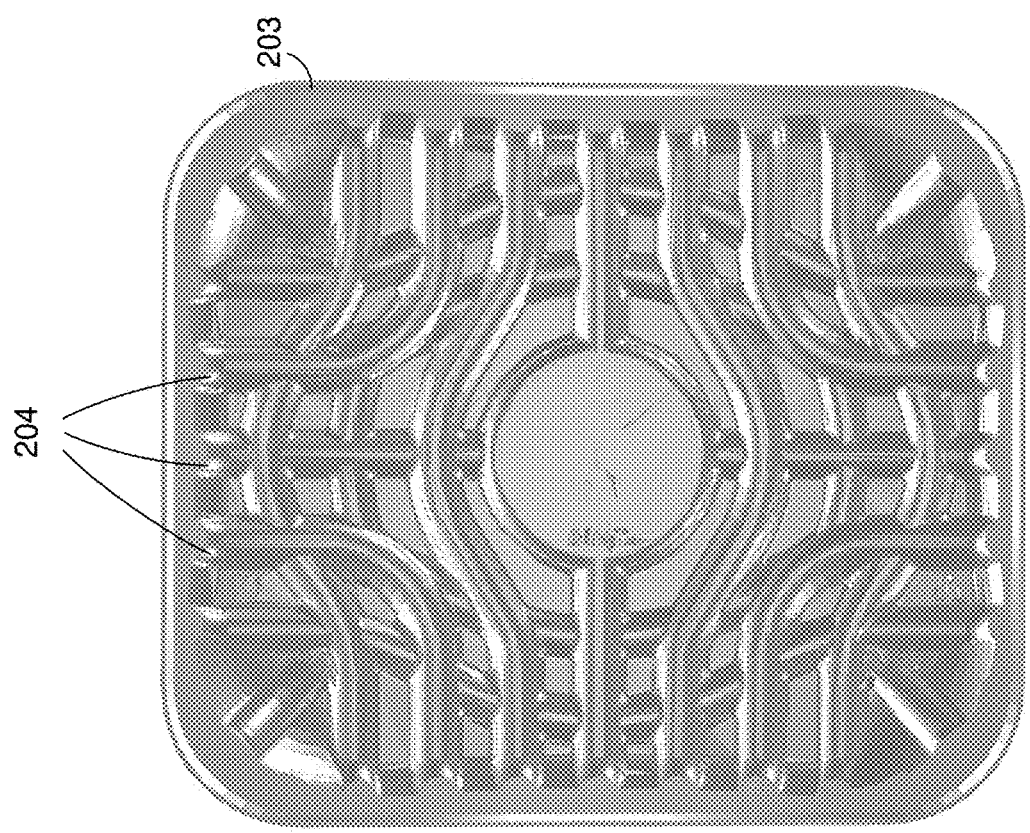
FIG. 20A is a bottom view of the tray of FIG. 19.

Consider the plastic meat tray shown in perspective view in FIG. 19, and in bottom plan view in FIG. 20A. (This is the MAP meat tray M1 by Mannock Pack.) Such tray has a complex shape tailored, e.g., to pool meat juices, and to provide 3D ribbing to enhance structural integrity. If the entirety of such surface is marked with codes, then different codes at different locations can appear to have different scales, orientations and perspectives to a code-reading camera system. Moreover, the varying surface features can cause certain code excerpts can be put into misleading juxtapositions, or occluded, depending on viewpoint. Such phenomena can confuse the code reading software and lead to sub-optimal results.

With such shapes it is sometimes preferable to apply watermark texturing only to coplanar regions, such as are denoted at 201 and 202 in FIG. 20B. This is desirably done by creating a tiled watermark pattern co-extensive with the surface area spanned by all the co-planar regions, and then masking-out those pattern regions corresponding to the non-coplanar regions. So-doing assures that the different patches of watermark pattern are spatially-synchronized with each other. This helps with both watermark detection and watermark decoding, by avoiding confusion due to adjoining excerpts of imagery that depict waxels lying in different planes and apparently having different scales, rotations and perspectives.

Sometimes an item will have two or more planes in which surfaces lie. In the meat tray example, the container has an upper lip whose underside region 203 defines a second co-planar region. Applicant often does not mark this surface due to the confusion it can introduce when trying to determine pose and payload for the co-planar regions shown in FIG. 20B. However, this is a judgment call that depends on the facts of particular situations.

(Marking only regions that lie in a common plane acts to limit the amount of signal that is present on the item. But the error correction and redundancy used in watermarking permit reliable operation notwithstanding such limitation in the total area marked.)

Thus, in accordance with this aspect of the present technology, an item comprises a continuous surface that defines a 3D shape. The surface has one or more first portions in a first plane, interrupted by one or more second portions in a second plane parallel to but different than the first plane. A 2D machine-readable code conveying a payload is marked on one, two or more of the first portions. Usually, however, no code is formed on the one or more second portions.

In the FIG. 20B example, the first portions are coplanar areas of the tray that are interrupted and segregated into non-contiguous parts by ribs (channels) 204. The ribs, themselves, have extrema that lie in the second plane, and are unmarked. In another embodiment, it is coplanar portions of the ribs that lie in the first plane and are marked, and the intervening areas (e.g., 201, 202) that are left unmarked.

The two planes are typically spaced by at least 2 mm, and more typically are spaced by at least 4 mm. This distance defines, e.g., the heights of the ribbing in FIGS. 19 and 20A.

It is desirable that at least 50% of the aggregate surface area in the first plane be marked with the code, and preferably at least 75% of the aggregate surface area is so-marked.

As noted, the 2D code typically comprises an array of plural code regions (most commonly identical code blocks) that are usually tiled to span the extent of the item surfaces lying in the first plane. Each of the code regions conveys the entire payload. Excerpts of this array of codes are not marked on the item because portions of the surface that spatially correspond to these excerpts do not lie in the first plane.

Other Indicia

It should be recognized that use of watermarks is not essential to identification of different plastics in a waste stream. Other known machine-readable indicia can be used, including QR codes, DataMatrix codes, DotCode indicia, barcodes and the like. One such alternative is a linear dot-based code, e.g., as reviewed in patent publication WO2021078842. In an exemplary arrangement, a straight- or Bezier-curved path defines a few dozen or so spaced candidate dot locations. Dot locations at the two ends of the segment are marked in a distinctive pattern to signal the start and end of the code. The intermediate dot locations are selectively marked to convey an identification code. In a particular embodiment a start code is followed by the identification code, and this sequence is then followed by a repeat of the same dot pattern in reverse order to form the complete code—with the identification code thereby expressed twice, and the end code being a dot-reversed counterpart of the start code. Such curved path codes can be formed at spaced-apart positions across a plastic item, to provide spatial redundancy. Such a code can be applied, e.g., to the first plane but not the second plane in the example of FIGS. 19-20B just-detailed.

Applicant's pending application 63/240,821, filed Sep. 3, 2021, details a variety of improvements and extensions to such linear dot-based codes (terming same "sparse path codes"), e.g., providing increased robustness and decreased visibility. By use of the detailed techniques, reliable decoding can be achieved with dot sizes as small as 20 microns, provided the imagery submitted for decoding has a pixel resolution on the order of the distance between dot locations. That is, if the code is imaged at a resolution of 150 pixels per inch (i.e., each pixel spans an area of 170 microns on a side), then the dot locations are desirably spaced at least 170 microns apart. (Experience indicates a spacing of 80% of the pixel pitch can be sufficient; that is the dot locations may be spaced 136 microns apart.) One way to achieve features of such dimension is by injection molding a matte-textured circle or other graphic primitive on a background having less surface roughness, as detailed in earlier-cited patent application Ser. No. 17/681,262. Another way is by security document printing technologies, such as gravure, and certain ink jet techniques.

U.S. Pat. No. 8,727,220 teaches twenty different 2D codes that can be embossed or molded into an outer surface of a plastic container.

An item may be marked with multiple instances of a watermark pattern or other code, with random noise interspersed between the blocks (e.g., as in publication US20110240739).

All such machine-readable indicia can be employed in embodiments of the present technology, in place of the detailed digital watermark indicia.

Ejection Improvements

Earlier discussions detail various arrangements for item ejection. These include determining center of mass, or centroid, of an item by methods based on watermark blocks, spectroscopy, AI, laser, belt tracking, etc. However, such arrangements generally operate on 2D item data. Sometimes 2D data can mislead, e.g., because the unknown third dimension may make determined ejection parameter(s) sub-optimal. For example, the center of mass of the 3D item may not correspond to the center of mass estimated from its 2D view.

FIG. 21 gives an example. Convolutional neural networks trained for item recognition/segmentation commonly estimate item position by specifying parameters for a rectangular box that bounds the item. While the center of the bounding box (shown by the bullseye target in FIG. 21) is an approximation of the center of item mass, it frequently is not accurate. Item ejection attempted based on such approximation can fail because the reality is more complex than the approximation. (In this instance, the neck part of the bottle, above the center of the bounding box, weighs substantially less than the portion of the bottle below the center of the bounding box. This leads to poor ejection results.)

Large liquid dispensers, e.g., for laundry detergents, exemplify a class of objects that commonly fail to eject properly because sensed 2D data is inadequate. A first example is shown in FIG. 22. Simple methods may determine extent of the item on the belt in 2D x/y space, and identify a center of this 2D extent. The result of such analysis may be the location indicated by the bullseye symbol 511 (placed at half the item height, and half the item width). This location may be targeted by an airjet to eject the item from the belt. Or a robotic manipulator may attempt to grip the item based on an assumption that this location is the center of mass. However, the distribution of weight is actually skewed due to item information not evident from the 2D data, and this skewing can cause such ejection attempts to fail.

In FIG. 22, this skewing of the weight distribution is caused, in part, by varying thickness of the item. On the right, the item is thick, to contain a large volume of liquid product. On the left the item is thinner, to provide a handle sized to fit in a user's hand. This difference in thickness (e.g., the "z" direction rising vertically from the conveyor, assuming the item is on its side) is not revealed by the 2D data.

Skewing of the weight distribution is also caused, in part, by the void 512 defined by the handle, which contributes no mass to the item. Many techniques simply determine an outline of a shape, and are not equipped to deal with such included voids in determining parameters for item ejection.

When such skewing of weight distribution is taken into account, a more optimal location at which to target ejection operations is shown by the bullseye symbol 513.

Another example of a commonly-mis-ejected item is shown in FIG. 23. This is another liquid dispenser, and it again includes a thinner handle portion and an included void. Moreover, it includes auxiliary elements, namely a pour spout 521 and a cap 522. From externally sensed data (even 3D data, as might be sensed by a Kinect 3D camera system), these auxiliary elements are not conspicuous. However, they significantly skew the item weight. The cap 522, in particular, is often made of a different material than the container itself, and this different material is commonly thicker and denser than the container material. Moreover, the cap plus pour spout plus neck of the container yield a double-wall, and in part a triple-wall, assembly in this region of the container, which is not evident from usual sensor data. Again, adjustment of a target ejection location is desirably applied to assure correct ejection, due to skewing of center of mass by the just-noted elements.

If the identity of the item is known, a database can be consulted to obtain metadata detailing the distance and direction by which the 2D-based center of mass determined by the system should be adjusted to account for skewed weight distribution. Watermark decoding is the preferred technique for determining such item identity, although other techniques (e.g., item recognition by AI) can be used.

Thus, a further aspect of the present technology involves capturing image data corresponding to an item on a moving conveyor, and from the image data identifying a 2D area for the item and identifying the item. A store of item metadata corresponding to the identified item is accessed. This metadata includes adjustment information about a center of mass for the item that is not coincident with a center of the identified 2D area. This adjustment information can comprise, e.g., a distance and/or direction by which the ejection center of mass should be displaced relative to the center of the 2D area for the item. The center of mass determined using this adjustment information is then used in sorting the item from the conveyor.

The frame of reference by which the adjustment information can be specified, and applied, is a cartesian coordinate system based on the center of the 2D area for the item, with the positive y axis oriented to the top of the item. This direction can be determined in the captured imagery by the watermark reference system (i.e., towards the top of the watermark block), or by an estimate of such direction by an AI system based on the appearance of the item in the imagery. Of course, in other implementations, other frames of reference can be employed.

Not all liquid dispensers found on a recycling conveyor include a cap, nor a pour spout; these may have been removed by a consumer prior to recycling. In a further aspect of the technology, the image data is analyzed to determine whether the item is paired with such an associated element. For example, a convolutional neural network may be trained to discern the presence of a cap or a pour spout on a container. Or other image recognition techniques, such as fingerprint-based methods (e.g., SIFT) or color histogram methods, can be used. If an associated element is detected, then an adjustment is made to the ejection location, based on information obtained from stored metadata.

Naturally, a cap on the container of FIG. 23 would conceal the presence of a pour spout. The system may apply a logic rule that if an original retail item configuration included a pour spout, and such item is found with a cap in place, then the system can assume that the pour spout is present too. A corresponding adjustment is then made to the center of mass. (If the item is recognized, by the just noted methods, to have a pour spout but not a cap, then a different adjustment is made to the center of mass—again by reference to stored item metadata.) The image data from which the 2D area of an item is discerned can be 2D image data gathered by a 2D sensor, or it can be line scan data—including line scan data as may be collected by a laser or an NIR spectroscopy sensor.

In a particular embodiment, the system learns which items benefit from adjustment of their ejection location (relative to the 2D center of mass determined by the system) by monitoring ejection accuracy. Ejection accuracy can be monitored by a sensing system that checks whether items that are intended to be ejected are actually diverted to their intended locations. For example, if certain items are to be ejected into a collection bin, the bin can be equipped with a light curtain or weight sensor that reports entry of new items into such bin. If an air-jet or other ejection mechanism is activated for an identified item, but no item is then sensed entering the destination bin, such fact can be logged, e.g., in metadata for the mis-ejected item.

After a period of system operation (an hour, a day, a week, etc.), the rates at which different items are mis-ejected can be computed, e.g., as fractions of the total counts of such items identified. For example, if a thousand liquid dispensers produced by Company A and a thousand liquid dispensers produced by Company B are identified during a week's operation, and ten of the former (1%) but one hundred of the latter (10%) are mis-ejected, then such fact can be flagged to the system operator for investigation. The operator may then review parameters governing ejection of the Company B containers (e.g., metadata indicating the weight and/or size of the bottle) and check such data for accuracy. If such data appears correct, the operator may examine the container and specify an offset by which the ejection location should be shifted, relative to normal system operation (e.g., based on belt tracking-based determination of center of mass), in a reasoned attempt to increase ejection accuracy. The operator may further consider the air-jet pressure and duration specified for use with the Company B container, and vary such parameters in an attempt to improve the ejection statistics for that bottle in a next measurement period. Such process can be repeated as necessary.

In a variant system, such adjustments to ejection parameters are not reasoned by a human operator. Rather, they are learned by the system based on experimentation. If a particular item has a high mis-ejection rate, the system can determine such fact from logged statistics, and make a trial change to ejection parameters—which may be random. For example, the system may try adjusting the targeted ejection point by one inch towards the bottom of the container (as determined from the watermark-defined frame of reference). Statistics are collected over a further period (e.g., a day or week) to determine whether such adjustment helped or hindered ejection reliability for that item. If it helped, the change is maintained; if it hindered, a contrary change is trialed. Further adjustments can be made to the targeted ejection point to optimize ejection accuracy. Similarly, automated adjustments of ejection air pressure, or robotic grip pressure, etc., may be trialed, in attempts to increase ejection accuracy for a particular item. Through such experimentation, the system learns which parameters yield best ejection accuracy. Such learning may then be shared with other sorting systems, at the same sorting facility or at different sorting facilities, by corresponding updates to the metadata for such item.

(While weight skewing due to original product configuration is illustrated by FIGS. 21-23, skewed weight distribution may also arise otherwise, such as by remaining product residue near the bottom of a container. Examples include crystalized honey in the bottom of a honey container, or dried glue in the bottom of a glue container. Again, the foregoing methods can be employed to discover that ejection rates for specific types of containers are not as expected, and to make corresponding adjustments to ejection parameters.)

Further Comments on Artificial Intelligence (e.g., Convolutional Neural Networks)

It should be understood that artificial intelligence systems are necessarily probabilistic, and the very best systems still make mistakes. Typically, such systems output a confidence score with each item identification. Unless the confidence score is above a threshold (e.g., 80%), the system makes no identification of an item. For example, if an AI system indicates an item is a particular drink bottle made of PET plastic with a 40% confidence, and indicates the item is a particular shampoo bottle made of PVC plastic with a 35% confidence (and indicates other compositions with still lesser confidences), the should be sorted neither as PET nor PVC.

An important consequence of the foregoing is that there is an unavoidable tradeoff between purity of the sorted plastic, and the recovery percentage. If a material recovery facility wants high purity bins (bales) of sorted plastic, it may insist on a stringent confidence test. For example, a system may be configured to require an AI system estimated probability of 95% before an item is declared to be of a certain plastic type. But few items may meet this high standard. As a consequence, perhaps just a minority of items on the belt may be identified and recovered. A majority of items are therefore identified as "uncertain" and are incinerated (or are returned for a second pass through the system).

This is a "false negative" error—failing to provide an identification for an item that the system is supposed to recognize.

If recovery percentage is prioritized, then bale purity suffers. Consider a system in which a more-relaxed confidence test is used—one requiring that the item identification have a probability above 65%, and that such probability must be at least twice that of the second-ranked classification. In such case, when an item's plastic composition is concluded by an AI system to be PET with a 70% probability, and PVC with a 18% probability, and HDPE with a 12% probability, then such item gets sorted into the PET bin. But on average, 30% of such items going into the PET bin are not PET.

This is a "false positive" error—items are sorted as one class when they, in fact, belong to a different class.

This is an unavoidable failing of systems using solely AI. Such systems cannot have both high recovery percentage and high bale purity. One must be sacrificed to increase the other. False negatives can be reduced, but only by increasing false positives. And vice versa. In all cases there will be both false negatives and false positives. The system designer's flexibility lies in deciding which of the two errors to reduce, at the expense of the other.

AI classification accuracy depends on the number of item classes being distinguished. If an AI's role is to identify an item either as a 12 oz. Coke bottle, or "other," it may have high accuracy. However, if it is to distinguish between thousands of different product containers, accuracy will necessarily drop. If a particular item is rarely seen (e.g., an obscure pharmaceutical container), then it can make sense not to train the AI to recognize it, due to the attendant reduction in correct classification of common items, such as Coke and Pepsi bottles. But such unusual containers may comprise, in the aggregate, a substantial fraction of items on the belt. (AI systems typically do not identify plastic type, per se, but rather identify particular products, e.g., based on shape, color and artwork. Plastic type is looked-up in a data structure, based on the product identification, such as a 12 oz. Coke bottle.)

Watermarking systems make essentially no false-positive errors. And as to false-negative errors, these depend on the degree of item crumpling and soiling—just as with AI-based systems. But since watermark identification can succeed from a postage stamp-sized excerpt of imagery—regardless of whether it depicts a logo on unprinted plastic, the false negative rate for watermark-based sorting systems is substantially below that of AI systems (especially since AI systems apply a confidence test to assure some measure of bale purity, which necessarily increases false negative rates).

In view of the foregoing considerations, a material recovery facility that uses both watermarking and AI typically should give precedence to watermark-based item identification. If the item does not bear a detectable watermark, then the item can be sorted in accordance with an AI-based item identification—provided it meets a specified confidence value. Additionally or alternatively, AI is employed to discern other item attributes, such as whether a cap is present on a drink bottle, or whether a tamper-proof hold ring (remaining after a cap is removed) is present. Similarly, an AI can be trained to assess a degree of item contamination, e.g., by exterior soiling, or internal product residue (ketchup in ketchup bottles, etc.). In such case, an item can be sorted based on two different criteria determined by the two different systems. For example, bottles that score 90% or higher on an AI-determined cleanliness score, which are made of PET as determined by watermark decoding, are sorted to one collection bin. Other bottles that don't meet the 90% cleanliness threshold by AI evaluation, but are made of PET per watermark evaluation, are sorted into a different collection bin. Etc. (Additional information on such systems is found in our pending application Ser. No. 16/944,136, cited earlier.)

Similar considerations can guide joint use of AI and spectroscopy in material recovery facilities. Spectroscopy-based systems provide a relatively more reliable identification of common plastic resins than AI-based systems, and should normally be given precedence—between the two—on resin determination. But an AI system can provide resin identification when spectroscopy fails (e.g., black plastics). And, as above, AI can provide further item attributes (e.g., presence of caps and soiling) that enable a further degree of item categorization for item sorting.

Although AI is normally a less-reliable indicator of plastic resin than spectroscopy, there are exceptions. One example is a clear milk bottle made of a first resin, wrapped in a printed heat-shrunk sleeve made of a second resin. The spectroscopy system would sort this item on the basis of the exterior, second resin, which would cause bale/bin contamination due to the presence of the first resin.

To address this problem, the metadata used by the AI system to indicate resin type based on product recognition information can sometimes include a flag indicating that the AI-indicated resin identification should be given precedence over conflicting spectroscopy-indicating resin identification—contrary to the usual precedence rules. If, for example the AI system recognizes the sleeved milk bottle by its shape and artwork, the associated store of metadata can indicate that the item includes two different resins. The associated flag data indicates that this AI-based resin identification should be trusted over spectroscopy-based resin identification.

Leading AI vendor serving the material recovery field include Amp Robotics and Tomra. Certain of their technologies are detailed in patent publications WO19089825, WO2021245118 and WO2021089602. Such teachings can be included in the details and arrangements described herein.

While reference was made to a few particular convolutional neural network architectures, it will be recognized that various artificial neural network approaches suited for image classification can be used. These include arrangements known to artisans as AlexNet, VGG, Inception, ResNet, XCeption and DenseNet. Further arrangements include ROLO, Adversarial Networks, and Single Shot Detectors. Some image sensors include integrated neural network circuitry and can be trained to classify different objects by their appearance, thus making such sensors suitable for use in embodiments detailed above.

Additional convolutional neural network arrangements that are suitable for use in the embodiments described herein are detailed in US patent documents 20160063359, 20170243085, 20190019050, 20190102646 and U.S. Pat. No. 10,664,722.

It will be understood that for a neural network to respond to certain input data by producing certain responsive output data, it must first be trained. Training is often done by a supervised learning process, using sets of input training images, each labeled to indicate the output classification to which it belongs. Parameters (coefficients, weights) of the network layers (e.g., convolution and softmax classification layers) are adjusted in an iterative training procedure based, e.g., on gradient descent methods (including reverse gradient descent, and stochastic gradient descent). Such training methods are familiar to the artisan as shown, e.g., by Wikipedia articles on Convolutional Neural Network, Gradient Descent and Stochastic Gradient Descent (attached to application 63/260,264), and references cited therein. Such methods iteratively refine network parameters to minimize a loss function. The loss function, in turn, reflects errors made by the network, e.g., in classifying depicted items, and/or in determining the coordinates of a bounding box that locates the item within the input data. Through refinement of these parameters during training, these errors are minimized.

(Although discussion of neural networks commonly uses terminology of hardware, such as layers and connections, it will be understood that such networks are most typically implemented in software.)

References to the neural networks processing input data of size 512×512 is naturally exemplary rather than limiting. Other dimensions can be employed (e.g., 448×448, 256×256, 224×224, etc.).

Retraining of large neural networks can be laborious. If a convolutional neural network used for plastic waste stream sorting seeks to classify many thousands of different item types, it becomes burdensome to retrain the network when new item types are added. To deal with this issue it can be desirable to provide plural output classification sections (e.g., softmax classifiers), each of which is driven, in parallel, by outputs from the preceding convolutional stages. One classifier can be larger, e.g., capable of discriminating between up to a thousand or more different classes of items. A second can be smaller, e.g., capable of discriminating up to 5, 50 or 500 different classes of items. As new items are added to the set to be recognized, the smaller classifier can be retrained to handle same. Such retraining can occur frequently. The larger classifier is used to discriminate between legacy items—items that have long been found in the waste stream. This classifier is retrained rarely, e.g., when the capacity of the smaller classifier is reached and its items are to be transferred, for recognition, to the larger classifier. See publication US20200356813.

Another approach is to employ multiple smaller neural network classifiers. For example, one neural network examines camera imagery to classify it as a 500 ml Coke bottle, a 500 ml Pepsi bottle, or neither. A second network examines the camera imagery to classify it as a Dasani water bottle, a Kirkland (Costco) water bottle, an Aquafina water bottle, or none of those. A third examines the imagery to classify it as a Head and Shoulders shampoo bottle, a Pantene Pro-V shampoo bottle, a Suave shampoo bottle, or none of those. And so forth. There may be a dozen, or dozens of dozens such classifier networks. Each of the classifiers can evaluate each frame of captured imagery, and whichever item classification (other than "none") earns the highest confidence is taken to be the correct classification.

Desirably, the items that appear most similar to each other are grouped together and are judged by a network that has been trained to sense the slight features that differentiate their similar appearances. In some embodiments, different items are ejected into a common repository due to their common plastic resin. In some other embodiments, brand-specific items (e.g., 500 ml Coke bottles) are ejected into a correspondingly-specific repository, so that such items can be newly made from their predecessors.

In another embodiment, neural network classification is not employed for general item identification, but rather to identify "problem" items. An example is bottles with their caps screwed on. The cap may be made of a different plastic than the bottle, leading to contamination.

An emerging problem is monolayer PET bottles whose resin is formulated with an oxygen scavenging compound, to extend the shelf life of certain food and drink items (e.g., bottled orange juice and iced tea). When such compounds (e.g., unsaturated polymers such as polybutadiene) pass through the recycling process, they tend to turn the resulting recyclate a dingy yellowish color.

Accordingly, another aspect of the present technology is to employ a classifier trained to identify orange juice, iced tea, and other containers made of PET that are known to include yellowing oxygen scavenger compounds in their resins, and eject them to a first repository different than PET items lacking such compounds, which are ejected to a second repository. Items in the first repository are used to produce PET recyclate in which color is not critical. Items in the second repository are used to produce premium PET recyclate, where clear color is paramount.

Overlapping/Adjoining Items

Although waste items are usually distributed across a conveyor belt in isolated (singulated) fashion, with empty areas of belt separating items, this is not always the case. When two waste items touch (adjoin) or overlap, they can be mistaken for a single item. A determination of attribute information (e.g., plastic type, or food/non-food, etc.) about a first item at one point on the conveyor belt (e.g., as when a patch of watermark signal or a NIR signature at one location indicates a particular type of plastic) can thus be mis-attributed to waste occupying an adjoining region of belt that is actually a second item. Both items may be ejected together into a collection bin, impairing purity of the items collected in that bin. Or, attempted air jet diversion targeted to a central point within the collective area occupied by the two items can deflect the two items in unexpected directions, again leading to undesired results.

As referenced earlier, a region growing algorithm can be employed to determine the physical area on a belt occupied by an item. Region growing algorithms are familiar to image processing artisans. Other names for such processes are blob extraction, connected-component labeling, and connected component analysis. An exemplary region growing algorithm starts with a seed pixel, which is assigned a label (e.g., an object ID, such as an integer number). Each pixel that adjoins the seed pixel is examined to determine if it has a particular attribute in common with the neighboring seed pixel. In the present case, this attribute can be a sensed NIR response indicative of non-belt. In one example, if the neighboring pixel has an 8-bit greyscale value below 15 in each of the sensed NIR wavelengths, it is regarded as depicting the conveyor belt; else such value indicates non-belt (i.e., waste on the belt). Those neighboring pixels that are indicated as non-belt are assigned the same label as the original seed pixel. This process continues from each of the just-examined pixels that were labeled in common with the original seed pixel. In this fashion, regions of imagery contiguous to pixels having a particular labeled attribute are progressively-explored and labeled in common with the seed pixel until an outer boundary is reached where no other pixel adjoining labeled pixels meets the tested attribute. The resulting collection of labeled pixels defines a contiguous area apparently spanned by an object on the belt.

Although just-described on a per-pixel basis, region growing algorithms can work on blocks of pixels instead, e.g., of size 8×8 or 32×32 pixels, and each block is labeled in common with a seed block, or not, depending on whether the attribute is present. The attribute can naturally be other than greyscale level. Presence of an image edge within a block, or presence of a threshold amount of high frequency content within a block, are two of myriad other attributes on which region growing can be based.

(It will be recognized that processes detailed earlier, e.g., in which several adjoining blocks that are judged to be non-belt based on lack of correlation with historical belt map data, are grouped together as a common object, are themselves examples of region growing algorithms applied to determine the extent of waste on a conveyor belt.)

Region growing can be used with NIR, watermarking, and other technologies. Consider a PET drink bottle wrapped around its mid-section with an NIR-opaque label. To an NIR system, such a drink bottle can appear as two spaced-apart regions of PET plastic, since the intervening label does not look like PET. This risks mis-ejection, since the two spaced-apart regions can be separately targeted by the ejection system, causing the bottle to tumble in unanticipated directions. To overcome this issue, region-growing can be applied to determine that the top and bottle PET items are actually physically joined and form a unitary body. Ejection can thus be targeted at the center of the unitary body.

Consider, now, a conveyor belt in which a scrap of HDPE bubble wrap lays across the mid-section of a liter drink bottle. As in the case just-discussed, a region growing algorithm can explore the physical extent of this seeming shape and identify a single unitary body that includes the top and bottle of the bottle, but also includes the overlaid bubble wrap. Similarly, if two PET bottles are touching on the belt, a region growing algorithm can identify a single unitary body that includes both of the bottles. As just-discussed, the centers of these discerned unitary bodies may be targeted for ejection, leading to undesired results (including contamination of the PET bin with HDPE, mis-counting of recovered items, and mis-ejection).

To address such problems, an artificial intelligence system is used to provide a judgment on whether imagery depicts a single item, in isolation, or two or more items in adjoining or overlaid positions. If the AI system concludes the imagery depicts two or more items that adjoin/overlap each other, then this conclusion is used to temporarily disable operation of the ejection system. Such waste simply passes to a bin that collects uncategorized items at the end of the conveyor. (These items can be reprocessed in a second-pass, in which they might be presented in a non-adjoining/overlapping fashion.)

The imagery on which the AI system operates can be from a camera used for NIR or watermark detection, or it can be a distinct camera. The camera can provide imagery in the form of 1D, 2D or 3D image data, and/or depth map data.

Such AI system can be any form of binary classifier. While applicant prefers use of a convolutional neural network, other forms of classifiers can be used. One of many other suitable alternatives is a SVM (support-vector machine) classifier.

Figure 24:
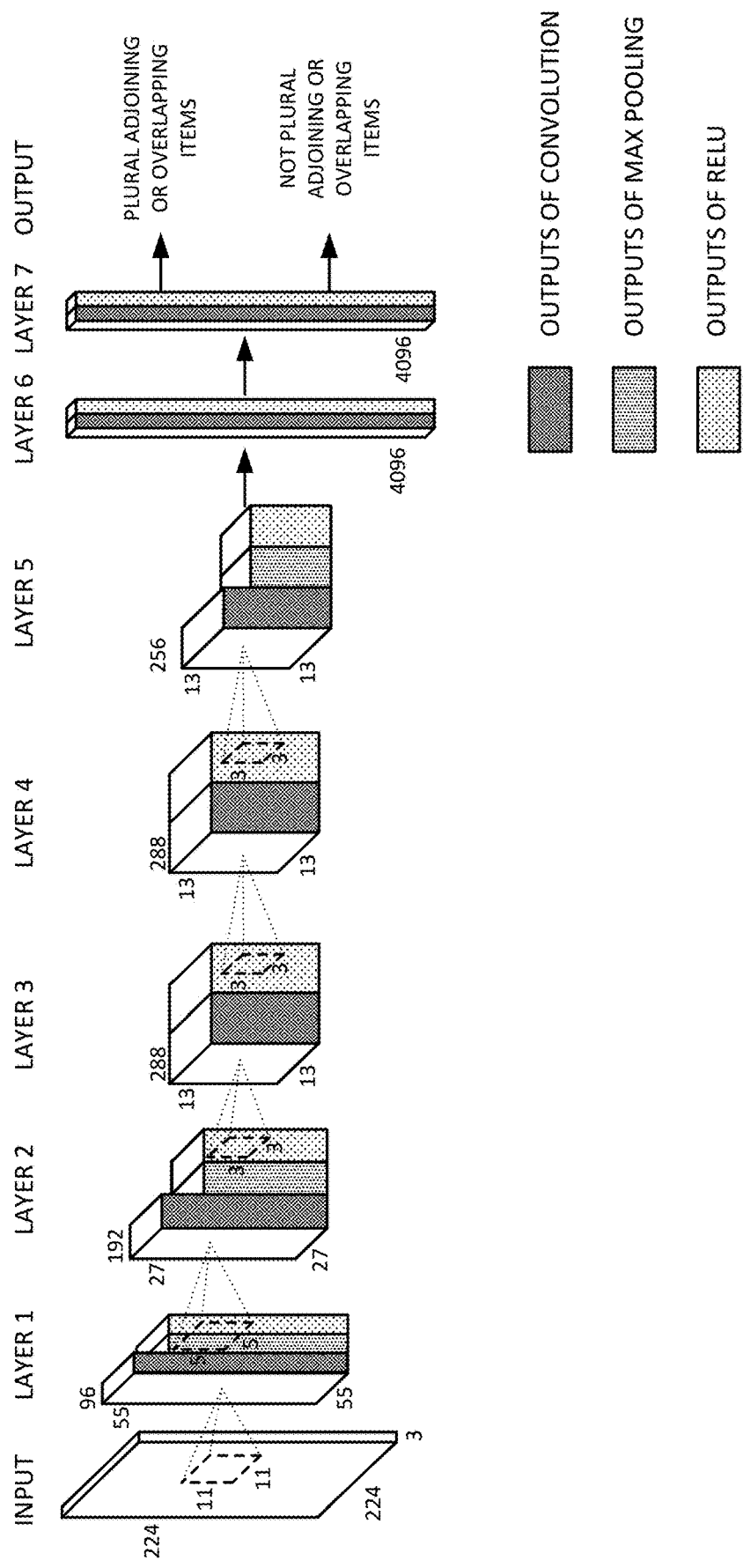
FIG. 24 depicts a convolutional neural network suitable for judging whether imagery depicts plural adjoining or overlapping items, or not.

An illustrative neural network is shown in FIG. 24, and is based on the network disclosed in Babenko, et al, Neural codes for image retrieval, arXiv preprint arXiv:1404.1777 (2014), and discussed in U.S. Pat. No. 10,664,722. Input imagery from the camera, depicting a region of the belt, is down-sampled to 224×224 pixels. It is then processed by multiple convolutional layers (including max-pooling and ReLu processing layers) before being provided to output classification layers. The classification layers provide two output data: one indicating a probability that the input imagery depicts plural adjoining or overlaid items, and another indicating a probability that the input imagery does not depict plural adjoining/overlaid items. If the former output data has a specified relationship to the latter output data (a simple case is if the former is larger than the latter), then ejection is suppressed for the depicted waste to avoid bin contamination and item mis-ejection.

Training of the FIG. 24 network desirably starts with transfer learning. That is, layer coefficients/weights are set to initial values learned during previous training of the network for another purpose—such as to classify images in the ImageNet database. New training images are provided to the network. Each training image has been previously tagged (labeled) to indicate that it depicts plural adjoining/overlaid items, or not. Thousands of such labeled images are provided to the network, and the output produced for each input image is noted, and compared with the correct, labeled, output corresponding to that image. These results are compiled and used in a gradient descent learning process to adjust the values of convolution coefficients and classifier weights in a manner calculated to improve classification accuracy of the network. (Often, no change is made to layers 1 or 2, and sometimes no change is made to layer 3; instead, all adjustment occurs in subsequent stages.) This training (learning) process cyclically repeats, e.g., until a point of diminishing returns is met. (Such training is familiar to the artisan. Related details and improvements, including how large numbers of synthetic training images can be derived from a smaller set of training images, are disclosed in U.S. Pat. No. 10,664,722.)

Although described above in the context of NIR-based sensing of plastic type, the same principles apply to item attributes other than plastic type, and to identification technologies other than NIR. For example, a watermark system may identify a block of imagery as conveying a payload that indicates an object is a container used for food. A region growing procedure is applied to determine apparent extent of the container, to target diverter action. This region-growing may extend into an adjoining, non-watermarked, non-food container—wrongly-identifying it as part of the watermarked food container. The AI system can identify this circumstance and not operate a diverter to eject such waste, thereby avoiding contamination of the food-grade plastics collection bin.

One embodiment of this aspect of the technology thus involves an AI system analyzing imagery from a region of belt, and suppressing item ejection from such region if the AI system finds the region includes adjoining or overlapping items.

A more elaborate embodiment includes determining attribute information from waste at a first location on a waste-conveying conveyor belt, and providing imagery depicting this first location to a convolutional neural network. In response to receiving an output from the convolutional neural network indicating presence of only one waste item (i.e., not indicating presence of two or more adjoining/overlapping items), a diverter mechanism is controlled to act on the waste item. Such arrangement further includes determining attribute information from waste at a second location on the conveyor belt, and providing imagery depicting this second location to the convolutional neural network. In this instance, an output from the convolutional neural network indicates presence of two or more adjoining or overlapping items. As a consequence, a diverter mechanism is not controlled to act on waste at this second location (e.g., operation of the diverter that would otherwise occur is suppressed as respects the waste at the second location).

A related method comprises determining attribute information from waste at a first location on a waste-conveying conveyor belt, and determining a first contiguous area around the first location that is occupied by waste. Imagery depicting this first contiguous area is provided to a convolutional neural network. An output received from the convolutional neural network indicates that this first contiguous area is occupied by only one waste item. As a consequence, a diverter mechanism is controlled to act on a diversion target within this first contiguous area, to direct the waste item to a repository associated with said determined attribute information. The method further includes determining attribute information from waste at a second location on the conveyor belt, and determining a second contiguous area around the second location that is occupied by waste. Imagery depicting this second contiguous area is provided to the neural network. An output is received from the network indicating that the second contiguous area is occupied by more than one waste item. As a consequence, no diverter mechanism is controlled to act on a diversion target within this second contiguous area.

A more particular embodiment employing watermark data involves compiling historical conveyor belt map data derived from images depicting a conveyor belt loop at positions throughout a full cycle of conveyor belt travel. After compiling this historical conveyor belt map data, first imagery is captured depicting a first region of the conveyor belt with waste thereon. By comparison with the historical conveyor belt map data, a first set of conveyor belt area blocks depicted in the first imagery in which the conveyor belt is visible, is identified. Likewise, a second set of conveyor belt area blocks depicted in the first imagery in which the conveyor belt is not visible is identified. This second set of area blocks includes a first clump of adjoining area blocks. Imagery depicting this first clump of adjoining conveyor belt area blocks is provided to a convolutional neural network. An output from the convolutional neural network is received and indicates that the first clump of adjoining area blocks is occupied by a single waste item only. A diverter mechanism is controlled to act on a diversion target within this first clump of adjoining conveyor belt area blocks, to remove the single waste item to a repository. The method further includes, after compiling the historical conveyor belt map data, capturing second imagery depicting a second region of the conveyor belt with waste thereon. By comparison with the historical conveyor belt map data, a first set of conveyor belt area blocks depicted in the second imagery in which the conveyor belt is visible is identified, and a second set of conveyor belt area blocks depicted in the second imagery in which the conveyor belt is not visible are identified. This second set of area blocks includes a second clump of adjoining area blocks. Imagery depicting this second clump of adjoining conveyor belt area blocks is provided to the convolutional neural network. An output from the convolutional neural network is received and indicates that said second clump of adjoining area blocks is occupied by more than one waste item. In this circumstance, a diverter mechanism is not controlled to act on a diversion target within the second clump of adjoining area blocks.

If an AI system indicates only one item is present at an imaged area of the belt, then once any part of the item is processed to determine an attribute (e.g., watermark payload, plastic type, food/non-food, etc.), then further processing of connected components of the image data can stop, since those connected components can be understood to have the same attribute. If the AI system indicates two or more items are present at an imaged area of the belt, then watermark or other analysis can be stopped (or not started) since no ejection will occur. Alternatively, analysis can proceed and extend to connected components, e.g., for gathering statistical information from waste—even if not ejected.

Maintenance and Reliability

The technologies detailed herein typically operate in harsh, dirty environments. Systems should accordingly be designed in anticipation of related challenges.

One potential failure point is the cameras. Various failures can occur. One is dirt or dust lodging on the lens of a camera, causing a persistent artifact on the camera imagery, and a consequent blind spot. Cameras can be monitored for such failures by periodically examining each pixel value and, e.g., compiling a histogram that details the historical distribution of its values, or simply computing the pixel's historical mean or median brightness. If a pixel, or a neighborhood of pixels, is found to have values that no longer follow the historical pattern—particularly if their output values are substantially unchanging—a responsive action can be taken. Similarly, a histogram can be compiled detailing the historical detection of objects, or detections of watermark reference signals, or detection of other regions of interest, in different swaths of the belt. If a part of the belt "goes quiet" for a sequence of frames that is statistically improbable based on historical norms, then this, too, can trigger a responsive action. Relatedly, the "sharpness" of imagery from different cameras can be monitored (e.g., based on high frequency image content) and compared against historical norms. More generally, any image statistic that does not conform to historical expectations in a statistically-significant manner (e.g., within two or three standard deviations) can be a sign of failure and trigger a responsive action. (Other exemplary image statistics include luminance mean, standard deviation, and/or variance of pixels, pixel blocks, or image frames.)

In other arrangements, instead of comparing a camera's behavior to historical norms, its behavior is compared to that of a neighboring camera. If one camera's statistics are found to drift or suddenly diverge from statistics of a neighboring camera, a response can be triggered.

Thus, one aspect of the technology is a waste sorting method that includes, at a first time, deriving first statistics from imagery captured by a first camera depicting waste stream items moved past the first camera on a conveyor belt. These first statistics are compared against second statistics derived from other imagery depicting waste stream items on the conveyor belt, and determining that the first and second statistics differ by more than a threshold amount. (These second statistics can be derived from imagery captured by the same first camera at a second time earlier than the first time, or they can be derived from imagery captured by a second camera that adjoins the first camera in an array of plural cameras spanning a width of the conveyor belt.) In response to such determination, a responsive action can be triggered, such as alerting facility personnel, or flagging the first camera for maintenance.

A different failure is a camera going dark—providing no imagery. This can arise, e.g., due to physical vibration that shakes a connection loose—either inside the camera, or in its external cabling. The just-detailed approaches will indicate this failure, but so will simpler approaches, e.g., monitoring pixel values to confirm each occasionally varies.

Some problems are not as evident as a camera unit going dark. A common problem in industrial settings is packet loss, due to the high level of ambient electromagnetic noise. Cameras of the sort employed in typical embodiments provide image data to the computer(s) in packet-based form. If a cable shield becomes loose or disconnected, packet loss rises, diminishing the quality and/or quantity of camera data available for analysis.

There are a variety of tools available to monitor packet loss on a network connection—both integrated within a computer's operating system, and auxiliary tools. If packet loss on a camera network connection is found to rise above historical norms, this too can trigger a responsive action.

In the event of camera or cable trouble, a range of responsive actions is possible. One is simply to alert maintenance personnel of the circumstance, e.g., through an audible alarm, console screen warning, email, or an entry in an error log—depending on the severity of the event. Additionally or alternatively, other imagery can be used in lieu of the suspect imagery. The other imagery can originate from a camera that images an adjoining area of belt. As indicated, e.g., in publications US20190306385, US20210299706 and US20220055071, a belt that is two meters in width may be monitored by an array of cameras—each viewing a respective lane (strip) of the belt. Such cameras typically have fields of view that overlap with their adjoining neighbors. This redundant imaging of certain parts of the belt can provide a "fail-over" alternative, so that when a problem is indicated with one camera, imagery from an overlapping stripe of pixel data captured by an adjoining camera can be used instead.

Where "up time" is paramount, a system can include a twin to each of the cameras. Usually, imagery from a first of the twinned cameras is employed for item identifications. But data or image statistics from twinned cameras are continuously or occasionally compared to assure that they match each other within some margin of error, and/or are within historical norms. If a deviation is detected, the camera having the more trustworthy-appearing data (e.g., the one with the most visual activity) is provided to the analysis system, while the other camera is flagged for a responsive action (e.g., maintenance attention).

Maintenance can be added by having one or more "hot spare" cameras connected to the system, and available for physical placement at the lane position of any camera that is found to have a failure. This capability is aided by having each of the cameras connected to a data multiplexer hub. The multiplexer can logically assign any camera (including the hot spare(s)) to any lane of the belt. If a camera needs replacing, the multiplexer can be instructed to substitute the data from the hot spare camera for that of the failed camera, and a technician can swap the spare camera into the place of the failed camera.

Lighting can also fail, and/or lighting strobes may become desynchronized from camera frame captures. Such problems can be sensed in manners similar to the above-noted image-based methods. For example, if a lighting unit goes dark or out-of-sync, that will affect the camera-collected image statistics and indicate a problem. Likewise if a sub-part of a lighting module fails, such as a drive circuit that powers red colored LEDs within a module having multiple LED colors.

Other methods can also be used to sense lighting failures, such as a drop in current consumption compared to historical norms, or compared to other lighting units.

Histograms and historical norms may commonly go back an hour, a day, or a week or so, since most failures are sudden and such short histories are adequate. But other failures, such as component aging, can require longer analysis periods—in some cases years—to appear. Typically, the longer the period, the simpler the measurement. Component aging within cameras or lighting systems, for example may be tracked by measures such as median pixel brightness or average current consumption.

In one particular embodiment, nominal operation of the system is defined by a set of parameters—such as packet loss, mean current draw by the lighting units, and different image statistics, etc. Collectively, these parameters comprise a multi-dimensional descriptor of system state. There is a corresponding envelope of acceptable system states, and possibly several tiers of abnormal system states (each of which may trigger a different type or level of response). Slight deviations in individual parameters (e.g., an 8% rise in packet loss during the past five seconds, or a 10% drop in frame brightness during the past ten seconds—as compared to historical norms) may not be regarded as an abnormal state. But if both such deviations co-occur, then this circumstance may be classified as an abnormal state that triggers a response.

Computers, too, can fail. Similar arrangements can be used as with cameras, above, to detect, report and respond to failures.

In addition, processing among several computers (or microprocessors) can be virtually reallocated in the event of a failure. In the case of a two computer system, if one computer fails, the second computer can be assigned to handle all of the processing, albeit on an adjusted basis. For example, instead of analyzing 300 candidate blocks in each image for watermark data, the sole remaining computer can process imagery from twice as many cameras, but at half the rate (e.g., 150 blocks from each image, with reduced block overlap).

The just-mentioned camera multiplexer can be similarly extended to permit any camera to provide imagery to any of several computers. Hot spare computers can be among those connected to the multiplexer.

Provision can also be made to facilitate periodic or occasional testing of cameras, lighting and computers. For example, a photogrammetric target can be mounted on a fixture (stick) and placed over a moving, but empty, belt. Captured imagery can be analyzed (e.g., triggered based on a watermark or other machine-readable code on the target) to check that greyscale levels, focus, sharpness, and/or other image statistics, are within expected values, when illuminated under different lighting conditions. If the test is passed, the system may operate the blowout jets in a distinctive cadence to audibly confirm to the operator holding the stick that the test has been satisfactorily completed.

Relatedly, the cameras may view the conveyor belt through a protective glass window, which limits dust contamination of the cameras' lenses. The cameras' aspect ratios typically provide more rows of imagery than are needed, since width of the camera sensor array is usually the more critical dimension (i.e., to span a two meter belt). These surplus rows may image a region of the protective glass to which a test target is mounted. In a particular embodiment, when a camera test mode is invoked (e.g., by touching a corresponding control on the operator's touchscreen), these extra rows depicting the target are grabbed from the camera and analyzed. Although out of focus (since near the camera), statistics such as greyscale values can be determined and checked against reference values to help detect camera problems. If the results are within expected ranges, the control button on the touchscreen is switched to a green color; if the results are outside expected ranges, the control button is switched to a red color.

In other such embodiments, the test target is not mounted on a protective glass window, but is mounted elsewhere, such as on a structural framework member in the facility and within the field of view imaged by these surplus rows.

In still other embodiments there is no test target. Instead, objects in the environment that are imaged by these surplus imager rows (e.g., structural framework members) are, themselves, treated as reference objects. Any change in depiction of these objects (or statistics derived from such imagery) serves as a means to determine that camera behavior has changed, so that a responsive action can be triggered.

Thus, in accordance with certain of the foregoing aspects, a method includes identifying items conveyed past a camera on a conveyor belt by analyzing camera imagery depicting the items on the conveyor belt. The camera has a field of view but the items are depicted only in a subset of the field of view rather than in an entirety of the field of view. The method further includes deriving first image statistics from imagery depicted outside the subset of the field of view, and comparing these first image statistics against reference statistics derived earlier from imagery depicted outside the subset of the field of view. In some instances, the first and reference statistics are determined to differ by more than a threshold amount. In response to such a determination, a responsive action is triggered.

CONCLUDING REMARKS

It bears repeating that this specification builds on work detailed in the earlier-cited patent filings, such as publications US20190306385, US20210299706 and US20220055071. This application should be read as if the disclosures of the cited documents are bodily included here. (Their omission shortens the above text and the drawings considerably, in compliance with guidance that patent applications be concise, to better focus on the inventive subject matter.) Applicant intends, and hereby expressly teaches, that the improvements detailed herein are to be applied in the context of the methods and arrangements detailed in the cited documents, and that such combinations form part of the teachings of the present disclosure.

While the focus of this disclosure has been on plastic containers, the technology is more broadly applicable. The detailed arrangements can be applied to items formed of metal, glass, paper, cardboard and other fibrous materials, etc. Similarly, while reference has often been made to bottles, it will be recognized that the technology can be used in conjunction with any items, e.g., trays, tubs, pouches, cups, transport containers, films, etc.

Moreover, while the emphasis of the specification has been on recycling, it should be appreciated that the same technology can be used to sort items for other purposes (e.g., sorting packages on a conveyor in a warehouse or shipping facility).

Reference has been made to recycling. Recycling is typically a two-phase process. A material recovery facility (MRF) processes incoming trash and performs an initial separation. Segregated fractions are then transported to other facilities, which are specialized in recycling different components. Glass goes to a glass recycler, paper to a paper recycler, etc. A MRF may, but does not always, divide plastics into several fractions, e.g., PET, HDPE, and other. Each fraction can be routed to a recycling facility specialized to that type of plastic. At the recycling facility, a further separation can take place. For instance, PET plastic may be sorted into food/non-food, clear/colored, virgin/previously-recycled, mono-layer/multi-layer, items with metallization layers/items without metallization layers, etc.

Which type of sortation occurs at which facility (MRF or recycling) is somewhat arbitrary, and depends on local needs. For example, separation of PET from HDPE can occur at an MRF or at a recycling facility, etc.

The technologies detailed above can be employed at both MRFs and recycling facilities. When the specification refers to a material recovery facility, this should be read as also including a recycling facility. Similarly, when the specification refers to a recycling system, this should be read as also including a material recovery system.

It will similarly be understood, by way of illustration, that NIR may be used at a material recovery facility to compile a bin of PET plastics. This bin can then be transported to a recycling facility, where watermarking (or AI or other technology) is employed to sort the PET plastics into finer categories. These finer categories can include, e.g., any or all of: food/non-food, virgin plastic/recycled plastic, bioplastic/petroleum-based plastic, monolayer/multi-layer, items with/without metallization layers, items with/without specified additives (e.g., fluorescing tracers, oxygen scavengers, etc.), Coke bottles/non-Coke bottles, capped bottles/uncapped bottles, clean containers/dirty containers, etc., etc.

Although the specification emphasizes watermarks, NIR spectroscopy, and AI as techniques for determining information about objects for purposes of sorting, there are a great variety of other item identification methods that can be incorporated in a recycling sorting system and used in conjunction with other technologies as described herein. Some are detailed in Zou, Object Detection in 20 Years: A Survey, arXiv:1905.05055v2, May 16, 2019, which forms part of U.S. patent application 63/175,950 and is incorporated by reference. The present application should be understood as teachings combinations of the technologies detailed by Zou with the features and approaches detailed herein.

Another alternative object identification technology involves incorporating tracer compounds in the plastic, or in ink printed on containers or their labels. Exemplary are tracers marketed by Polysecure GmbH which, when stimulated with 980 nm illumination, respond by fluorescing at green, red and far-red. Such tracers may be based on ytterbium (Yb3+)-doped oxide crystals, either combined with erbium Er3+, holmium Ho3+ or thulium Tm3+ activator ions. With three binary tracers, seven states can be signaled. The tracers can be added in different proportions (e.g., 25%, 25%, 50%), enabling further states to be signaled. See, e.g., Woidasky, et al, Inorganic fluorescent marker materials for identification of post-consumer plastic packaging, Resources, Conservation and Recycling, 2020 Oct. 1; 161:104976.

Still another plastic identification technology employs long persistence phosphors, which respond to UV, violet or blue light with responses elsewhere in the spectrum. The dim emission of long persistence phosphors can be mitigated by triggering the phosphors to release their stored energy all at once (rather than over more typical intervals of seconds to hours). This is done by further stimulating the once-stimulated phosphors, this time with NIR, leading to a burst of stored energy. Items marked in this manner can be illuminated with the halogen or other NIR illumination systems conventionally used in materials recovery facilities. Existing NIR spectroscopy systems can similarly be adapted to recognize the different visible/NIR phosphor responses produced by such phosphors. As with other tracers, such phosphors can be used in combinations (and/or fractions) that enable many different states to be signaled, e.g., this is a food grade item, of multi-layer construction, incorporating a PET layer. See, e.g., patent publication WO18193261.

Yet another identification technology is based on X-ray fluorescence (XRF). This involves bombarding a doped plastic material with x-rays, causing certain of the electrons in the dopant to leave their atoms (ionization), and causing other electrons from outer orbital areas to fall into the voids left by the ionized electrons. In falling, photons are released (fluorescence), and the energy of the photons (i.e., the energy difference between the two orbits involved) serves to identify the molecule. Such fluorescences can be sensed by conventional IR/NIR spectroscopy. Chemical elements with which plastics can be doped to give this effect include one or more of Na, K, Ba, Ca, Mg, Ni, Al, Cr, Co, Cu, Hf, Fe, Pb, Sn, Zn, Ti, Zr, Y, Se, Nb, Sr, Mn, Mo, V and Bi. See, e.g., patent publications WO2021070182 and US20210001377.

Still another plastic identification technology involves illuminating a waste flow with middle infrared radiation, to which plastics respond with distinctive spectra (as with near infrared), but also includes responses from black plastics. However, the middle infrared responses of plastics cannot be sensed with conventional silicon-based image sensors. This problem can be mitigated by adding energy from a Neodymium-doped yttrium-vanadat laser in a non-linear medium. The two signals sum in the non-linear medium, resulting in a signal detectable in the NIR band, from which the MIR response can then be determined. See, e.g., Becker, et al, Detection of black plastics in the middle infrared spectrum (MIR) using photon up-conversion technique for polymer recycling purposes, Polymers, 2017 September; 9(9):435.

Again, such technologies can be used in conjunction with other technologies (e.g., watermarking, NIR and AI), as in the other complementary arrangements detailed earlier.

Some materials recovery facilities employ two-pass sorting. Initially-identified items are ejected from the material flow. The un-identified items flow onto a second, often-narrower belt. During the transfer the items are jostled, and their presentations are changed. This reveals surfaces that may not have been camera-visible previously, and may separate items that previously overlaid each other. The second belt conveys the items past a second camera system that may employ a single camera, rather than the multiple cameras that spanned the first belt.

As discussed in US20210299706, captured imagery can be checked for a mirrored (e.g., left-for-right) presentation of the watermark signal. In a particular embodiment, such check is made only in certain conditions. As described earlier, watermark detection is applied to determine geometric pose from the watermark reference signal. As taught in the cited documents (e.g., US20190306385), watermark signals based on different reference signals may be found in trash flows. For example, one reference signal may be found in watermarks printed on labels to indicate an item GTIN (e.g., useful for point-of-sale checkout). A different reference signal may be found in watermarks formed on container surfaces to indicate a container ID (e.g., not useful for point-of-sale checkout but useful for recycling).

Printed watermarks, i.e., those carrying the first watermark, typically don't present themselves in mirrored form in trash flows. Such marks are commonly not visible through the back of clear containers, and they are not rendered in a 3D manner that might also shape backsides of items, e.g., flat trays. Thus, in accordance with a further aspect of the technology, a check is first made to determine whether a block has a first reference signal or a second reference signal. (Various techniques can be employed to identify which reference signal is employed; example techniques are detailed in pending U.S. patent application Ser. No. 16/849,288, filed Apr. 15, 2020.) Only if a second reference signal is found would a check for a mirrored watermark pattern be made. And usually, such check is only made if a check for a normally-presented watermark pattern first fails, and a check for an inverted (light-for-dark) watermark pattern also fails.

A corresponding strategy can likewise be applied to checking for inverted marks, since they arise primarily in the context of smooth container surfaces. That is, check if a block has a first or second reference signal. Only in the latter case is a check made for an inverted watermark signal, and then typically only after a check for a normally-presented watermark has failed. (Decoding from inverted imagery, as can occur from shiny surfaces, is detailed in pending U.S. patent application Ser. No. 17/687,247, filed Mar. 4, 2022.)

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

In a particular embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

Although the specification commonly discloses use of 2D and 3D image sensors in illustrative embodiments, 2D and 3D sensors are not required. Image sensing can instead be performed by a linear array sensor that captures line scan images at a suitably-high rate. Some line scan cameras operate at rates above 10,000 lines per second. For example, the Cognex CAM-CIC-4KL-24 camera captures lines of 4000 pixels at a rate of 24,000 lines per second. Line scan cameras do not suffer barrel distortion that is present in area scan cameras, permitting the camera to be closer to the belt. (Positioning further from the belt helps mitigate barrel distortion in area scan cameras.) By positioning the camera closer to the belt, less intense illumination may be used. Still further, the 4000 pixel resolution of such cameras enables imaging of the full width of a conveyor belt using fewer cameras. (In contrast, typical area scan cameras have a resolution of 1280 pixels across the belt.) Such factors can contribute to a lower cost for line scan-based implementations.

Relatedly, while global shutter cameras are normally used, rolling shutter cameras can be used in alternative embodiments.

Certain image sensors by Sony (e.g., Sony IMX425, IMX661), and others, have modes permitting image capture within only identified regions of interest (ROIs) within the field of view. In applications in which the watermark reader knows it can disregard certain areas of the belt (e.g., based on information from an AI system, or a system that identifies vacant areas of the belt), such ROI feature can be used to capture pixel data over only a subset of the sensor field of view. Subsequent processing can then be applied just to the ROI data provided by the sensor, improving efficiency.

Such sensors also permit different ROIs to be captured with different exposure intervals, concurrently. Thus, if an AI system identifies both a dark object and a light object that will be within the watermark camera field of view, ROIs allocated by the watermark camera to the corresponding areas can differ in exposure intervals, e.g., capturing data for 75 microseconds in the darker area and 25 microseconds in the lighter area. The exposure intervals overlap in time, rather than being time-sequential. In still other arrangements, two ROIs are defined over a common area within the field of view and capture two sets of image data over two different exposure intervals, e.g., 25 microseconds and 75 microseconds, where again the two different exposure intervals overlap in time. Depending on the reflectance of the item within the common area, one of the two exposures is likely to be either underexposed or overexposed. But the other of the two may depict the item with better watermark code contrast than would be possible with a single intermediate exposure, e.g., of 50 microseconds. The two exposures can be combined in known fashion to yield a high dynamic range image from which the watermark signal can be read.

Different exposures may also be captured in systems with less sophisticated sensors, with similar opportunities and benefits. For example, a first frame can be captured with red light and a short exposure, followed by a second frame captured with blue light and a short exposure, followed by a third frame captured with red light and a long exposure, followed by a fourth frame captured with blue light and a long exposure, and then this cycle repeats. One of these frame captures starts every two milliseconds. (Long and short exposures are relative to each other and can be, e.g., 75 and 25 microseconds.) Each captured frame can be tagged with metadata indicating the illumination color and exposure interval, permitting the watermark detector to apply parameters optimized to each circumstance.

Increasingly, image sensors are including convolutional neural network hardware in the same package—and often on the same semiconductor substrate—as the image sensor. The Sony IMX500 is such a sensor. Such CNN hardware can be used in embodiments described herein that call for neural networks.

While an exemplary embodiment uses blue, red and near-infrared LEDs, it should be emphasized that more, less, or different illumination spectra can be employed. For example, some packaging producers may print watermark or other 2D code indicia on their packaging or containers using ink that appears transparent to humans, but fluoresces under certain illumination to yield detectable signals. Clear varnishes or other carriers can be mixed with compounds that exhibit such fluorescing effects to yield suitable inks. Patent publications US20170044432, WO2015036719 and WO18193261 identify a variety of such compounds. The book edited by Shionoya et al, "Phosphor Handbook," CRC Press, 2006, identifies many more.

In other embodiments, plastic items are printed with watermark patterns using a clear varnish. Varnish-marked regions of an item's surface reflect light differently than un-varnished regions, permitting codes applied by varnish to be discerned and decoded in captured imagery. Additional information on such use of varnishes is found in pending U.S. patent application 63/197,298, filed Jun. 4, 2021.

The camera(s) noted above, or additional camera(s), can detect bottles and other items that are rolling (tumbling) relative to the moving conveyor belt. Uncrumpled bottles are susceptible to rolling in the circumstances of the high belt speeds, induced winds, and generally chaotic dynamics of waste stream conveyors, and such rolling interferes with accurate diversion of identified bottles. By analysis of imagery captured by a camera at two or more instants a known interval apart (or multiple cameras at two or more different instants), the speed and direction at which an item is tumbling—within the building frame of reference—can be determined.

The artisan will recognize that this is an exercise in photogrammetry, i.e., relating depicted positions of an item in image frames to corresponding physical locations in the building by a projection function specific to the camera system, and determining the time rate of change of such positions in two dimensions. If a bottle's speed thereby indicated is different than the belt speed, then the bottle is known to be rolling. Given the known bottle rolling speed and direction, the diverter system can predict the bottle's position at future instants, and can adapt the ejection timing or other parameters accordingly so the bottle is correctly diverted despite its rolling. Usually, the diverter system will delay the moment of ejection, in accordance with the difference between the bottle's speed and the belt speed.

Figure 25:
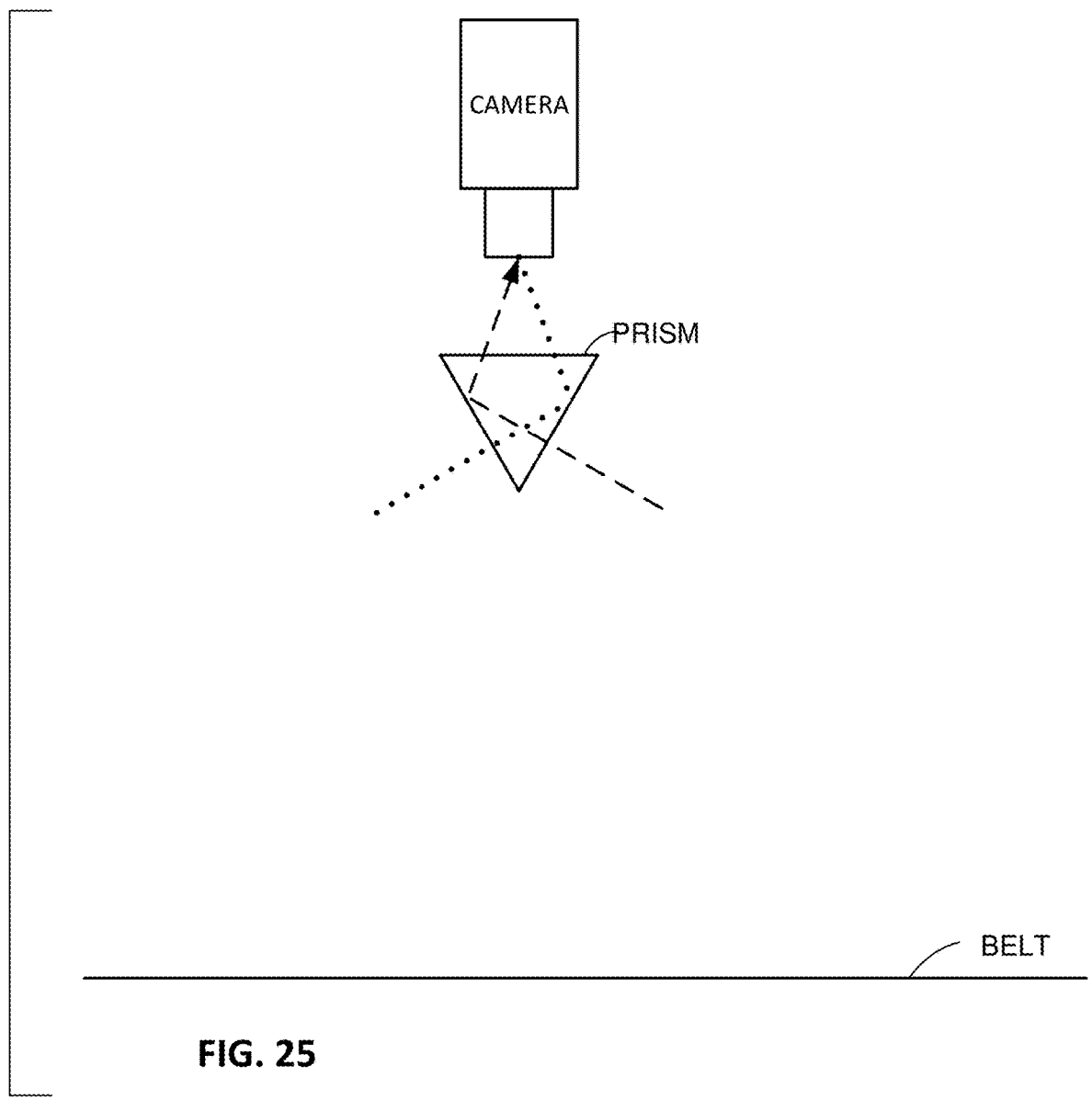
FIG. 25 illustrates a camera arrangement suited to detection of tumbling items on a conveyor belt.

The watermark reading camera(s) detailed earlier have a field of view spanning about 15 cm of the length of the belt. To view a larger expanse of belt, a wider angle lens can be used, such as a fisheye lens—permitting the system to determine an object's tumbling speed using observations of the object taken from locations spaced a meter or more apart on the belt. In another such embodiment, a camera's field of view is split in two by mirrors or a prism, with one part viewing in one direction along the conveyor, and the other part viewing in the opposite direction. FIG. 25 illustrates.

Tumbling can also be mitigated by using a non-flat belt, such as a belt with ridges or knobby protrusions. Ridges may be oriented across the belt, or may be oriented along its length, or at any other angle (or at combinations of angles).

Some embodiments are described as employing correlation as a method of pattern matching (e.g., to determine vacant regions of belt). It will be understood that there are many variations of, and alternatives to, correlation, so the technology should be understood as encompassing other pattern matching techniques as well.

Various references were made to conveyed by the watermark payload (e.g., identifying the plastic resin, the product brand or the bottle manufacturer). It should be understood that such information is often not literally encoded into the watermark payload itself but is available from a database record that can be accessed using an identifier that is literally encoded into the watermark payload. Applicant means language such as "information encoded in the watermark" or "data conveyed by the watermark" in this sense of "available from," i.e., encompassing use of a database to store the indicated information. (Applicant uses the phrase "literally encoded" to mean encoded in the stricter sense, i.e., with certain information expressed by the watermark pattern on the bottle itself.)

This specification also frequently references "waste" or "trash." This is meant to refer simply to a material flow of used items. Some may be recycled; others may be re-used.

Reference was made to keypoints. The artisan is familiar with such term, which includes techniques like SIFT keypoints (c.f. U.S. Pat. No. 6,711,293) and FAST keypoints (c.f. Rosten, et al, Fusing points and lines for high performance tracking, 10th IEEE Int'l Conf. on Computer Vision, 2005, pp. 1508-1515, and Rosten, et al, Machine learning for high-speed corner detection, 2007 European Conference on Computer Vision, pp. 430-43, both of which are attached to U.S. patent application 62/548,887, filed Aug. 22, 2017).

It will be recognized that systems employing aspects of the present technology do not require a conveyor belt per se. For examples, articles can be transported past the camera system and to diverter systems otherwise, such as by rollers or by free-fall. All such alternatives are intended to be included by the terms "conveyor belt," "conveyor" or "belt."

Although most of the detailed arrangements operate using greyscale imagery, certain performance improvements (e.g., more reliable identification of empty belt, and certain modes of watermark decoding) may be enabled by the greater-dimensionality of multi-channel imagery. RGB sensors can be used. However, half of the pixels in RGB sensors are typically green-filtered (due to prevalence of the common Bayer color filter). Still better results can be achieved with sensors that output four (or more) different channels of data, such as R/G/B/ultraviolet. Or R/G/B/infrared. Or R/G/B/polarized. Or R/G/B/white.

As reviewed above, watermark detection and synchronization in an exemplary embodiment employs a direct least squares (and phase deviation) approach. Other techniques, however, can also be used. One example is a coiled all-pose arrangement, as detailed in patent publication US20190266749. Another option is to use an impulse matched filter approach, (e.g., correlating with a template comprised of peaks), as detailed in U.S. patent documents 10,242,434 and 6,590,996.

Reference was made to forced air blowout (air jet) as one means for diverting an item from a material flow, such as from a conveyor belt. A particular air blowout arrangement is detailed patent publication US20190070618 and comprises a linear array of solenoid-activated air jet nozzles positioned below the very end of a conveyor belt, from which location items on the belt start free-falling under the forces of gravity and their own momentum. Without any air jet activity, items cascade off and down from the end of the belt, and into a receptacle or onto another belt positioned below. Items acted-on by one or more jets are diverted from this normal trajectory, and are diverted into a more remote receptacle—typically by a jet oriented to have a horizontal component away from the belt, and a vertical component upwards. These and other separation and sorting mechanisms are known to the artisan, e.g., from U.S. Pat. Nos. 5,209,355, 5,485,964, 5,615,778, 20040044436, 20070158245, 20080257793, 20090152173, 20100282646, 20120031818, 20120168354, 20170225199, 20200338753 and 20220106129. Operation of such diverters is controlled in accordance with the type of item identified, as detailed earlier.

Although diversion (ejection) of items using air jets has been referenced in connection with certain technologies and embodiments, it should be understood that robotic separation can alternatively be used in such instances. In addition to robotic technologies identified in the foregoing paragraph, examples of such robotics to remove items from conveyors are shown in patent publications WO21260264, US20210237262 and US20210206586.

Attention is particularly-drawn to cited U.S. patent application Ser. No. 16/944,136. That application details work by a different team at the present assignee but dealing with the same recycling, etc., subject matter. That application details features, methods and arrangements which applicant intends be incorporated into embodiments of the present technology. That application and this one should be read in concert to provide a fuller understanding of the subject technology.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as discerning affine pose parameters from a watermark reference signal in captured imagery, or decoding watermark payload data—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to discern affine pose parameters from a watermark reference signal, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semicustom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.) In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC, e.g., for discerning affine pose parameters from a watermark reference signal in captured imagery, or decoding watermark payload data, again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from Math- Works). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: tc.al device, remote device, in the cloud, distributed, etc.

Other recycling arrangements are taught in U.S. Pat. Nos. 4,644,151, 5,965,858, 6,390,368, 20060070928, 20140305851, 20140365381, 20170225199, 20180056336, 20180065155, 20180349864, and 20190030571. Alternate embodiments of the present technology employ features and arrangements from these cited documents.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A method comprising the acts:

determining first attribute information for waste at a first location on a waste-conveying conveyor belt, in which the first attribute information comprises a digital watermark payload or a material type or a food/non-food type;

providing imagery depicting said first location to a convolutional neural network, and receiving an output from the convolutional neural network indicating presence of only one waste item;

controlling a diverter to act on said waste item based on the determined first attribute information and on output from the convolutional neural network indicating presence of only one waste item;

determining attribute information for waste at a second location on the waste-conveying conveyor belt;

providing imagery depicting said second location to the convolutional neural network, and receiving an output from the convolutional neural network indicating presence of two or more adjoining or overlapping items; and not controlling a diverter to act on waste at said second location.

2. The method of claim 1 that includes acts of:

determining a first contiguous area around said first location that is occupied by waste;

providing imagery depicting said first contiguous area to the convolutional neural network, and receiving an output from the convolutional neural network indicating that said first contiguous area is occupied by only one waste item;

controlling the diverter to act on a diversion target within said first contiguous area, to direct said waste item to a repository associated with said determined attribute information;

determining a second contiguous area around said second location that is occupied by waste;

providing imagery depicting said second contiguous area to the convolutional neural network, and receiving an output from the convolutional neural network indicating that said second contiguous area is occupied by more than one waste item; and not controlling a diverter to act on a diversion target within said second contiguous area.

3. The method of claim 1 that includes determining said attribute information based on near infrared spectroscopy data.

4. The method of claim 1 in which said imagery comprises 3D imagery or depth map information.

5. The method of claim 1 in which said attribute information indicates for the waste at the first or second location comprises a plastic container used for food.

6. The method of claim 1 further comprising:

determining a first contiguous area around said first location that is occupied by waste by utilizing a region growing algorithm;

providing imagery depicting said first contiguous area to the convolutional neural network, and receiving an output from the convolutional neural network indicating that said first contiguous area is occupied by only one waste item; and controlling the diverter to act on a diversion target within said first contiguous area, to direct said waste item to a repository associated with said determined first attribute information.

7. The method of claim 6 further comprising:

determining a second contiguous area around said second location that is occupied by waste by utilizing a region growing algorithm;

providing imagery depicting said second contiguous area to the convolutional neural network, and receiving an output from the convolutional neural network indicating that said second contiguous area is occupied by more than one waste item; and not controlling a diverter to act on a diversion target within said second contiguous area.

8. The method of claim 6 further comprising:

restricting said determining a first contiguous area upon receiving an output from the convolutional neural network indicating presence of only one waste item and upon receiving the determined first attribute information indicating that the waste comprises a single plastic material type.

9. The method of claim 6 in which the region growing algorithm utilizes blob extraction, connected-component labeling, or connected component analysis.

10. A method comprising the acts:

compiling historical conveyor belt map data derived from images depicting a conveyor belt loop at positions throughout a full cycle of conveyor belt travel without waste thereon;

after compiling said historical conveyor belt map data, capturing first imagery depicting a first region of the conveyor belt with waste thereon;

by comparison with the historical conveyor belt map data, identifying a first set of conveyor belt area blocks depicted in the first imagery in which the conveyor belt is visible and a second set of conveyor belt area blocks depicted in the first imagery in which the conveyor belt is not visible, said second set of area blocks including a first clump of adjoining area blocks;

providing imagery depicting said first clump of adjoining conveyor belt area blocks to a convolutional neural network, and receiving an output from the convolutional neural network indicating that said first clump of adjoining area blocks is occupied by a single waste item only;

controlling a diverter mechanism to act on a diversion target within said first clump of adjoining conveyor belt area blocks, to remove said single waste item to a repository;

after compiling said historical conveyor belt map data, capturing second imagery depicting a second region of the conveyor belt with waste thereon;

by comparison with the historical conveyor belt map data, identifying a first set of conveyor belt area blocks depicted in the second imagery in which the conveyor belt is visible and a second set of conveyor belt area blocks depicted in the second imagery in which the conveyor belt is not visible, said second set of area blocks including a second clump of adjoining area blocks;

providing imagery depicting said second clump of adjoining conveyor belt area blocks to the convolutional neural network, and receiving an output from the convolutional neural network indicating that said second clump of adjoining area blocks is occupied by more than one waste item; and not controlling a diverter mechanism to act on a diversion target within said second clump of adjoining area blocks.

11. A method comprising:

compiling historical conveyor belt map data derived from images depicting a conveyor belt loop at positions throughout a full cycle of conveyor belt travel without waste thereon;

after compiling said historical conveyor belt map data, capturing first imagery depicting a first region of the conveyor belt with waste thereon;

by comparison with the historical conveyor belt map data, identifying a first set of conveyor belt area blocks depicted in the first imagery in which the conveyor belt is visible and a second set of conveyor belt area blocks depicted in the first imagery in which the conveyor belt is not visible, said second set of area blocks including a first clump of adjoining area blocks;

providing imagery depicting said first clump of adjoining conveyor belt area blocks to a convolutional neural network, and receiving an output from the convolutional neural network indicating that said first clump of adjoining area blocks is occupied by a single waste item only; and controlling a diverter mechanism to act on a diversion target within said first clump of adjoining conveyor belt area blocks, to remove the single waste item to a repository.

12. The method of claim 11 further comprising:

after compiling said historical conveyor belt map data, capturing second imagery depicting a second region of the conveyor belt with waste thereon;

by comparison with the historical conveyor belt map data, identifying a first set of conveyor belt area blocks depicted in the second imagery in which the conveyor belt is visible and a second set of conveyor belt area blocks depicted in the second imagery in which the conveyor belt is not visible, said second set of area blocks including a second clump of adjoining area blocks;

providing imagery depicting said second clump of adjoining conveyor belt area blocks to the convolutional neural network, and receiving an output from the convolutional neural network indicating that said second clump of adjoining area blocks is occupied by more than one waste item;

determining first attribute information for waste associated with the second clump of adjoining area blocks, in which the first attribute information comprises a single material type;

controlling a diverter to act on said waste item based on the determined first attribute information and on output from the convolutional neural network indicating that the second clump of adjoining area blocks is occupied by more than one waste item.

13. A system comprising:

at least one optical sensor that provides sensor data sensed from waste on a conveyor belt, the sensor data including imagery;

means for determining first attribute information, from the sensor data, for waste at a first location on said conveyor belt, in which the first attribute information comprises a digital watermark payload or a material type or a food/non-food type;

a multi-layer convolutional neural network configured by weights, learned through training, that causes the convolutional neural network to classify the imagery as depicting (a) a single waste item, or (b) two or more adjoining or overlapping items; and a waste diverter system for said conveyor belt, configured to activate only if the convolutional neural network classifies the imagery as depicting (a) a single waste item.

14. The system of claim 13 in which said means for determining the first attribute information utilizes near infrared spectroscopy data.

15. The system of claim 13 in which the imagery comprises 3D imagery or depth map information.

16. The system of claim 13 in which the first attribute information indicates the waste at the first location comprises a plastic container used for food.

17. The system of claim 13 further comprising:

means for determining a first contiguous area around that the first location that is occupied by waste by utilizing a region growing algorithm.

18. The system of claim 17 further comprising:

means for restricting said means for determining a first contiguous area upon receiving an output from the convolutional neural network indicating presence of (a) a single waste item and upon receiving the determined first attribute information indicating that the waste comprises a single plastic material type.

19. The system of claim 17 in which the region growing algorithm utilizes blob extraction, connected-component labeling, or connected component analysis.

20. A system comprising:

means for compiling historical conveyor belt map data derived from images depicting a conveyor belt loop at positions throughout a full cycle of conveyor belt travel without waste thereon;

means for capturing first imagery depicting a first region of the conveyor belt with waste thereon, after compiling said historical conveyor belt map data;

means for identifying a first set of conveyor belt area blocks depicted in the first imagery in which the conveyor belt is visible and a second set of conveyor belt area blocks depicted in the first imagery in which the conveyor belt is not visible, the second set of area blocks including a first clump of adjoining area blocks, in which said means for identifying utilizes a comparison with the historical conveyor belt map data;

means for providing imagery depicting said first clump of adjoining conveyor belt area blocks to a convolutional neural network, and means for receiving an output from the convolutional neural network indicating that said first clump of adjoining area blocks is occupied by a single waste item only; and means for controlling a diverter mechanism to act on a diversion target within said first clump of adjoining conveyor belt area blocks, to remove the single waste item to a repository.

21. The system of claim 20 further comprising:

means for capturing second imagery depicting a second region of the conveyor belt with waste thereon, after compiling said historical conveyor belt map data;

means for identifying a first set of conveyor belt area blocks depicted in the second imagery in which the conveyor belt is visible and a second set of conveyor belt area blocks depicted in the second imagery in which the conveyor belt is not visible, said second set of area blocks including a second clump of adjoining area blocks, in which said means for identifying utilizes a comparison with the historical conveyor belt map data;

means for providing imagery depicting said second clump of adjoining conveyor belt area blocks to the convolutional neural network, and means for receiving an output from the convolutional neural network indicating that said second clump of adjoining area blocks is occupied by more than one waste item;

means for determining first attribute information for waste associated with the second clump of adjoining area blocks, in which the first attribute information comprises a single material type;

means for controlling a diverter to act on said waste item based on the determined first attribute information and on output from the convolutional neural network indicating that the second clump of adjoining area blocks is occupied by more than one waste item.

* * * * *